United States Patent
Knorr et al.

(10) Patent No.: US 11,212,464 B2
(45) Date of Patent: Dec. 28, 2021

(54) METHOD AND SYSTEM FOR GENERATING AT LEAST ONE IMAGE OF A REAL ENVIRONMENT

(71) Applicant: Apple Inc., Cupertino, CA (US)

(72) Inventors: Sebastian Knorr, Mountain View, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/371,568

(22) Filed: Apr. 1, 2019

(65) Prior Publication Data

US 2019/0230297 A1 Jul. 25, 2019

Related U.S. Application Data

(63) Continuation of application No. 15/128,416, filed as application No. PCT/EP2014/079380 on Dec. 29, 2014, now abandoned.

(51) Int. Cl.
| | |
|---|---|
| *H04N 5/272* | (2006.01) |
| *G06T 19/00* | (2011.01) |
| *H04N 5/222* | (2006.01) |
| *H04N 5/232* | (2006.01) |
| *G06T 7/70* | (2017.01) |

(52) U.S. Cl.
CPC .............. *H04N 5/272* (2013.01); *G06T 7/70* (2017.01); *G06T 19/006* (2013.01); *H04N 5/2224* (2013.01); *H04N 5/2226* (2013.01); *H04N 5/23222* (2013.01); *H04N 5/23229* (2013.01); *H04N 5/232123* (2018.08); *H04N 5/232125* (2018.08); *H04N 5/2723* (2013.01)

(58) Field of Classification Search
None
See application file for complete search history.

(56) References Cited

U.S. PATENT DOCUMENTS

| | | | |
|---|---|---|---|
| 2012/0105590 A1* | 5/2012 | Fukumoto | H04N 5/232935 348/46 |
| 2012/0127203 A1 | 5/2012 | Imai | |
| 2012/0219188 A1 | 8/2012 | Kurz | |
| 2013/0271625 A1* | 10/2013 | Gruber | G06K 9/4661 348/239 |

(Continued)

OTHER PUBLICATIONS

Davison et al., "MonoSLAM: Real-time single camera SLAM." Pattern Analysis and Machine Intelligence, IEEE Transactions on 29.6 (2007): 1052-1067.

(Continued)

*Primary Examiner* — Heather R Jones
(74) *Attorney, Agent, or Firm* — Blank Rome LLP

(57) ABSTRACT

A method of generating at least one image of a real environment comprises providing at least one environment property related to at least part of the real environment, providing at least one virtual object property related to a virtual object, determining at least one imaging parameter according to the at least one provided virtual object property and the at least one provided environment property, and generating at least one image of the real environment representing information about light leaving the real environment according to the determined at least one imaging parameter, wherein the light leaving the real environment is measured by at least one camera.

20 Claims, 16 Drawing Sheets

(56) References Cited

U.S. PATENT DOCUMENTS

2014/0016825 A1 1/2014 Kasahara
2014/0098191 A1* 4/2014 Rime .................. H04N 5/2254
                                                                               348/46

OTHER PUBLICATIONS

Fiete, Robert D., Modeling the imaging chain of digital cameras. SPIE press, 2010.
Georg Klein and David Murray, Simulating Low-Cost Cameras for Augmented Reality Compositing, In Transactions on Visualization and Computer Graphics (TVCG) May/Jun. 2010, (vol. 16 No. 3) pp. 369-380.
Levoy, Marc, and Pat Hanrahan. "Light field rendering." Proceedings of the 23rd annual conference on Computer graphics and interactive techniques. ACM, 1996.
Ng, et al., Light Field Photography with a Hand-held Plenoptic Camera. Stanford Tech Report CTSR 2005-02 (2005).

* cited by examiner

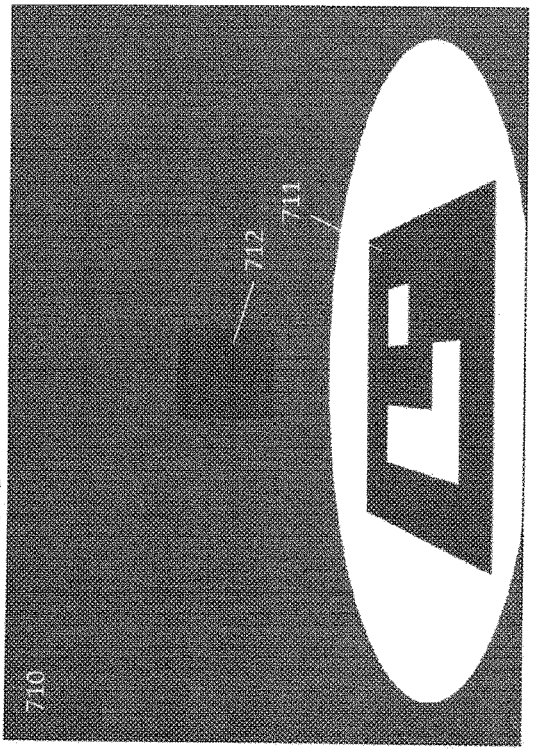
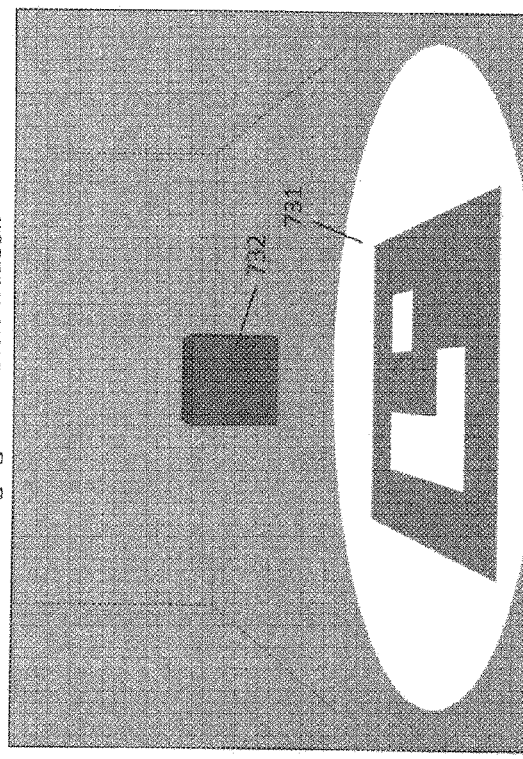
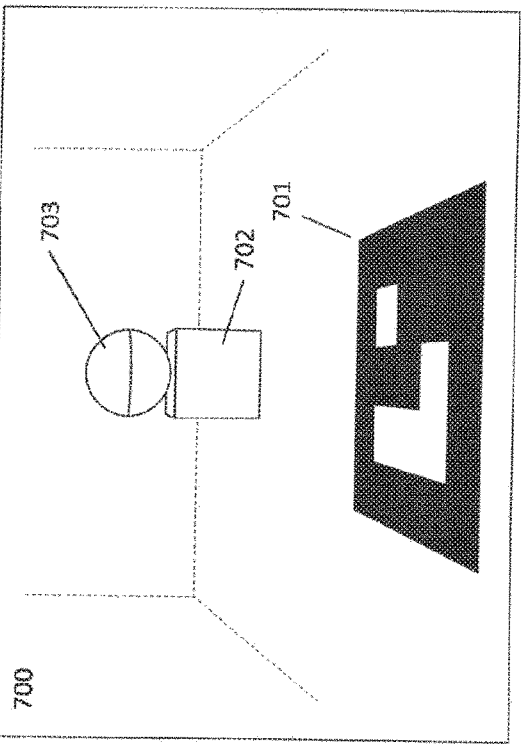
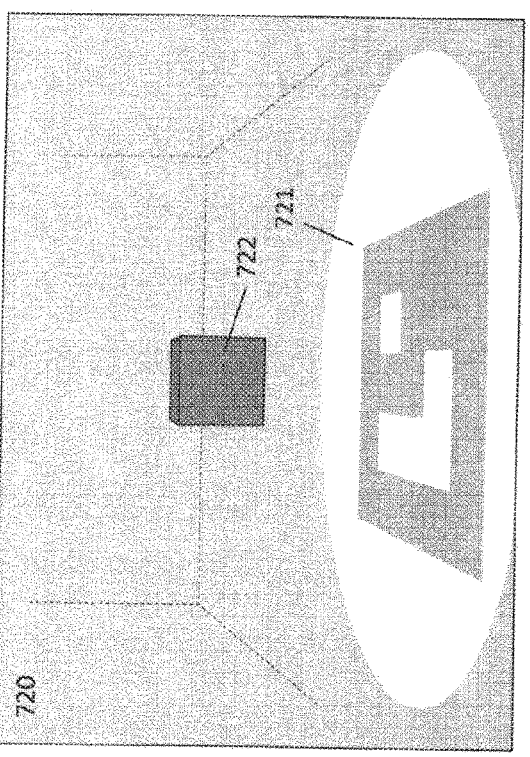
Fig. 7

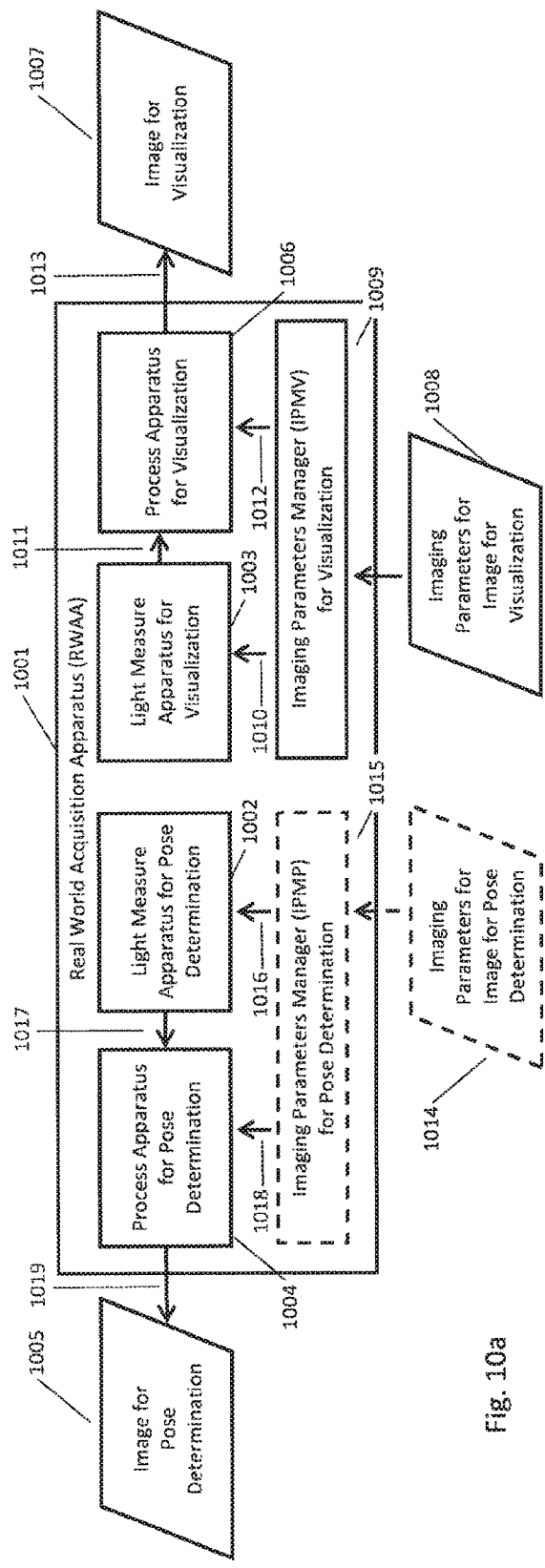
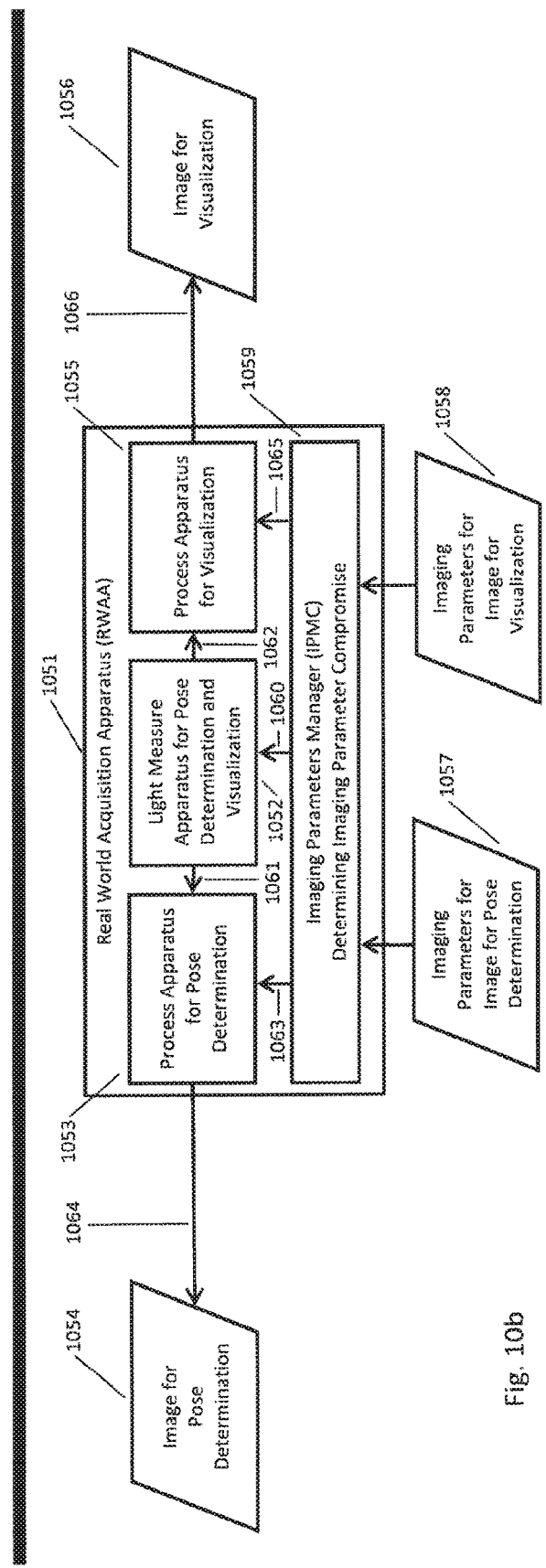
Fig. 10a
Fig. 10b

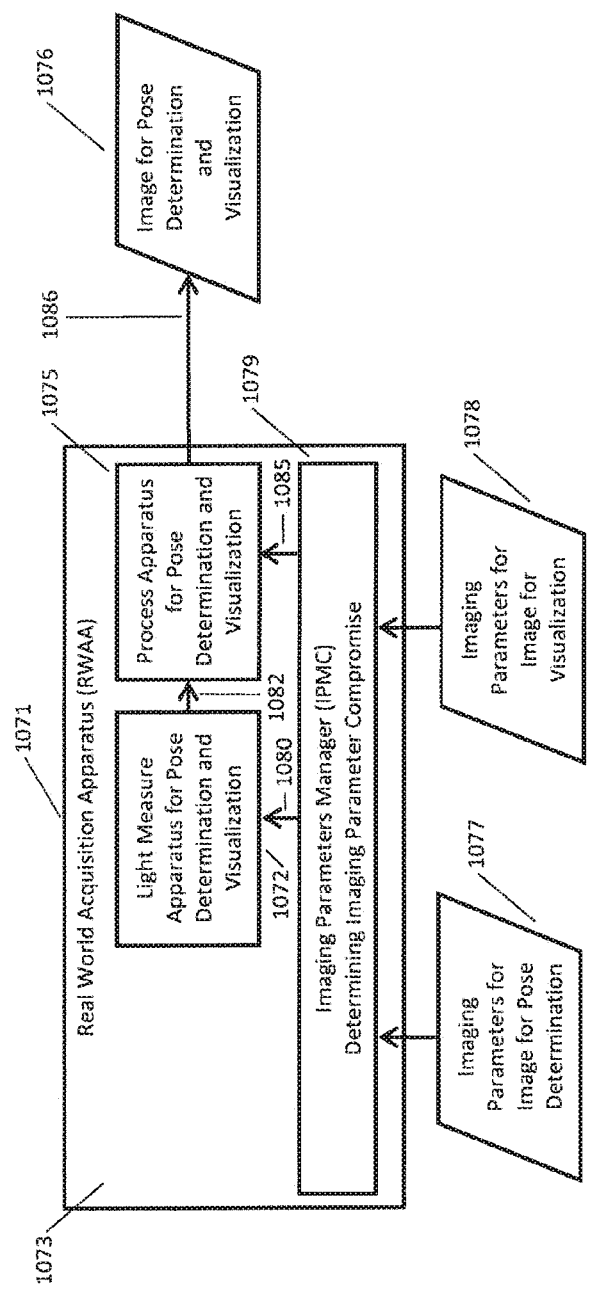

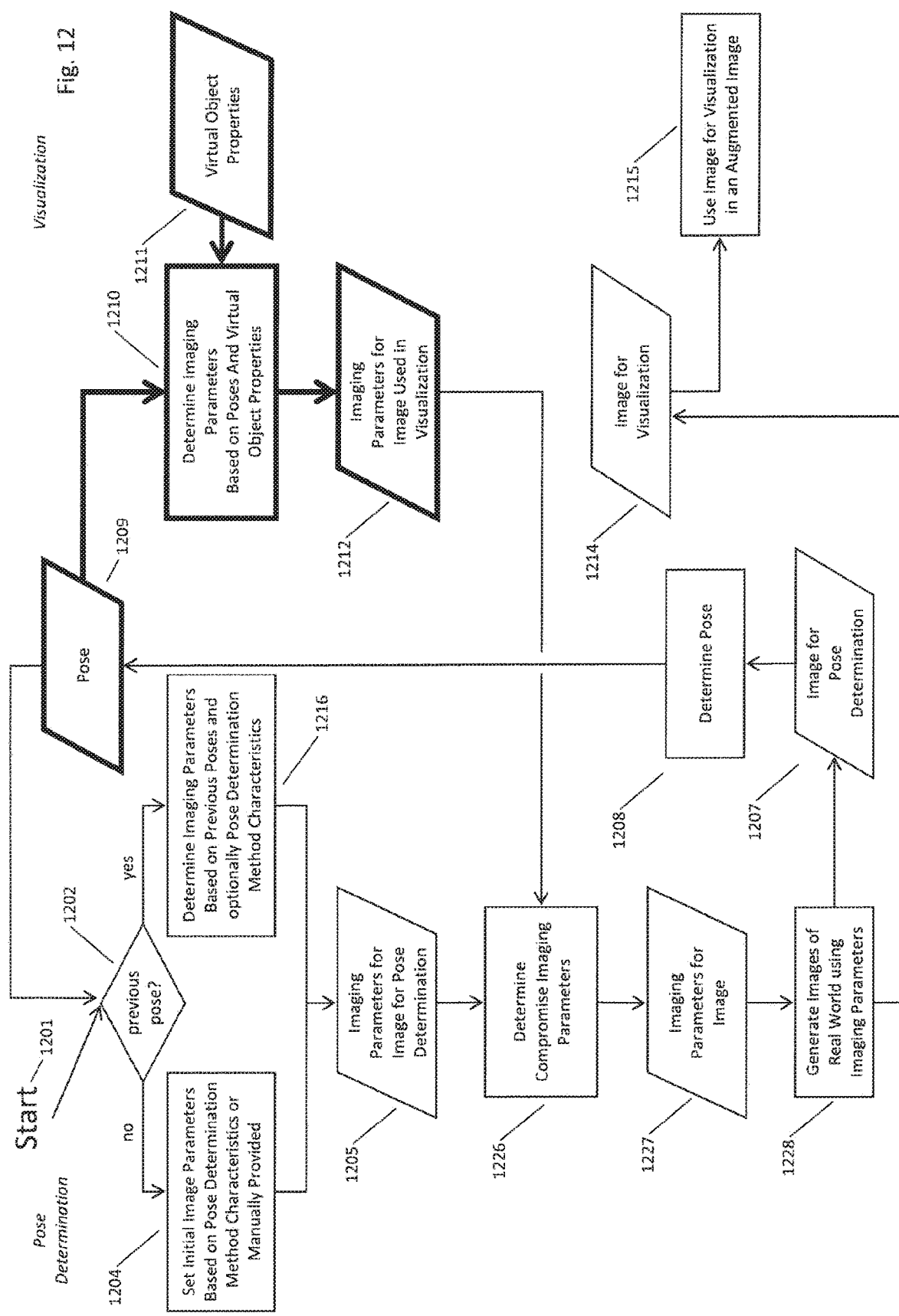

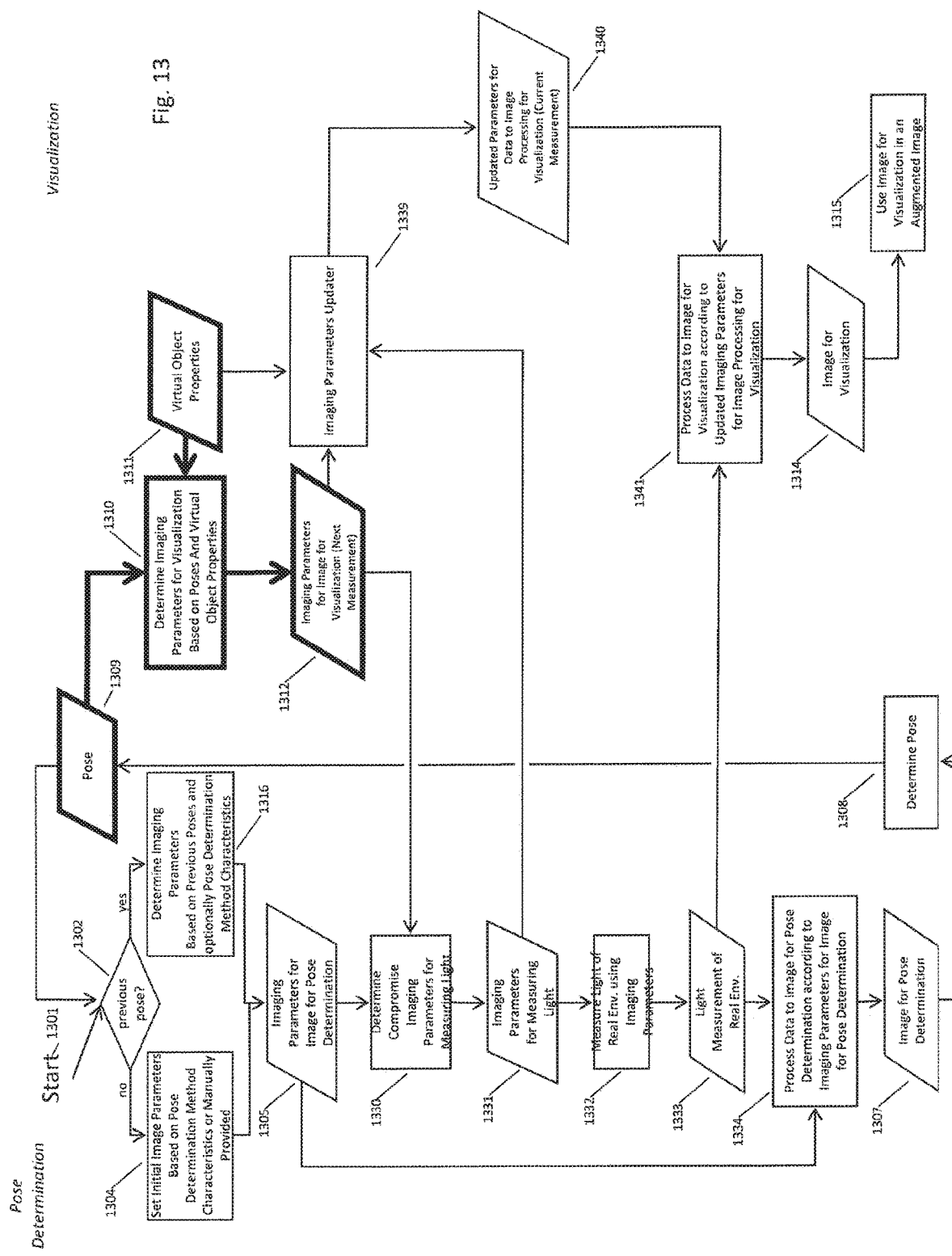

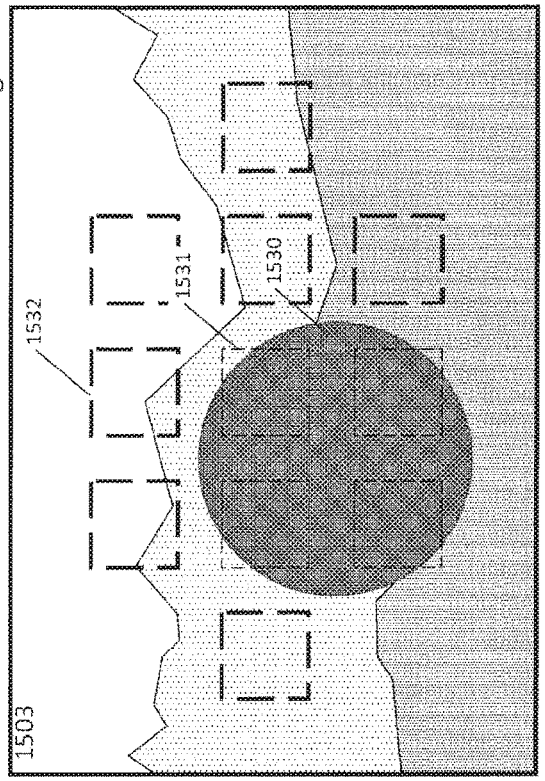
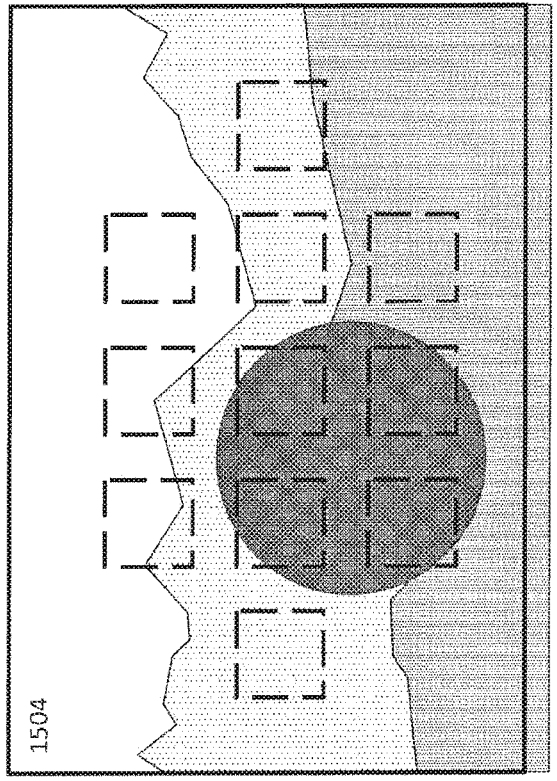
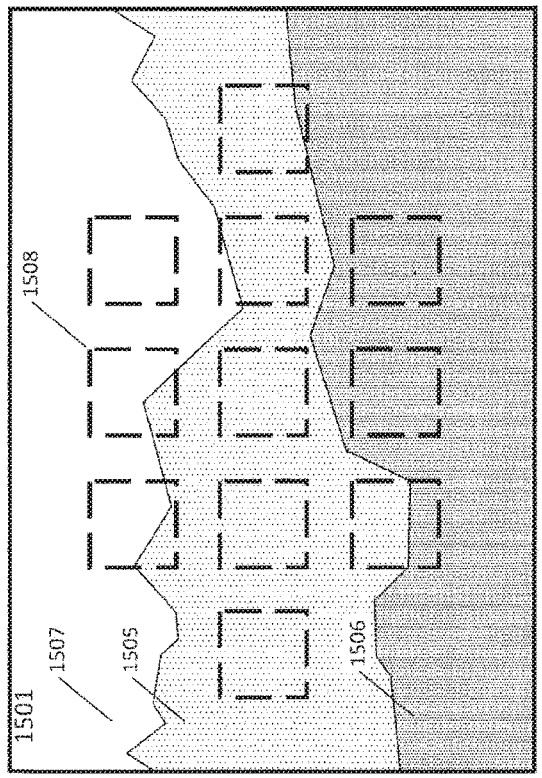
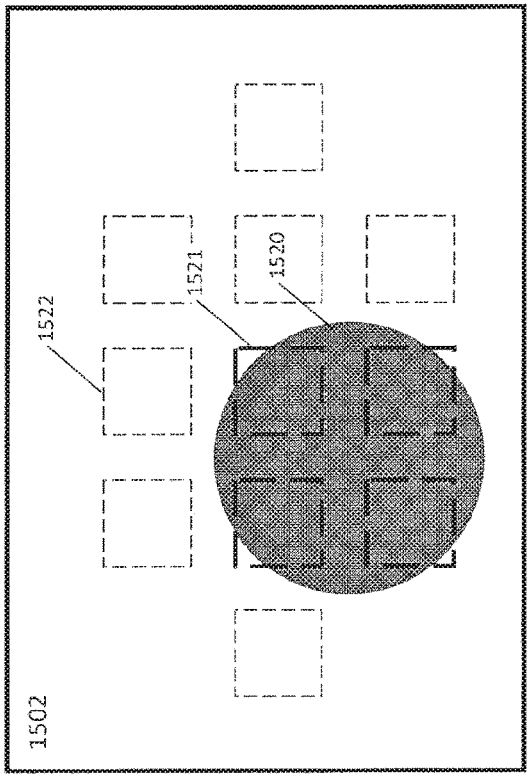
Fig. 15

METHOD AND SYSTEM FOR GENERATING AT LEAST ONE IMAGE OF A REAL ENVIRONMENT

The present disclosure is related to a method and system for generating at least one image of a real environment.

BACKGROUND

In an Augmented Reality application, so-called video see-through Augmented Reality displays a live camera image of a real environment superimposed with spatially registered digital information in the form of a virtual object on a display device. A virtual object may for example represent information about the environment captured in the image, such as annotations. There are different means to achieve the spatial registration, and a very common approach is to use the camera image as a basis to determine the camera pose, i.e. position and orientation, relative to the environment. This is referred to as (visual) camera tracking or visual camera pose determination. A rendering step then generates a composite image of the camera image of the real environment with the virtual object, and the composite image, which is also often referred to as augmented image, could be shown on a display device. The camera image thereby is used for visualization of the real environment.

In common approaches the same image is often used for pose determination and visualization and this image is usually captured and generated with imaging parameters which are configured such that the resulting image looks nice to humans (e.g. it has a high contrast, and the central part of the image is focused, i.e. imaged sharply). Such image, however, may not be well-suited for camera pose determination and/or for visualization by rendering a composite image with a superimposed virtual object.

Generally the properties of an image which is well-suited for camera pose determination may differ from properties of an image which is well-suited for visualization, which again may differ from properties of an image that looks nice (which is what most cameras try to achieve).

One known approach captures a single image which is a tradeoff between the two needs of the visualization and the pose determination, and another known approach generates two separate images, where one is used for pose determination and the other one for visualization. The two separate images can be obtained from two independent cameras where the imaging parameters of the first camera are set according to the needs for camera pose determination and the imaging parameters of the second image are set according to the needs for visualization. The two separate images can also be obtained through one camera.

Capturing a richer dataset of an environment allows for synthesizing images with provided imaging parameters. One example of such cameras are light field cameras (see Levoy, Marc, and Pat Hanrahan. "Light field rendering." Proceedings of the 23rd annual conference on Computer graphics and interactive techniques. ACM, 1996 ("Levoy")), which capture a light field dataset that allows to synthesize images with different imaging parameters, e.g. different focal planes, after capturing the light field dataset.

State of the art approaches use conventional (not light field) cameras for (real-time) augmented reality. The image captured of the real environment has an associated focus distance. Parts of the real environments at that focus distance from the camera are imaged sharp, also known as in focus, and parts at other distances, closer or further away are imaged out of focus. The focus distance may describe a plane perpendicular to the optical axis at the focus distance on which each point is imaged as a single point on the image sensor and thereby appears sharp. The focus distance may describe a distance at which each point is imaged as a single point on the image sensor and thereby appears sharp. This focus is not synthetically produced but based on the optics of the imaging system. Depending on the availability of control over the focus of the system, either manually or based on auto-focus mechanism, most often a subpart of the visible part of the scene (e.g. center part) is set to be in focus.

The same image is also used for visualization of the real environment and the combination with renderings of virtual objects. Some implementations try to adapt the rendering of virtual objects to the video image by adjusting the focus used for rendering or the motion blur to that visible in the camera image, see e.g. Georg Klein and David Murray, Simulating Low-Cost Cameras for Augmented Reality Compositing, In Transactions on Visualization and Computer Graphics (TVCG) May/June 2010, (vol. 16 no. 3) pp. 369-380 ("Klein"). All these effects are based on a single photo (image) and introduce artifacts. More importantly, the approach described in Klein does not allow for control over the focus in the camera image but only over the visual effects caused by focus (and other parameters, such as noise) of the virtual objects. What is disclosed in reference Klein adapts the appearance of virtual objects according to the appearance of the real environment in an image.

A major limitation of standard approaches is that the same image is used for pose determination and visualization. As a result, the image is limited for example in variation of focus, as it must be usable for pose determination. Therefore, the focus for the augmented image is also not freely configurable.

Camera Pose Determination:

As discussed above, image-based (or visual) localization and tracking is one approach used to determine the pose of the camera relative to the real environment based on image input from the camera. Such methods rely on extracting and comparing image features of the captured part of the environment either with image features of a previous camera image or features of a model of the environment. Commonly employed methods for establishing such correspondences for camera pose determination, e.g. feature descriptors as disclosed in US Publication No. US 20120219188 A1, Method of providing a descriptor for at least one feature of an image and method of matching features, Daniel Kurz, Selim Behimane, are in general not fully invariant to the effects of imaging parameters in the camera image, e.g. changes in focus or blur, changes in brightness and contrast, or changes in image noise. The image used for camera pose determination therefore must exhibit properties suited for the method. Depending on the situation, it can be beneficial that for example either near objects or distant objects either are in focus or out-of-focus. If the tracking method uses only a part of the real environment as reference for camera pose determination (e.g. only one object in the environment), then it might be beneficial that this part is imaged in focus while the remaining parts of the environment are imaged out-of-focus. Analogously, imaging parameters such as the exposure time should be set such that the part of the environment that is used for camera pose determination is neither too bright nor too dark and has a contrast which allows for recognizing the part of the environment in the camera image.

Rendering and Augmented Reality:

For the visual presentation of an image to the viewer, which is referred herein to as visualization, effects such as putting particular parts of the real environment in focus, and other parts out-of-focus or changing the depth of field are well suited for creative effects and commonly applied for example in cinematography. These effects are used in order to direct the viewer's attention to particular parts of the real environment. They can also be used to obfuscate particular parts of the environment, or to create other impression-related effects. The fact that only specific parts of the visible environment are in focus and other parts are out-of-focus is also true for images created by a human vision system and thereby reflects a natural property of images which is important for a realistic impression.

Conventional (i.e. monocular) cameras could capture a single 2D image, see Fiete, Robert D. Modeling the imaging chain of digital cameras. SPIE press, 2010, (or a temporal sequence of 2D images) of the environment, which is used in conventional AR applications for both camera pose determination and visualization. The (optical) imaging system thereby is configured in a way so that points at a particular distance to the camera are mapped sharply (i.e. in focus) onto the sensor. Within a limited range around that particular distance, objects are still mapped sufficiently sharp. This range is known as depth of field, and depends on the size of the circle of confusion, which is the area the projection of a point is spread to on the image sensor and thereby the resulting image. The resulting image of a conventional camera hence usually has one part of the environment at a particular distance in focus and the other parts out-of-focus.

Imaging parameters that influence how luminance is mapped to image intensities, e.g. exposure time, gain, or ISO, can also be used for artistic effects and to guide the observer's attention. As an example, consider a brightly illuminated stage and a hardly illuminated audience in front of it. Using a short exposure time could result in an image of this environment where the stage is well imaged and contrasty while the audience is very dark and hardly recognizable. On the other hand, using a long exposure time could result in an image of the same environment where the stage is very bright and overexposed such that it is hardly recognizable while the audience is well imaged and contrasty. The fact that only specific parts of the visible environment are well exposed and contrasty, while other parts are under- or overexposed is also true for images created by the human vision system and thereby reflects a natural property of images which is important for a realistic impression. Although the human eye can adapt itself to various levels of brightness from very dark to very bright, the eye can at one moment in time only sense a limited ratio in terms of contrast of around one thousand. Additionally the human eyes may take multiple minutes to fully adapt from a very bright to a very dark scene and vice versa.

Augmented Reality adds to the real environment, in which the user's attention may be guided by means of imaging parameters, one or multiple virtual objects. It is desirable to not only be able to direct the viewer's attention to particular parts of the real environment, but to also be able to direct the viewer's attention to particular parts of the virtual object or to obfuscate other parts of the virtual object. In this case, the real environment should appear consistently. For example if a virtual object very close to the camera should be in focus, then also the real environment should be imaged such that the real environment is in focus within the distance of the very close virtual object, while it is out-of-focus for much more distant parts of the real environment.

SUMMARY

It would be beneficial to provide a method and system which are capable of generating images that are captured with imaging parameters which are determined under consideration of needs for a later augmentation. Moreover, preferably, it would be beneficial to also consider needs of visual camera pose determination methods when determining imaging parameters.

According to an aspect, there is disclosed a method of generating at least one image of a real environment, the method comprising
a) providing at least one environment property related to at least part of the real environment,
b) providing at least one virtual object property related to a virtual object having a spatial relation to the real environment,
c) determining at least one imaging parameter according to the at least one provided virtual object property and the at least one provided environment property,
d) generating at least one image of the real environment representing information about light leaving the real environment according to the determined at least one imaging parameter, wherein the light leaving the real environment is measured by at least one camera.

According to another aspect, there is disclosed a system for generating at least one image of a real environment comprising at least one processing device which is coupleable with at least one camera, wherein the at least one processing device is configured to perform the steps as set out above and according to the aspects and embodiments as disclosed in the following.

Aspects of the present invention propose to consider properties of a real environment (e.g. provided by means of a camera image of the environment or by means of the pose of the camera relative to the real environment) and additionally information on a virtual object with a spatial relation to the real environment when determining imaging parameters to generate at least one image of the real environment. Thereby, needs of a well-suited image for visualization can be considered as well as needs of a well-suited image for camera pose determination. In particular, in aspects of the invention, the image capturing process of the real environment is influenced and thereby the appearance of the captured image of the real environment is influenced by incorporating information on a virtual object with a spatial relation to the real environment.

Therefore, imaging parameters for camera images which may be used in Augmented Reality applications are determined not only according to properties of the real environment, but also according to a virtual object. On the other hand, if imaging parameters are determined to result in images best-suited for visualization (combined with a virtual object) and the same image is used for camera pose determination, then this might result in a deterioration or a failure of the camera pose determination if the resulting image is not well-suited for pose determination. This may limit the freedom of configuring imaging parameters, such as the camera focus, for the image of the real environment to be used for visualization as well as for pose determination. Thereby, some benefits that arise when choosing imaging parameters for the respective tasks individually cannot be taken advantage of. Especially cameras do only consider the imaged real environment when determining imaging parameters, but do not incorporate knowledge about any virtual object which alters the appearance of the image. The present invention, however, may adapt an appearance of the real environment in an image according to properties of a virtual object.

The imaging parameters mentioned above are exemplary and there are many more that can be used to control an appearance of a real environment in an image. Whenever this disclosure discusses imaging parameters, this refers to all possible parameters as disclosed and all combinations thereof and is not limited to, e.g., focal distance, depth of field, and exposure time.

Any steps, embodiments, aspects and examples described herein with respect to the method can equally or analogously be implemented by the at least one processing device (such as one or more microprocessors) being configured (by software and/or hardware) to perform the respective steps, embodiments, aspects or examples. Any used processing device, such as one or more microprocessors, may be configured as such by software and/or hardware and communicate via a communication network, e.g. via a server computer or a point to point communication, with one or more cameras, displays, sensors and/or any other components disclosed herein. When it is referred herein in this disclosure to a processing apparatus or process apparatus, such processing apparatus or process apparatus may comprise one or more processing devices, which may be implemented as described herein.

According to another aspect, the disclosure is also related to a computer program product comprising software code sections which are adapted to perform a method according to the invention, particularly as set out in any one of the claims. Particularly, the software code sections are contained on a computer readable medium which is non-transitory. The software code sections may be loaded into the memory of one or more processing devices (such as microprocessors) as described herein. Any used processing devices, such as one or more microprocessors, may communicate via a communication network, e.g. via a server computer or a point to point communication, with other devices as described herein.

For example, the at least one processing device according to the present disclosure, which may comprise one or more processing devices such as one or more microprocessors, is comprised, at least in part, in a mobile device (such as a mobile phone, wearable computer, tablet computer, mobile computer, often called laptop, or a head mounted display, such as used for optical see-through augmented reality applications), and/or in a server computer adapted to communicate with the mobile device. The at least one processing device may be comprised in only one of these devices, e.g. in the mobile device or in the server computer, or may be a distributed system in which one or more processing tasks are distributed and processed by one or more processing devices of a processing system which are distributed and are communicating with each other, e.g. by point to point communication or via a network.

In an embodiment, the step of generating at least one image of the real environment comprises a first step of measuring light and generating measured light data therefrom, and a second step of processing the measured light data into an image.

In an embodiment the generated at least one image only contains information related to the real environment.

In an embodiment, the generated at least one image of the real environment is at least one first image, and the at least one environment property is determined according to pixel information of at least one second image of the real environment captured by the at least one camera.

Particularly, the at least one second image of the real environment is captured by the at least one camera before the at least one first image is generated.

In an embodiment, the provided environment property comprises at least one or more of: brightness, distance, position and orientation, at least one of which measured by at least one or more of: a light sensor, orientation sensor, positioning sensor, and distance sensor.

In an embodiment, step d) comprises measuring incident light from the real environment by the at least one camera according to the at least one imaging parameter, and processing the measured incident light into pixel values of the at least one image.

Particularly, the step of measuring the incident light comprises configuring at least one optical component of the at least one camera according to the at least one imaging parameter. Further, the at least one optical component may comprise at least one or more of: a lens, aperture, and shutter.

In an embodiment, the at least one imaging parameter comprises at least one or more of: a focus distance, focal length, lens position, aperture, aperture size, shutter time, exposure time, sensor sensitivity, gain.

In an embodiment, step d) comprises measuring incident light from the real environment by the at least one camera, and processing the measured incident light into pixel values of the at least one image according to the at least one imaging parameter.

In an embodiment, the at least one imaging parameter comprises at least one or more of: a post focus, blurriness, sharpness, tone mapping, In an embodiment, step d) comprises measuring incident light from the real environment by the at least one camera according to at least part of the at least one imaging parameter, and processing the measured incident light into pixel values of the at least one image according to at least part of the at least one imaging parameter.

In an embodiment, the at least one virtual object property includes at least one or more of: at least part of a pose of the virtual object relative to the at least one camera, at least part of a pose of the virtual object relative to at least part of the real environment, a visual property of the virtual object, a geometrical property of the virtual object, and a property describing how the virtual object influences the at least one imaging parameter, for example how it should pull the focus of the at least one camera or the virtual object should be brighter than anything in the environment.

In an embodiment, the at least one environment property includes at least one or more of: at least part of a pose of at least part of the real environment relative to the at least one camera, at least part of a pose of at least part of the real environment relative to the virtual object, a visual property of the real environment, a geometric property of the real environment In an embodiment, the at least one imaging parameter includes at least one or more of: a focus, exposure time, flash settings, torch settings, ISO, dynamic range, lens position, Device's Configuration, (Color) Formats, Focus Settings, Exposure Settings, Zoom Settings, Flash Settings, Torch Settings, Low Light Settings, Frame Rate Settings, Subject Area, Device Characteristics, Lens Position, Image Exposure, White Balance, ISO, High Dynamic Range Video, resolution, framerate, shutter mode, bit depth, gamma correction, black level adjustment, noise reduction, edge enhancement, constrast enhancement, false chroma suppression, chroma subsampling, chroma resampling, color transformation, image compression, rolling shutter.

In a further embodiment, the at least one imaging parameter includes at least one or more of: debayering, Filter Pattern Compensation, Rolling shutter compensation, sensor offset bias correction, pixel defects correction, lens shading (vignetting) compensation (optical vignetting, pixel vignetting), dark frame subtract, white balance, demosiac, denoise/sharpen, gamma correction, color space conversion, chroma subsampling, compression, quantization, tone mapping, blooming, blurring, defocus, convolution, deconvolution, filtering, NPR, toon shading, halftoning, silhouette rendering.

In an embodiment, step c) comprises determining at least one value for the at least one imaging parameter.

In an embodiment, step c) comprises determining a type of the at least one imaging parameter according to the at least one virtual object property.

In an embodiment, the at least one imaging parameter comprises at least one pose determination imaging parameter and at least one visualization imaging parameter. Preferably, the at least one image comprises at least one pose determination image generated based on measurements of the at least one camera according to the at least one pose determination imaging parameter, and at least one visualization image generated based on measurements of the at least one camera according to the at least one visualization imaging parameter.

Particularly, the step d) further comprises measuring incident light from the real environment by the at least one camera according to the at least one pose determination imaging parameter and the at least one visualization imaging parameter, processing at least part of the measured incident light into pixel values of the at least one pose determination image according to the at least one pose determination imaging parameter, and processing at least part of the measured incident light into pixel values of the at least one visualization image according to the at least one visualization imaging parameter.

In an embodiment, the method further comprises determining at least part of a camera pose of the at least one camera relative to at least part of the real environment according to the at least one pose determination image, and overlaying the virtual object on the at least one visualization image according to the determined at least part of a camera pose.

In an embodiment, the at least one visualization imaging parameter comprises a first focus parameter comprising at least one of focus distance, depth of field, focal plane, the at least one virtual object property comprises a position or distance of the virtual object relative to the at least one camera, and wherein the first focus parameter is determined according to the position or distance of the virtual object relative to the at least one camera.

In an embodiment, the at least one pose determination imaging parameter comprises a second focus parameter, the at least one environment property comprises a position or distance of at least part of the real environment relative to the at least one camera, and wherein the second focus parameter is determined according to the position or distance of at least part of the real environment relative to the at least one camera.

In an embodiment, the at least one visualization imaging parameter comprises a first point of view parameter and/or a first viewing direction parameter, the at least one virtual object property comprises at least part of a pose of the virtual object relative to the at least one camera, and wherein the first point of view parameter and/or the first viewing direction parameter is determined according to the at least part of the pose of the virtual object relative to the at least one camera.

In an embodiment, the at least one pose determination imaging parameter comprises a second point of view parameter and/or a second viewing direction parameter, the at least one environment property comprises at least part of a pose of at least part of the real environment relative to the at least one camera, wherein the second point of view parameter and/or the second viewing direction parameter is determined according to the at least part of the pose of the at least part of the real environment relative to the at least one camera.

In an embodiment, the at least one visualization imaging parameter comprises a first focal length parameter, the at least one virtual object property comprises a geometrical property of the virtual object, wherein the first focal length parameter is determined according to the geometrical property of the virtual object.

In an embodiment, the at least one pose determination imaging parameter comprises a second focal length parameter, the at least one environment property comprises a relative velocity between the at least one camera and at least part of the real environment and/or at least part of a pose of at least part of the real environment relative to the at least one camera, wherein the second focal length parameter is determined according to the relative velocity and/or the at least part of the pose of the least part of the real environment relative to the at least one camera.

In an embodiment, the at least one visualization imaging parameter comprises at least one or more of: a first aperture, film speed (sensitivity)/gain, white balance, dynamic range, and exposure time parameter, the at least one virtual object property comprises brightness and/or colors of the virtual object, wherein at least one or more of the first aperture, film speed (sensitivity)/gain, white balance, dynamic range, and exposure time parameter is determined according to the brightness and/or colors of the virtual object.

In an embodiment, the at least one pose determination imaging parameter comprises at least one or more of: a second aperture, film speed (sensitivity)/gain, white balance, dynamic range, and exposure time parameter, the at least one environment property comprises brightness and/or colors of at least part of the real environment, wherein at least one of the second aperture, film speed (sensitivity)/gain, white balance, dynamic range, and exposure time parameter is determined according to the brightness and/or colors of the at least part of the real environment.

In an embodiment, the at least one camera is a light field camera and captures at least one light field dataset, wherein the at least one pose determination imaging parameter is used to generate the at least one pose determination image of the real environment based on the at least one light field dataset, and the at least one visualization imaging parameter is used to generate at least one visualization image of the real environment based on the at least one light field dataset.

In an embodiment, the at least one camera comprises a pose determination camera and a visualization camera, and wherein the step d) comprises generating the at least one pose determination image representing information about light leaving the real environment measured by the pose determination camera according to the determined at least one pose determination imaging parameter, and generating the at least one visualization image representing information about light leaving the real environment measured by the visualization camera according to the determined at least one visualization imaging parameter.

In an embodiment, the at least one imaging parameter comprises a focus parameter, the at least one virtual object property comprises a position or distance of the virtual object relative to the at least one camera, the at least one environment property comprises a position or distance of at least part of the real environment relative to the at least one camera, and wherein the focus parameter is determined according to the position or distance of the virtual object relative to the at least one camera and the position or distance of the at least part of the real environment relative to the at least one camera.

In an embodiment, the at least one imaging parameter comprises a point of view parameter and/or a viewing direction parameter, the at least one virtual object property comprises at least part of a pose of the virtual object relative to the at least one camera, the at least one environment property comprises at least part of a pose of at least part of the real environment relative to the at least one camera, wherein the point of view parameter and/or the viewing direction parameter is determined according to the at least part of the pose of the virtual object relative to the at least one camera and the at least part of the pose of the at least part of the real environment relative to the at least one camera.

In an embodiment, the at least one imaging parameter comprises a focal length parameter, the at least one virtual object property comprises a geometrical property of the virtual object, the at least one environment property comprises a relative velocity between the at least one camera and at least part of the real environment and/or at least part of a pose of at least part of the real environment relative to the at least one camera, wherein the focal length parameter is determined according to the relative velocity and/or the at least part of the pose of the least part of the real environment relative to the at least one camera and according to the geometrical property of the virtual object.

In an embodiment, the at least one imaging parameter comprises at least one or more of: an aperture, film speed (sensitivity)/gain, white balance, dynamic range, and exposure time parameter, the at least one virtual object property comprises brightness and/or colors of the virtual object, the at least one environment property comprises brightness and/or colors of at least part of the real environment, wherein at least one or more of the aperture, film speed (sensitivity)/gain, white balance, dynamic range, and exposure time parameter is determined according to the brightness and/or colors of the at least part of the real environment and according to the brightness and/or colors of the virtual object.

BRIEF DESCRIPTION OF THE DRAWINGS

Aspects and embodiments of the invention will now be described with respect to the drawings, in which:

FIG. 7 illustrates another embodiment of the present invention, FIG. 10 illustrates three different potential setups related to embodiments of the present invention, FIG. 12 shows a flow diagram of a data flow for a system that comprises only one light measure apparatus according to an embodiment of the invention, FIG. 13 shows a similar flow diagram of a data flow as FIG. 12, with an embodiment in which the system comprises only one light measure apparatus according to an embodiment of the invention, FIG. 15 illustrates different embodiments of the present invention related to the way how light is measured by a real world acquisition apparatus (or part of it) to determine imaging parameters based on the appearance of the real environment.

DETAILED DESCRIPTION

Figure 1:
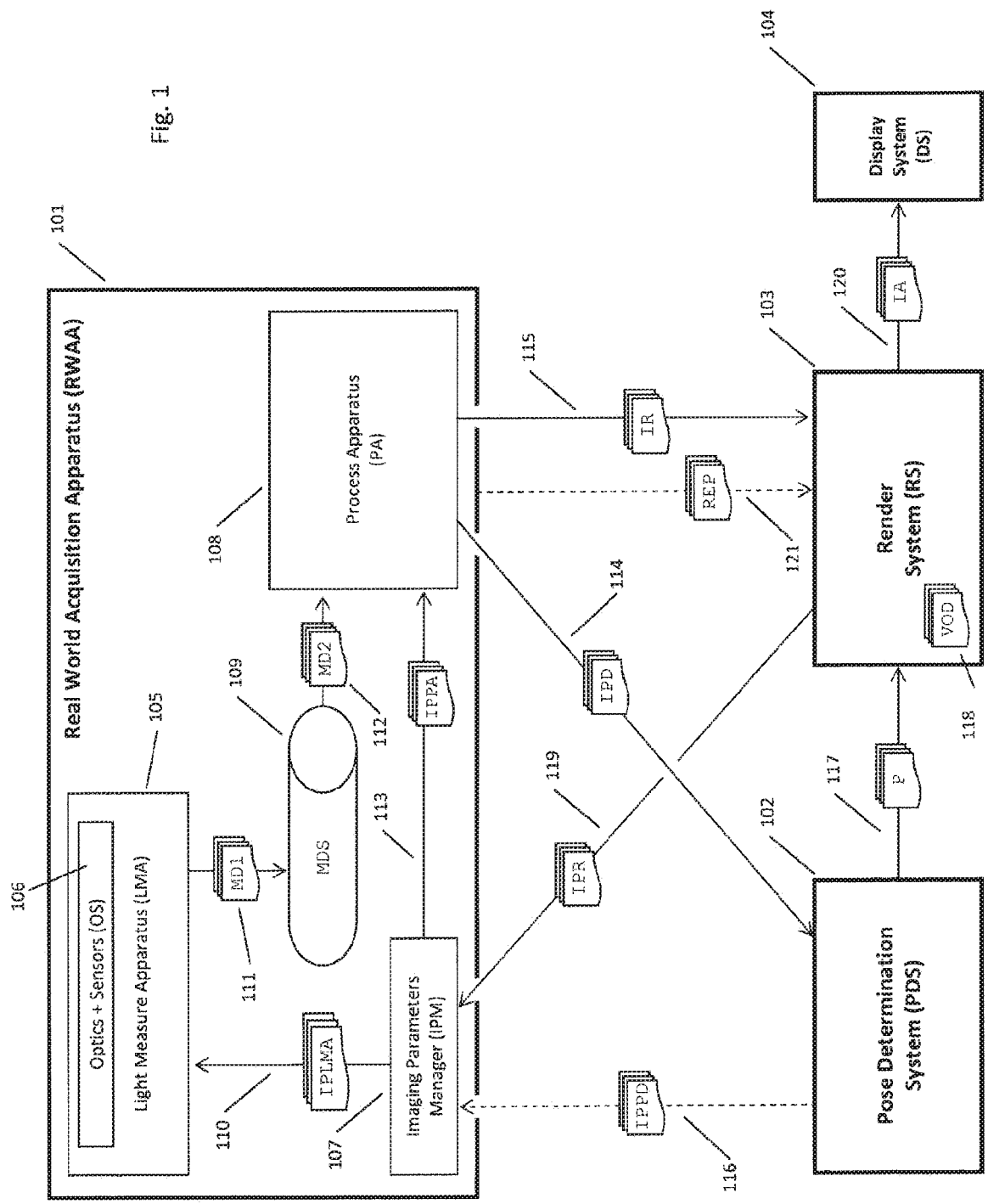
FIG. 1 illustrates an embodiment of a system setup which may be used in connection with the present invention.

Usually, camera pose determination and superimposing a camera image with a virtual object for visualization are basic aspects of video see-through Augmented Reality (AR). As discussed above, both aspects can benefit when provided with images that are generated with imaging parameters according to their respective needs. Common methods ignore this fact and instead use an image that is generated with imaging parameters that make the image visually appealing. Furthermore, a well-suited image for camera pose determination may require different image parameters than a well-suited image for visualization and the parameters may be incompatible with each other.

The present invention aims at solving this problem. Aspects thereof make use of a real-world capture apparatus (also referred to as "camera") which is configured with imaging parameters that are dependent both on properties of the real environment and on properties of a virtual object. This camera can then, depending on the embodiment, generate a single image or multiple images.

A single image can thereby represent a tradeoff between a desired image for pose determination and a desired image for visualization. Such image may then be used both for camera pose determination and for visualization. In other embodiments, two images are generated by the camera, wherein a first image is generated according to first imaging parameters which are well suited for camera pose determination and a second image is generated according to second imaging parameters which are well suited for visualization of the image with a virtual object superimposed. The second imaging parameters thereby may for example depend on the position of the virtual object.

In one embodiment, the real-world capture apparatus comprises a light field camera. A light field camera may not only generate a single conventional 2D image of an environment, but it may measure higher dimensional information about the light distribution within the real environment. This allows for synthetically generating 2D images from the measured data after it was measured. This image generation can consider different imaging parameters, e.g. focal planes, which enables generating multiple images of the same environment at the same point in time with different focal planes or with different viewpoints, see Ng, et al., Light Field Photography with a Hand-held Plenoptic Camera. Stanford Tech Report CTSR 2005-02 (2005) ("Ng") and Levoy.

Therefore it analogously enables extracting different conventional 2D images from a single light field dataset and using a first generated image for camera pose determination and a second generated image for visualization in an Augmented Reality application, where the first and the second image may differ in terms of focus or point of view.

Employing a light field camera for video-see through AR and decoupling the image generation for camera pose determination and visualization therefore solves the problem mentioned above and allows using well-suited images for both tasks, respectively. This may improve the camera localization (e.g. in terms of robustness, precision, accuracy, or invariance) as well as the visual impression of the augmented image as a result of a well-suited image for visualization.

Generating an image of the real environment well-suited for visualization according to properties of a virtual object provides various benefits. It allows setting the focus for the visualization of the real environment to particular parts of the real environment in accordance to the position of the virtual object and the information to be presented. This allows employing a selective focus to highlight or emphasize particular points or parts in the displayed image of the real environment and to employ focus in a narrative as well as artistic way as for example shown in FIG. 4.

Figure 5:
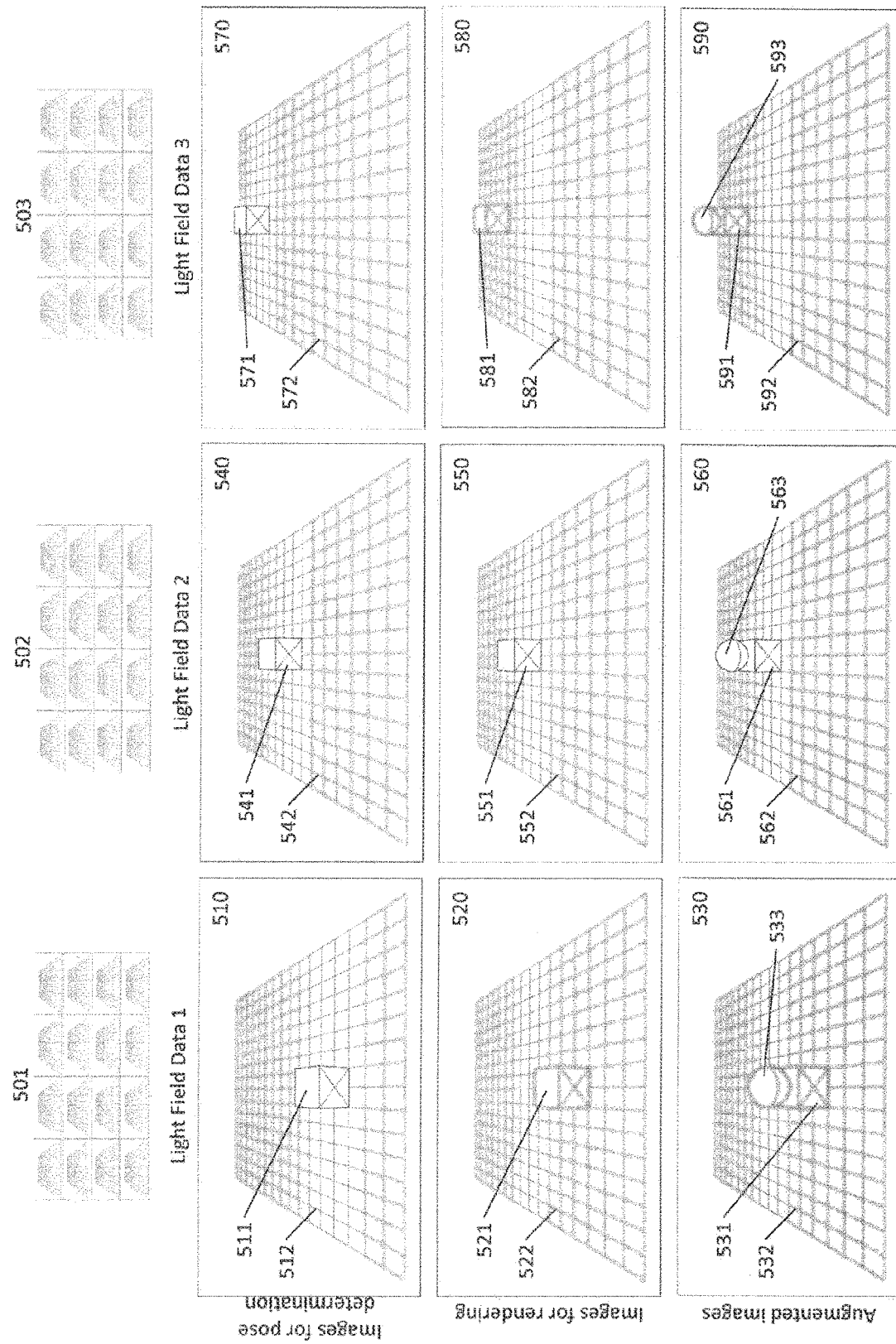
FIG. 5 shows three different light field datasets and corresponding images which are processed from light field data for pose determination as well as images which are processed for visualization according to embodiments of the invention.

Being provided with control over imaging parameters, that influence e.g. the distance at which the real environment is imaged in focus, also implicates knowledge of the imaging parameters. This in turn enables rendering virtual objects consistently with the real environment, e.g. in terms of brightness or focus as shown in FIG. 5.

Particularly, exposure time is a notable imaging parameter. Controlling it enables to generate images of the real environment in which the part of the real environment in which a virtual object is located is imaged well illuminated and contrasty, as for example shown in FIG. 7.

Determining imaging parameters for generating an image of a real environment under consideration of a virtual object may in one embodiment also be understood as follows. Instead of automatically adjusting imaging parameters such as white balancing, focus, and exposure according to a camera image of the real environment (as being performed by auto white balancing, auto focus, or auto exposure methods), an embodiment of the present invention considers an image of the real environment and a virtual object instead. Thereby, if for example a very bright virtual object is added to the scene, the exposure time would be decreased in the same way auto exposure would behave if the very bright object was real, see FIG. 8.

Besides the benefit the present invention provides to the visualization of an image of a real environment superimposed with a virtual object, it also considers requirements for visual camera pose determination and thereby ensures working camera pose determination, which is crucial for Augmented Reality applications.

Figure 6:
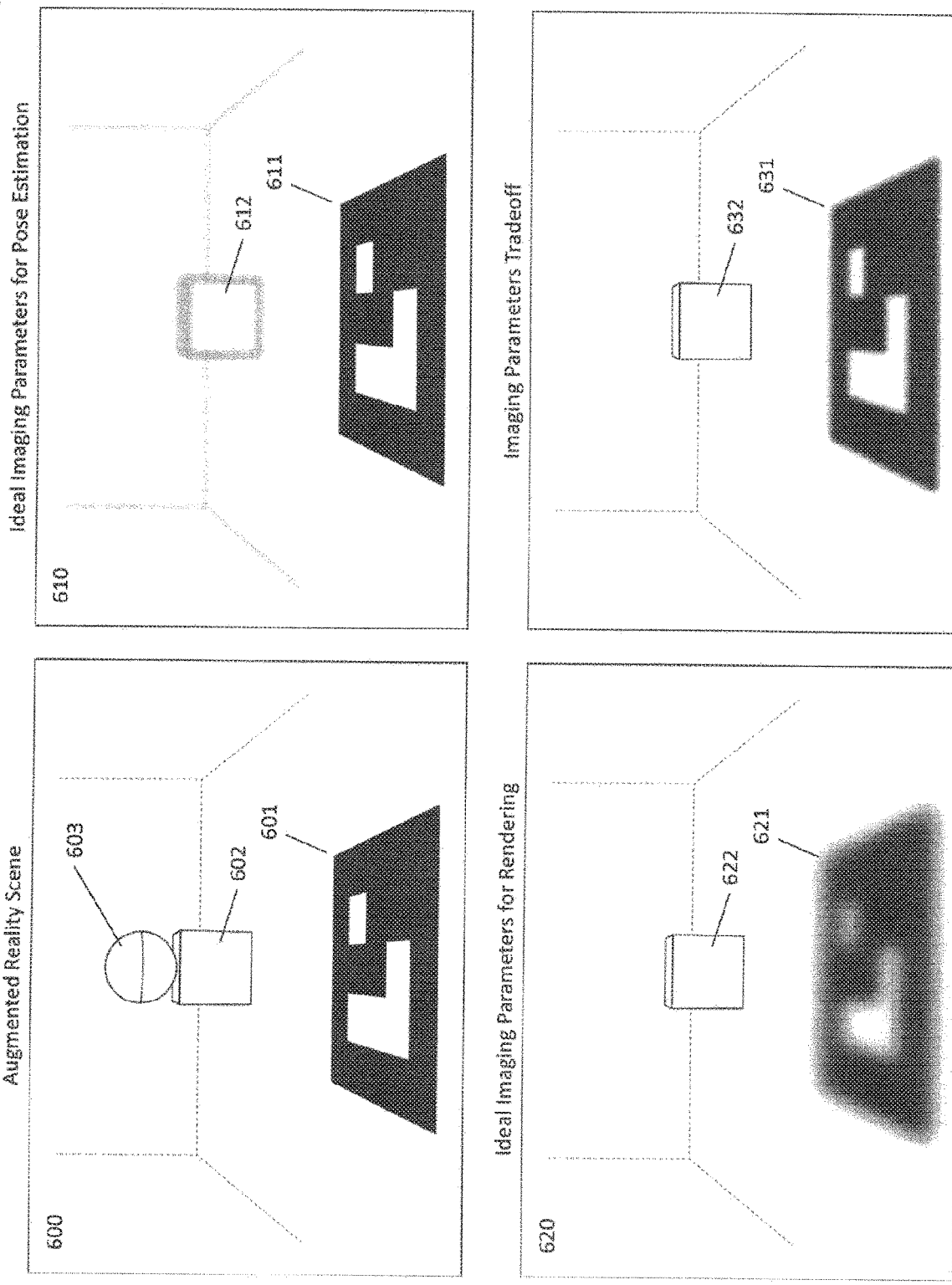
FIG. 6 illustrates another embodiment of the present invention.

In embodiments which allow for decoupling the images and for generating two separate images with different imaging parameters, one for camera pose determination and the other one for visualization, both visualization and pose determination can benefit from the present invention, as for example shown in FIG. 6 and FIG. 7, where the imaging parameters for generating the image of the real environment to be used for pose determination are determined such that the resulting image is particularly well suited for camera pose determination.

In some embodiments of the present invention, however, not two separate images but only a single image is generated, so that the imaging parameters cannot be fully decoupled. This single image is then used for both camera pose determination and visualization. It should be noted that even then the method presented in here clearly provides advantages over common approaches. This is because the imaging parameters used to generate the image, which is a tradeoff between a well-suited image for visualization and a well-suited for pose determination, explicitly consider the needs of both the visualization as well as the pose determination method, as opposed to common approaches.

The following discusses in which way Augmented Reality applications can benefit from embodiments of the present invention using different imaging parameters.

Control over focus-related imaging parameters, such as the focus distance, the focus plane, or depth of field, can be beneficial for images used for visualization, because it makes it possible to set the focus in the image of the real environment to the distance where the virtual object will be rendered to, and optionally set the remaining part of the real environment out-of-focus.

Control over focus-related imaging parameters, such as the focus distance, the focus plane, or depth of field, can be beneficial for images used for pose determination, because it makes it possible to set the focus plane to a distance at which the most reliable features for camera pose determination are expected to be. For example, features that are far away may be suited when tracking camera orientation only, while features of parts of the real environment that are close to the camera may be most reliable for methods that perform triangulation of features to determine their depth, e.g. SLAM methods.

Control over spatial imaging parameters, such as point of view or viewing direction, can be beneficial for images used for visualization, because it makes it possible to choose a point of view or view direction such that a virtual object best visible in the augmented image, e.g. most frontal, or visible from a particular direction, or to keep a virtual object in a desired part of the image, e.g. always in the central region of the image.

Control over spatial imaging parameters, such as point of view or viewing direction, can be beneficial for images used for pose determination, because it makes it possible to keep reliable features visible that might otherwise be occluded by other parts of the real environment or outside the field of view and therefore invisible.

Control over imaging parameters, such as field of view (e.g. zoom), can be beneficial for images used for visualization, because it makes it possible to adapt the zoom to the size and distance of a virtual object, e.g. such that it has a desired size in the augmented image, e.g. that its height corresponds to half the height of the camera image.

Control over imaging parameters, such as field of view (e.g. zoom), can be beneficial for images used for pose determination, because it makes it possible to zoom to reliable features for tracking or to zoom in to determine the camera pose more accurately during slow camera motion and to zoom out, i.e. increase the field of view, to determine the camera pose more robustly during fast camera motion.

Control over brightness-related imaging parameters, such as aperture, gain, exposure time, dynamic range, can be beneficial for images used for visualization, because it makes it possible to set these parameters like they would be set if the virtual object would be really part of the real-world and its appearance would influence the imaging parameter of the capture apparatus, e.g. using auto-exposure. For example a very bright virtual object may lead to a small aperture setting, low film speed or a short exposure time, which will lead to a darker background image of the real-world. Depending on the brightness and colors of virtual objects also the white balance and tone mapping from dynamic range can be influenced accordingly.

Control over brightness-related imaging parameters, such as aperture, gain, exposure time, dynamic range can be beneficial for images used for pose determination, because it makes it possible to set them so that the features in the real environment that should be used for visual camera pose determination are imaged contrasty. For example when tracking bright points, setting the exposure time low would result in images with bright points and everything else nearly black, which simplifies the localization of the points in an image significantly.

The influence of a virtual object and its 3D position on imaging parameters can be for example depended on visibility of the 3D position, distance of the 3D position to the camera, viewing direction of the camera to the 3D position and the state/progress within the movie script for that 3D position. The influence of multiple 3D positions can be combined by for example weighted averaging or summing up.

When a tradeoff needs to be found between different imaging parameters, the compromise imaging parameters may be chosen to best give consideration to the request of both camera pose determination and visualization. This can be done by weighting the different requests, by letting each part define valid ranges, or by giving priority to one of both.

In detail, a separation into at least two separate images with camera parameters (e.g. foci or points of view) specified by a pose determination system and a rendering system provides the following benefits:

Extracting a designated image for tracking allows exploiting the particular needs of different tracking approaches. For example certain methods may require prioritizing and setting the focus to near surfaces and features. This is the case for structure-from-motion-based approaches that need to establish a sufficient parallax (and baseline) to estimate the structure, i.e. depth, of imaged features, e.g. to initialize a SLAM system. Other approaches may work particularly well with distant surfaces and features—for example a panorama tracking approach. It might also be beneficial to set the whole scene in focus for some particular tracking approaches.

The desired parameters of an image extracted from light field data may also depend on information from a previous point in time, e.g. the previous video frame. If visual tracking of an object in the scene is performed, the distance of this object to the camera in a previous camera image can be determined and used to control the focus of the image extracted from the light field data. The focus could be set such that it corresponds to the distance of the object, or parts of the object, in the previous image. Furthermore any motion model could be used to predict the distance of the object to the camera in the current image. Analogously, the previous above can be applied to individual parts of the object (with different distances to the scene) individually, affecting the focus of different regions of the camera image individually. For example if an object that is tracked is planar and the plane it was located on in the previous frame is known, an image could be extracted from the light field data, which has this plane in focus. Note that this plane is not necessarily parallel to the image plane. Another example could be setting the focus based on the predicted 3D location of features which are rated well suited for tracking by the pose determination system.

Further embodiments of the present invention are described in the following according to the embodiments as shown in FIGS. 1 to 15.

FIG. 1 illustrates an embodiment of a system setup comprising a Real World Acquisition Apparatus, RWAA (101), a Pose Determination System, PDS (102), a Render System, RS (103), and a Display System, DS (104). The RWAA (101) itself contains a Light Measure Apparatus, LMA (105) equipped with Optics and Sensors, OS (106), an Imaging Parameters Manager, IPM (107), a data storage, MDS (109) for the measured data, and a Processing Apparatus, PA (108). All or some of these components may be implemented using one or more microprocessors.

The RWAA may be completely implemented as a camera system. In another example, a part of the RWAA may be implemented in a camera system. For instance, only the parts of LMA (105), MDS (109) and PA (108) are implemented in the camera. It is also possible that a camera system comprises the RWAA as one of its components. Also it is possible that some parts of the PA (108) and/or IPM (107) are part of a camera, while other parts of the PA (108) and/or IPM (107) are not.

The components (e.g. LMA (105), MDS (109), OS (106), IPM (107), and PA (108)) of the RWAA may communicate with each other via cable or wirelessly, directly or indirectly, e.g. via a server computer.

All of the components disclosed in FIG. 1 may be implemented by a system comprising at least one camera device and at least one processing device. The at least one camera device may comprise at least one of a light field camera and non-light filed camera (also called conventional cameras). The at least one processing device may comprise at least one of a mobile device (e.g. mobile phone, tablet), a desktop computer, and a server computer. The at least one camera device and the at least one processing device may communicate via cable or wirelessly, directly or indirectly. A light field camera may be implemented by multiple conventional cameras placed at different positions. In one embodiment, the RWAA (101) is implemented as a camera system, and the PDS (102), the RS (103) and the DS (104) may be comprised in a processing device.

Any step or method disclosed herein may be executed by one or more processing devices (such as one or more microprocessors) of at least one camera and/or at least one processing device, which may include a network of computers and/or, e.g., a server computer which is remote from the camera.

In one example, all of the components (or parts thereof) disclosed in FIG. 1 may be implemented in a mobile device equipped with a camera (e.g. a mobile phone or a tablet). In another example, all of the components (or parts thereof) disclosed in FIG. 1 may be implemented in a light field camera device. In a further example, all of the components (or parts thereof) disclosed in FIG. 1 may be implemented in a light field camera device coupled with a processing device.

The LMA (105) measures data about the incoming light from the Real World using the OS (106). The IPM (107) is responsible to set (110) the imaging parameters IPLMA for the LMA (105) that influence the data that is measured by the LMA (105) about the incoming light from the Real World. The IPM (107) for example may determine and set the focus distance used by the LMA (105) during measuring.

The data MD1 about the light incoming from the Real World is measured by the OS (106) of the LMA (105) and it is transferred (111) to and (at least temporarily) stored in the MDS (109). The MDS (109) transfers (112) at least a part MD2 of its stored data to the PA (108). The PA (108) processes the data MD2 and assembles images out of the data MD2 (potentially) considering imaging parameters IPPA delivered (113) by the IPM (107). The IPM (107) for example may determine and set the focus distance or the tone mapping used by the PA (108) during processing the measured data into the final images of the real world. The IPM (107) sets (110, 113) at least one of the imaging parameters IPLMA and IPPA. The resulting images, i.e. the image IPD for pose determination and the image IR for visualization, are transferred (114, 115) from the PA (108) to the PDS (102) as well as the RS (103). (IPD and IR may potentially also be the same image.)

The RWAA (101) may optionally also transfer (121) additional information about the real environment, also referred to as environment property REP related to the real environment, to the RS (103).

The PDS (102) processes the image IPD received (114) from the PA (108) and determines the camera pose according to the information in image IPD. The PDS (102) may optionally specify and transfer (116) imaging parameters IPPD to the IPM (107). The imaging parameters IPPD are specified by the PDS (102) according to the current determined camera pose and/or potentially its history as well as potentially according to characteristics of the PDS (102). Characteristics of the PDS depend on the particular method used for determining the camera pose according to the information in image IPD. Characteristics of the pose determination method characteristics could for example include a preferred focal distance e.g. that only parts of the real environment should be imaged sharply that are close to the camera or that only parts of the real environment should be imaged sharply that are far away from the camera or that all parts of the environment should be imaged sharply. Other characteristics of the pose determination method could include requirements on the sharpness of the image of the part of the real environment relative to which the camera pose shall be determined, e.g. that the respective part should be imaged sharply with a point spread function smaller than a pixel. Other characteristics of the pose determination method include requirements on the contrast of the image of the part of the real environment relative to which the camera pose shall be determined, e.g. that the difference between the intensity of the brightest pixel and the intensity of the darkest pixel is greater than a given threshold. The PDS (102) also transfers (117) the determined pose P to the RS (103).

The RS (103) contains a virtual object description VOD (118). The VOD (118) specifies properties of one or more virtual objects for example comprising digital models describing the geometry of the virtual objects. The properties may include information about parts of a virtual object like for example luminance values of the visual appearance or 3D positions of the matter of that part. The properties may additionally describe how a virtual object property shall influence an image in terms of imaging parameters like for example focus or exposure. The RS (103) specifies and transfers (119) imaging parameters IPR to the IPM (107). The imaging parameters IPR are specified by the RS (103) according to the current camera pose P and/or potentially its history, as well as the VOD (118) and preferences of the RS (118). The distance of an object of the virtual scene to the camera, which is determined from the VOD and the pose P, may for example influence image parameters for focus. The preference of the RS (118) could for example be an all-in-focus image when the render engine itself does not support defocus rendering of virtual objects.

The RS (103) may use environment properties REP related to the real environment. In an example the REP could be a brightness information from an image of the real environment or from additional sensors of the LMA (105) which then is used as additional input by the RS (103) for specifying the imaging parameters IPR for the exposure time of the next image.

The IPM (107) receives (116, 119) the requested imaging parameters IPPD and IPR and processes them in order to define imaging parameters IPLMA and/or IPPA, which then are used for light measuring and for processing respectively.

The RS (103) also combines the image IR received (115) from the PA (108) with a computer generated rendering according to P and VOD (118) into an augmented image IA, which is transferred (120) to and displayed on the display system DS (104).

A real-world acquisition apparatus (RWAA) may be implemented differently in different embodiments. In one embodiment the RWAA comprises a digital camera. In another embodiment the RWAA comprises a light field camera (e.g. an array of cameras, or an array of lenses in front of an imaging sensor, or any other implementation). In another embodiment the RWAA comprises a plenoptic camera (e.g. an array of cameras, or an array of lenses in front of an imaging sensor, or any other implementation). In another embodiment the RWAA comprises a passive stereo camera. In another embodiment the RWAA comprises an active stereo camera (e.g. using structured light, or using time-of-flight). In another embodiment the RWAA comprises a camera with high-frequently varying focal plane. In another embodiment the RWAA comprises a high dynamic range (HDR) camera (e.g. using multiple exposures, or using an HDR sensor). In another embodiment the RWAA comprises a monocular camera (and a surface model of at least part of the real environment). In another embodiment the RWAA comprises a monocular camera (that allows for control over at least one imaging parameter). In another embodiment the RWAA comprises any configuration of optics and sensors that measures light rays.

In one embodiment a real environment comprises a real object, i.e. an object that has a physical geometric shape in the real world. In another embodiment a real environment is an arrangement of a plurality of real objects. In another embodiment a real environment is an interior of a room or a vehicle. In another embodiment a real environment is an outdoor scenario.

A principal component of embodiments of this invention is a light measure apparatus. In one embodiment a light measure apparatus comprises an image sensor. In another embodiment a light measure apparatus comprises one of a semiconductor charge-coupled device (CCD), an active pixel sensor in complementary metal-oxide-semiconductor (CMOS), or an N-type metal-oxide-semiconductor (NMOS, Live MOS). In another embodiment a light measure apparatus comprises an image sensor. In another embodiment a light measure apparatus comprises at least one image sensor element.

According to an embodiment a light measure apparatus comprises a photodetector.

Photodetectors are typically sensors that allow measuring an "amount" of light incident on the sensor. They convert energy of incident light (photons) into photocurrent and finally allow to read out voltage. The energy of the multitude of light rays striking the sensor, also known as cell, thereby is physically integrated depending on light ray characteristics like wave length, incident direction and location on the cell over a particular range in time (called exposure time). A resulting value (typically voltage) represents the sensor/radiant exposure which is measured in $J/m^2=W*s/m^2$ resulting from the sensor irradiance over the time of exposure. The thus measured irradiance (measured in $W/m^2$) is the power (energy divided by time) of all the light incident on the sensor (compensated by sensor size), and does not well describe the variety in light power in the distribution of light striking the sensor with respect to incident direction and location on the sensor.

According to an embodiment, a processing device is a processor, a microprocessor, a coprocessor, a central processing unit (CPU), a graphics processing unit (GPU), a digital signal processor (DSP), an application-specific instruction-set processor (ASIP), an application-specific integrated circuit (ASIC), or a digital signal processor (DSP), or any combination of the previous, which is configured to generate digital images based on provided measurements.

In another embodiment, a processing device is a processor, a microprocessor, a coprocessor, a central processing unit (CPU), a graphics processing unit (GPU), a digital signal processor (DSP), an application-specific instruction-set processor (ASIP), an application-specific integrated circuit (ASIC), or a digital signal processor (DSP), or any combination of the previous, which is configured to generate digital images based on provided images, wherein the generated images differ from the provided images.

In one embodiment, a processing device is configured to implement, simulate or manipulate at least one imaging parameter, such as focus, post focus, focus settings, lens position, focal plane, depth of field, focus distance, depth of focus, focus spread, sharpening, blurring, brightness, contrast, exposure time, shutter time, shutter mode, shutter settings, exposure settings, aperture, film speed, sensitivity, gain, ISO, low light settings, point of view, viewing direction, camera projection properties, focal length, field of view, zoom settings, region of interest, image cropping, extraction of picture elements, subject area, tone mapping, white balance, saturation, gamma correction, black level adjustment, quantization, filtering, noise reduction, edge enhancement, contrast enhancement, false chroma suppression, chroma subsampling, chroma resampling, color transformation, image compression, debayering, color space conversion, demosiac, blooming, convolution, deconvolution, filtering, NPR, toon shading, half toning, silhouette rendering, compensation, filter pattern compensation, rolling shutter compensation, sensor offset bias correction, pixel defects correction, lens shading (vignetting) compensation, dark frame subtraction, dynamic range, color format, bit depth, frame rate, and/or resolution.

In an embodiment, generating images (of the real world) using imaging parameters involves measuring with a light measure apparatus and processing measured data to images with at least one processing device.

In one embodiment, processing data to images according to imaging parameters refers to the process of converting raw measurements of an image sensor (e.g. CMOS or CCD) into an image comprising pixels with intensity values, potentially including steps such as debayering and gamma correction.

In another embodiment, processing data to images according to imaging parameters refers to the process of converting a first image comprising pixels with intensity values into a second image comprising pixels with intensity values, where the intensity values of the second image differ at least in part from the intensity values of the first image.

In another embodiment processing data to images according to imaging parameters refers to changing the brightness, contrast, blurriness, sharpness, or saturation of at least part of a digital image which is the data to be processed into an image.

An aspect of the present invention is related to virtual objects and their properties. In an embodiment, a virtual object is a collection of one or more virtual objects. In an embodiment, a virtual object has a position and orientation and a shape. In an embodiment, a virtual object is an entity comprising virtual object properties. In an embodiment, virtual object properties are specified by a virtual object description. In an embodiment, virtual object description is existent in terms of digital data. In an embodiment virtual object properties comprise a digital model describing the geometry of the virtual object.

In an embodiment, a digital model contains information about luminance values of the visual appearance of the virtual object. In an embodiment, a digital model contains information about the material of the geometry of the virtual object defining the visual appearance of the virtual object in terms of light emission and transport. In an embodiment a digital model contains information about the animation—i.e. change in geometry and appearance over time—of the virtual object. In an embodiment, a digital model contains information about the state within an animation.

In an embodiment object properties comprise information about a particular 3D position of a virtual object. In an embodiment object properties comprise information about a part of a virtual object. In an embodiment object properties comprise information about the whole virtual object. In an embodiment object properties describe what imaging parameters a virtual object property influences. In an embodiment object properties describe how a virtual object property influences particular imaging parameters. In an embodiment object properties describe that a part of a virtual object wants to pull focus. In an embodiment object properties describe that a part of a virtual object wants to be imaged in focus. In an embodiment object properties describe that a part of a virtual object wants to be imaged out of focus. In one embodiment object properties describe that a part of a virtual object wants to be imaged partially blurred. In an embodiment object properties describe that a part of a virtual object wants to be imaged overexposed. In an embodiment object properties describe that a part of a virtual object wants to be imaged underexposed. In an embodiment object properties describe that a part of a virtual object wants to be imaged well exposed. In an embodiment object properties describe that a part of a virtual object wants to be imaged covering a particular range of the available dynamic range of the image.

In an embodiment a part of a virtual object is a certain color range. In an embodiment a part of a virtual object is a certain intensity range.

In an embodiment object properties describe that a part of a virtual object wants to be imaged at a particular region (including out of the field of view of the camera) of the image. In an embodiment object properties describe that a part of a virtual object wants to be imaged at a particular direction (including out of the field of view of the camera) in relation to the camera viewing direction. In an embodiment object properties describe that a part of a virtual object wants to be imaged from a particular direction in relation to virtual object. In an embodiment object properties contain a weight, describing the power of influence of an object property.

In an embodiment the influence of multiple object properties is combined. In an embodiment the combining of the influence of multiple object properties is done using a weighted average.

In an embodiment, a pose of an object in relation to another object is a spatial relationship between the two objects. According to an embodiment, at least one of the two objects of a pose is a camera. In an embodiment, a spatial relationship is a transformation. In an embodiment, a transformation is a rigid body transformation. In an embodiment a transformation is a similarity transformation.

In an embodiment at least part of a pose is any part that can be deducted from a pose. In an embodiment at least part of a pose is a rotation. In an embodiment at least part of a pose is a translation. In an embodiment at least part of a pose is a scale. In an embodiment at least part of a pose is a distance. In an embodiment at least part of a pose is an angle.

Aspects of the present invention disclose a method that influences imaging parameters used for generating an image of the real environment by provided virtual object properties. These properties thereby influence the appearance of the real environment in the image.

Virtual object properties may comprise properties on the desired appearance of a virtual object (or parts thereof) in an image, referred to as image properties of the virtual object, e.g. color in the image, brightness in the image, or blurriness in the image. Example properties may be that a virtual object (or part of it) should have an average hue of 123 in the image, or that it should have an average brightness (i.e. pixel intensity after conversion to grayscale) of 100 in the image. A virtual object property may further be that the virtual object should be rendered sharply or that it should be rendered such that each point has a normal distribution point spread function with a variance of 3 pixels or a circle of confusion with a diameter of 5 pixels. Note that in computer graphics, in principle, any visual appearance of virtual objects can be achieved without knowing anything about physical properties of the virtual object by, for example, just filling a particular pixel with a particular color. But we want the appearance of the real environment in the camera image to be consistent with the appearance of the virtual object in terms of imaging parameters considered for the visualization.

Virtual object properties therefore may further comprise properties on the appearance of virtual objects or parts thereof in absolute physical units, e.g. their dimensions in millimeters, the luminance (or luminous intensity) of light emitted and/or reflected from the (part of the) virtual object in candela, the frequency of light emitted and/or reflected from the (part of the) virtual object in Hz, and/or the wavelength of light emitted and/or reflected from the (part of the) virtual object in mm.

Based on such virtual object properties, imaging parameters (e.g. exposure time or focal length) can be determined which would result in the desired appearance of a virtual object (e.g. brightness or sharpness) in an image which is generated according to the determined imaging parameters and the virtual object properties like luminance or distance to the camera.

An intensity I of a real point captured in a digital image depends on its luminance L, its distance D to the camera that captures the image, the diameter of the camera's aperture A, the exposure time T, and a non-linear mapping function map( ) that for example includes gamma correction (among other things).

A model to describe this dependency is the following equation.

$$I = map(T*A*A*(1/(D*D))*L)$$

Assume the properties of a virtual object include a luminance L and a desired intensity I of the virtual object in an image, and if the distance D of the virtual object to the camera can be determined from the position of the virtual object relative to the real environment and the pose of the camera relative to the real environment, and we use a camera with a fixed aperture of diameter A. Then an embodiment of this invention determines the exposure time T as an imaging parameter by solving the above equation for T as $$T = (invmap(I)*D*D)/(A*A*L)$$

where invmap( ) is the inverse of map( ) In an embodiment the imaging parameter T is then provided to the imaging parameter manager and eventually used to generate an image of the real environment.

In an embodiment, the exposure time T should be less or equal to a maximum exposure time Tmax, e.g. depending on the frame rate. In this embodiment, if the computed T is greater than Tmax, then Tmax is used instead of T and a second imaging parameter, which controls the aperture diameter A, is determined as $$A = (invmap(I)*D*D)/(Tmax*L)$$

to compensate for the fact that T could not be used. Finally both imaging parameters T and A are provided to the imaging parameters manager and eventually used to generate an image of the real environment. Similarly, imaging parameter can be determined to result in an image that exhibits desired image effect in terms of blurriness, according to an embodiment of this invention. The diameter c of the circle of confusion when imaging a point at distance D while the distance of the focus plane is F can be computed as follows given the diameter of the aperture A and the focal length of the lens f.

$$c = A*(|D-F|/(D))*(f/(F-f))$$

Therefore, given a virtual object at distance D=3124 millimeters that should have a circle of confusion of c=0.4 millimeters on the image sensor, there are infinitely many combinations of aperture diameter A and focus distance F that can be chosen to fulfill the image parameters of a virtual object defining a desired appearance in terms of diameter of circle of confusion, i.e. blur, in pixels in the image. A desired diameter of circle of confusion in pixels can be easily converted into the corresponding diameter on the sensor in millimeters, given the size of each pixel on the sensor in millimeters.

In an embodiment the aperture diameter A is set to a constant value and the above equation is solved for the distance of the focus plane F to determine imaging parameters for generating an image of the real environment.

In another embodiment the distance of the focus plane F is set to a constant value and the above equation is solved for the aperture diameter A to determine imaging parameters for generating an image of the real environment.

In another embodiment a combination of distance of the focus plane F and the aperture diameter A that fulfills the above equation is found to determine imaging parameters for generating an image of the real environment.

If virtual object properties comprise that the virtual object should appear sharply in the image, i.e. in focus, then the distance of the focus plane F is set to the distance between the virtual object to the camera for generating an image of the real environment.

All or part of the imaging parameters may have minimum and maximum supported values. For example the maximum supported value of the diameter of an aperture is defined by its mechanics and the minimum supported focus distance is defined by the optical properties of a camera.

In an embodiment, imaging parameters have a constrained range of values which are supported by the real-world capturing apparatus or the light measure apparatus. In such case, determined imaging parameters may be clamped to this range before using them for generating images. If different combinations of imaging parameters can be used to achieve the same desired visual appearance, e.g. aperture diameter and focus distance as in the example above, then an embodiment of the invention chooses a combination in which all determined imaging parameters lie inside their respective supported ranges, or a combination of parameters which requires as little clamping of the values as possible.

In an embodiment, from a space of solutions, the solution is picked that requires the least changes in imaging parameters from initial imaging parameters. For example if the desired appearance of a virtual object is a particular average intensity and an embodiment of the invention is performed sequentially many times after each other so the result would be a sequence of captured images, then it would be possible in the first image to use imaging parameters comprising a short exposure time and a large gain factor, and to use for generating the second image imaging parameters comprising a twice as long exposure time and half the gain factor, and for generating the third image again to use the short exposure time and a large gain factor. The result would be a sequence of images that are consistent in terms of the desired image property, i.e. intensity, but changes heavily in terms of other image properties, such as image noise between the images. This is obviously not desirable.

Therefore, in an embodiment, imaging parameters are determined according to provided virtual object properties and additionally according to imaging parameters that were used for generating a previous image. If a desired visual appearance defined in virtual object properties can be fulfilled by different combinations of imaging parameters, then an embodiment of the invention selects a combination which is the nearest neighbor of the imaging parameters that were used to generate an image previously. Thereby temporal coherence of imaging parameters can be enforced.

In another embodiment performing an embodiment of the present invention sequentially, imaging parameters are determined for each image individually, but instead of using the determined imaging parameters directly for generating an image, a combination of these image parameters and previously determined imaging parameters is used for generating the image of the real environment. In an embodiment, a combination of imaging parameters determined for a current image and imaging parameters determined for previous images is a weighted average, a mean, a median, a minimum, or a maximum.

Virtual object properties may also comprise properties on the desired appearance of the real environment (or parts thereof) in an image at a position defined by the virtual object. This is referred to as image properties of the real environment and includes for example (average, maximum, or minimum) color in the image, the (average, maximum, or minimum) brightness in the image, or the (average, maximum, or minimum) blurriness in the image. Example properties may be that the real environment (or part of it) at a defined position should have an average hue of 123 in the image, or that it should have an average brightness (i.e. pixel intensity after conversion to grayscale) of 100 in the image. A virtual object property may further be that the real environment (or part of it) at a defined position should be imaged sharply or that it should be imaged such that each point has a normal distribution point spread function with a variance of 3 pixels.

Based on such virtual object properties (i.e. desired appearance of the real environment in the image at a position defined by the virtual object) and information and properties of the real environment, imaging parameters can be determined which would result in the desired appearance of the real environment in an image generated according to the imaging properties and superimposed with the virtual object.

In an embodiment, imaging parameters can be determined based on physical measurements or models of the real world, like luminance measurements or depth values (e.g. from a depth camera, a depth sensor or a 3D model of the scene) and the virtual object properties (i.e. desired appearance of the real environment in the image at a position defined by the virtual object). In another embodiment, imaging parameters can be determined iteratively over a sequence of multiple images (where potentially only the last image is displayed) by adapting the imaging parameters accordingly until the appearance of the imaged part of the real environment is sufficiently converged to the desired one, i.e. the virtual object property (i.e. desired appearance of the real environment in the image at a position defined by the virtual object).

In an embodiment, the appearance of the virtual object and the part of the real environment that the virtual object occludes may be desired to be equal in terms of color, intensity, brightness, contrast, hue, saturation, sharpness, blurriness, or intensity histogram.

In an embodiment, the virtual object properties comprise desired appearance of a part of the virtual object in the image defined as a range of values, e.g. brightness values of pixels corresponding to the part of the virtual object shall lie within that range or shall cover the whole range.

In an embodiment the virtual object properties comprise desired appearance of a part of the real environment in the image at an area defined by the virtual object defined as a range of values, e.g. the brightness values of pixels corresponding to the real environment in the area defined by the virtual object shall lie within that range or shall cover the whole range.

In an embodiment a virtual object does not have any virtual object property describing the desired visual appearance of the virtual object, but only virtual image properties describing the desired visual appearance (i.e. image properties) of parts of the real environment at positions defined by the virtual object. A virtual object may affect imaging parameters such as auto-focus in that it defines the image region in which the sharpness of the image is analyzed to determine the focus. The sharpness in a region of the image may be determined based on the (local) contrast in the region of the image or based on a transformation to a frequency domain representation, e.g. Fourier transform.

In an embodiment, an image of the environment is generated according to imaging parameters that are determined according to virtual object properties such that the image of the real environment exhibits a similar appearance as the virtual object, wherein the similarity measure can be any of, but is not limited to, cross-correlation of intensity histograms, similarity of the average intensity, similarity of the average color, similarity of the average saturation, similarity of the minimum intensity, similarity of the maximum intensity.

Figure 2:
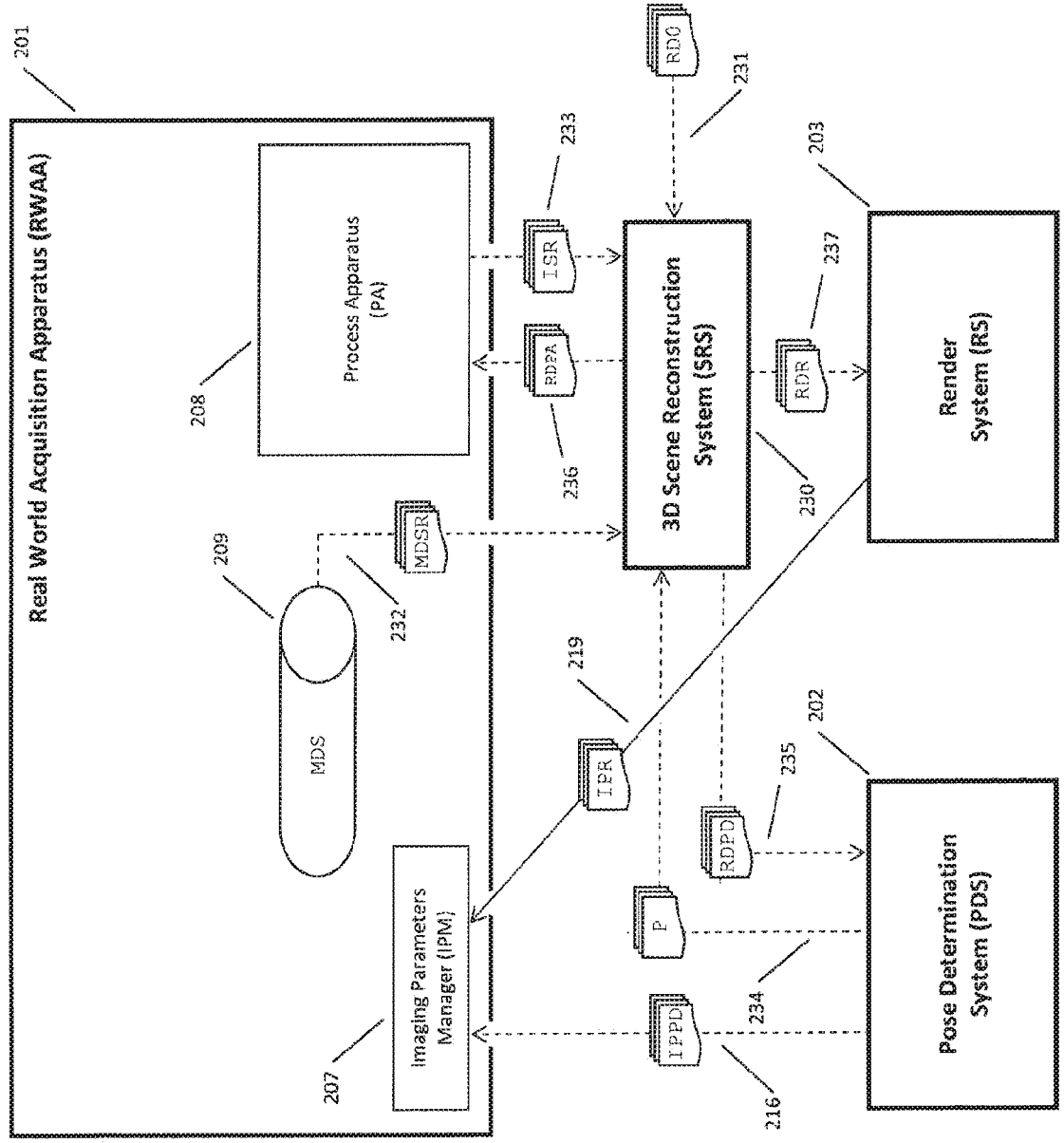
FIG. 2 illustrates another embodiment of a system setup which may be used in connection with the present invention.

FIG. 2 illustrates another embodiment of a system setup in which an additional reconstruction of a scene is used. The embodiment comprises a 3D Scene Reconstruction System, SRS (230), which potentially exchanges data with a Real World Acquisition Apparatus RWAA (201), a Pose Determination System PDS (202), and a Render System RS (203). The SRS (230) may also perform 3D reconstruction based on various input data. The SRS (230) potentially is provided (231) with external reconstruction data RD0 of the scene, for example in terms of a previously reconstructed or manually modelled 3D model of the real environment. During runtime the SRS (230) is potentially supplied by additional data for the 3D reconstruction of the scene. Firstly the SRS (230) is potentially supplied (232) by reconstruction data MDSR from the Measured Data Storage MDS (209) which contains information about the scene measured by the Light Measure Apparatus (not depicted in this Figure). This could for example be depth information provided by a depth sensor. Secondly the SRS (230) is potentially supplied (233) by reconstruction data ISR from the PA (208) which contains information about the scene processed by the PA (208). This could for example be image information, which is used by the SRS (230) for image based reconstruction. Additionally the SRS (230) is potentially provided (234) with a Pose P determined by the PDS (202).

The SRS (230) then potentially provides reconstruction data to the other systems or components shown in FIG. 2. Firstly it potentially provides (235) reconstruction data RDPD to the PDS (202), which may use the reconstruction data RDPD in the pose determination procedure as well as in order to specify the imaging parameters IPPD transferred (216) to the Imaging Parameters Manager IPM (207) of the RWAA (201). An example of usage of RDPD is for example setting the imaging parameter for the focus distance based on depth information from the RDPD. Secondly the SRS (230) potentially provides (236) reconstruction data RDPA to the PA (208), which may consider the reconstruction data RDPA for processing the data from the MDS (209) when assembling images out of the data. An example of usage of RDPA is for example synthetic defocus of an image based on depth information from the RDPA. The depth data would provide information about the distance of the environment at a particular region in the image, which then is used to determine the blur factor for that particular region in the image. Thirdly the SRS (230) potentially provides (237) reconstruction data RDR to the RS (203), which may consider the reconstruction data RDR for combining the image (not depicted in this Figure) received from the PA (208) with a computer generated rendering. An example of usage of RDR is for example occlusion of virtual objects behind real geometry e.g. by using the depth values from the RDR for initializing the Z-Buffer of the rendering engine. The RS (203) may also use the reconstruction data RDR in order to specify the imaging parameters IPR transferred (219) to the Imaging Parameters Manager IPM (207) of the RWAA (201). It may for example be beneficial to interpolate imaging parameters for the focus distance and depth of focus over time from a focus on the real environment to a focus on the virtual object. It may for example be beneficial to set imaging parameters for the focus distance and depth of focus so that nearby real geometry is defocused. It may for example also be beneficial to only focus on a virtual object, when it is not occluded by the real environment. The reconstruction data RD0, RDPD, RDR, and RDPA may be the same or different.

In an embodiment, the RWAA (201) comprises a light field camera as Light Measure Apparatus, which allows estimating depth information from the multiple images acquired at a single blow and the MDSR corresponds to this estimated depth information.

In another embodiment, the RWAA (201) comprises a RGBD camera as Light Measure Apparatus and the MDSR corresponds to the depth information captured by the camera.

In another embodiment, the RWAA (201) comprises a Stereo camera as Light Measure Apparatus and the MDSR corresponds to the depth information reconstructed by stereo image based reconstruction techniques from the images captured by the camera.

In another embodiment, the RWAA (201) comprises a RGB camera as Light Measure Apparatus and the reconstruction data of the SRS is either delivered (231) as an external model RD0 of the scene or by image based reconstruction techniques like SLAM—described in Davison, et al. "MonoSLAM: Real-time single camera SLAM." Pattern Analysis and Machine Intelligence, IEEE Transactions on 29.6 (2007): 1052-1067 ("Davison")—or by a combination of both.

Computer Vision (CV) based Simultaneous Localization and Mapping (SLAM) is a well-known technology for determining the position and/or orientation of a camera relative to a real environment and creating a geometrical model of the real environment without requiring any pre-knowledge of the environment. The creation of the geometrical model of the real environment is also called reconstruction of the environment.

Figure 3:
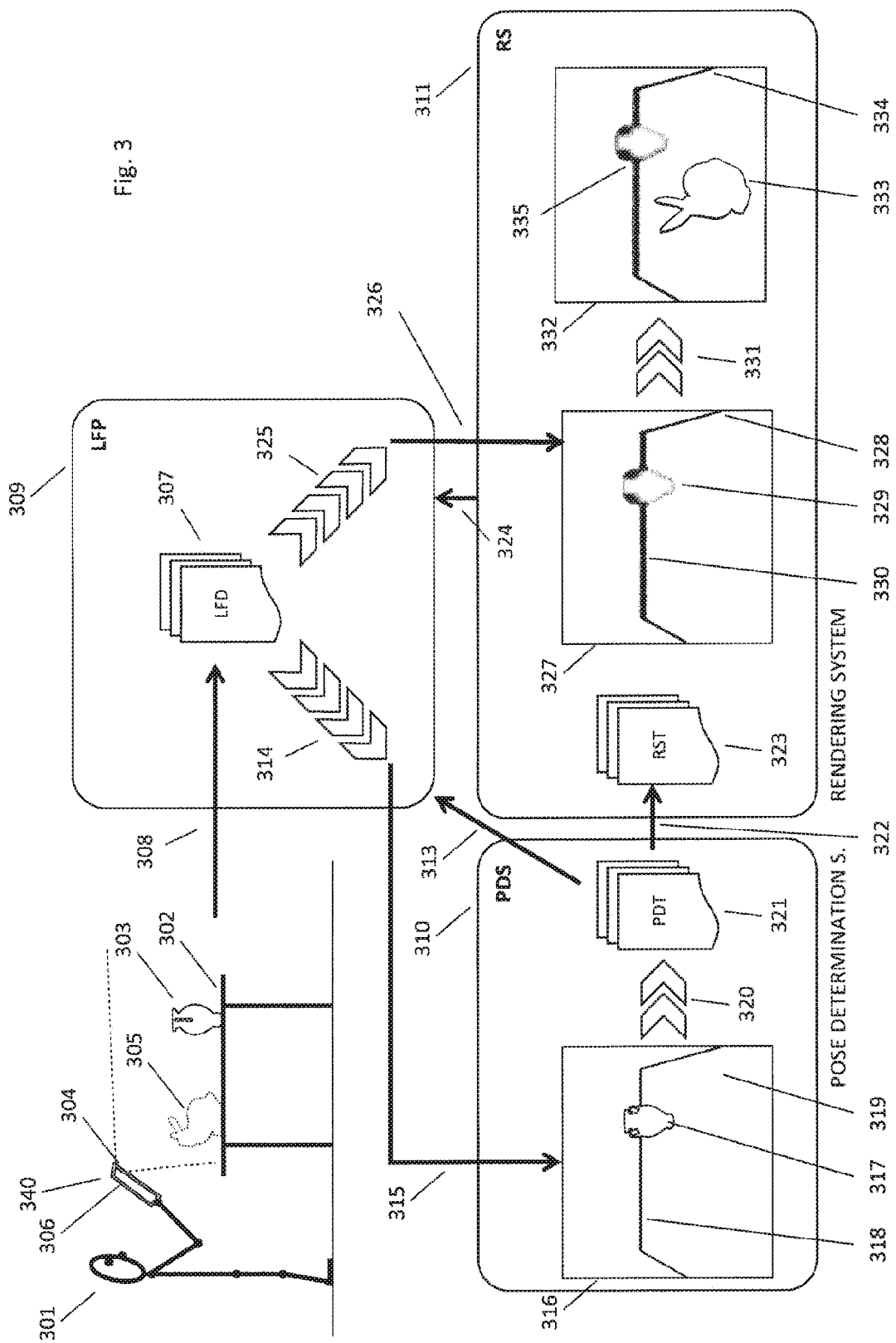
FIG. 3 shows a potential scenario situation in connection with embodiments of the invention.

In an embodiment a geometrical model (or 3D map or also called 3D reconstruction) of the real environment is created using triangulation of 2D observations shared in a plurality of images captured by one or more cameras. Triangulation is a common method used in 3D reconstruction procedure, based on camera images, also called Structure from Motion (SfM) or Simultaneous Localization and Mapping (SLAM), see Davison FIG. 3 shows a situation in which a user (301) is capturing a scene in front of him comprising a table (302) with a real vase (303) on top of it using a light field camera (304) of a mobile device (340). The captured scene is combined with a virtual object, e.g. a virtual rabbit (305) and presented to the user on a display (306) of the mobile device. The mobile device or a part of the mobile device may be implemented as a system setup shown in FIG. 1.

According to an embodiment of the invention, the camera (304) measures light field data (307, LFD) of the real world, and provides this data to a Light Field Processor, LFP (309) (which is an embodiment of the Process Apparatus PA). The LFP (309) could either be implemented by a component of the camera (304) or by a component of the mobile device (340). The pose determination system, PDS (310), informs (313) the LFP (309) about requirements like focus parameters related to the image it requires which depend on the current Pose Determination State (321, PDT) comprising one or more pose determination algorithms and the history of pose determination results (e.g. including one or more camera poses, camera motions, orientation information and/or depth information). The PDS (310) could either be realized by a component of the camera (304) or by a component of the mobile device (340). The LFP (309) processes (314) the light field data, according to provided (313) requirements (i.e. imaging parameters), extracts a corresponding 2D image (316) exhibiting the desired properties e.g. regarding focus and provides (315) it to the PDS (310).

In this example (316), the focus is set to the distance of the camera (304) to the vase, resulting in a sharp image of the vase (317), while parts of the table further away (318) as well as nearer (319) than the vase (317) are mapped slightly blurry. The PDS (310) applies an image-based tracking algorithm (320) on the image (316) resulting in an updated PDT (321) comprising for example an up to date pose of the camera. The distance of the camera (304) to the vase could be derived from the camera pose determined based on the image-based tracking algorithm (320). When depth information related to the image (316) is available, the distance could be directly obtained from the depth information.

This updated pose is transferred (322) to the render system (311) contributing to the current render state, RST (323). This RST (323) may also include the targeted position of the virtual content relative to at least part of the real environment (e.g. the table 302 or the vase 303) or relative to the camera (304) in 3D space or relative to the 2D image in 2D space (e.g. where in the 2D image, the virtual content shall be placed) or some other additional specification (e.g. the size of the virtual content) referred to as virtual object properties. The RS (311) informs (324) the LFP (309) about required imaging parameters like focus parameters related to the image it requires which depend on the current RST. The LFP (309) processes (325) the light field data according to the provided (324) requirements, extracts a corresponding 2D image (327) exhibiting the desired properties e.g. regarding focus and provides (326) it to the RS (311).

In this example (327), the focus is set to a distance closer than the distance between the camera and the vase, namely to the distance between the camera and the to be rendered virtual object, resulting in a sharp image of the near part of the table (328), while the images of the vase (329) as well as of distant parts of the table (330) are blurred in the image (327).

The RS (311) combines (331) the image (327) with a rendering of the virtual object, which is a rabbit in this example, controlled by the current RST (323)—especially the current pose as well as the properties of image (327) used as background. The result is an augmented (or composite) image (332) where the virtual content (333) and the real world in consistent distance (334) are mapped sharply while other parts (335) of the real world, which were used for tracking by the TS (310), appear out of focus.

As depicted in FIG. 3, in an embodiment of the invention, a light field camera (304) measures parts of the light distribution as light field data (307, LFD), provides this data to a Light Field Processor, LFP (309) (which is an embodiment of the Process Apparatus PA), which extracts 2D images.

A light distribution within space can be described as a light field, which is a function describing an amount of light of multiple wavelengths faring through multiple points in space in multiple directions at multiple points in time. We consider different wavelengths in separation, as the full spectrum of wavelengths can be approximated for human vision considering only the three principal colors red, green and blue corresponding to the three different types of cones in the photoreceptor layer of the human eye responsible for color perception. For a particular wavelength, and for a particular small interval in time within which the light distribution does not change noteworthy, the light field can be specified by the 5D plenoptic function which returns the radiance L along a ray defined in 3D location and 2D orientation. The radiance L along a ray is the amount of light traveling through a differential part of the 5D space, with the differential part being specified by a differential cross-sectional area and an associated differential solid angle. Radiance hence is measured in Watt (for the power) per steradian (for the solid angle) per meter squared (for the cross-sectional area).

Some Real World Acquisition Apparatuses like conventional cameras need the focus distance before measuring the light. The resulting image of a conventional camera already has a part of the environment at a particular distance in focus and other parts out of focus. Although conventional cameras provide an adaptable focus, during acquisition, the chosen focal length of the optical system and the distance from the image plane fix determine the Depth of Field and what distance to an object is in sharp focus. So focus can be changed to another distance, either by moving the lens or changing its focal length. This however should be done before image acquisition.

Conventional cameras capture an image of the light field at a time with a focus and Depth of Field specified before acquisition. Once the image is taken, they do not deliver enough information to change the perspective (point of view and viewing direction), focus or Depth of Field of the image. In conventional cameras thereby information about the light field is lost by accumulating. For each object point in focus, i.e. on plane of focus, light rays originating from that point either are not imaged at all (if they do not pass through the aperture) or they are imaged in a single point, i.e. integrated, and therefore cannot be reconstructed or separated by orientation after acquisition. For each point out-of-focus, i.e. not on the plane of focus, light rays originating from that point either are not imaged at all (if they do not pass through the aperture) or they are imaged at different points (or pixels) on the sensor in the circle of confusion depending on their orientation. Because a scene usually comprises of more than a single point, light rays originating from different points are imaged at a single point (or pixel) on the sensor. Since these are integrated they cannot be reconstructed (or separated by origin or orientation) after acquisition.

There are however systems available that capture more information of the light field, allowing to refocus (set focus or Depth of Field), change the perspective (point of view and viewing direction) of the image after acquisition based on the acquired data. They capture detailed information with less accumulating like light field cameras or capture additional measurements like RGB-D cameras that help to reconstruct the light field. A software unit allows extracting different conventional images (with a particular focal distance) from one capture, for example refocus, change perspective, change between 2D and 3D views.

A light field camera measures a part of the plenoptic function in a real environment. In an embodiment, a light field dataset is a digital image captured by a light field camera. In an embodiment, a light field dataset stores a part of the plenoptic function in a real environment. In an embodiment, a light field dataset is a dataset which allows for synthesis of images with different focus settings. In an embodiment a light field processor (LFP) is a processor, a microprocessor, a coprocessor, a central processing unit (CPU), a graphics processing unit (GPU), a digital signal processor (DSP), an application-specific instruction-set processor (ASIP), an application-specific integrated circuit (ASIC), or a digital signal processor (DSP), or any combination of the previous, which is configured to generate digital images based on provided light field data and imaging parameters.

In an embodiment, a light field camera refers to an apparatus measuring a part of a light field, which contains enough information about the light field to extract different conventional images (with a particular focal distance) from one measurement pass, for example refocus, change perspective, change between 2D and 3D views.

In an embodiment, a light field dataset refers to digital data representing a part of a light field as captured with a Light Field Camera. The term may refer to different parts, i.e. subsets, of a light field represented in different parameterizations. For example a light field dataset may refer to at least two images that capture a scene from different viewpoints. The images may be captured by separate cameras with separate optics and imaging sensors or by a single camera which changes its viewpoint (i.e. which is being moved). The images may also be captured by a single imaging sensor (e.g. CCD or CMOS) with optics configured to result in multiple focal points, e.g. a lens array.

In an embodiment a light field processor refers to an entity which takes Light Field Data(sets) as input to synthesize images based on the Light Field Data and a provided imaging parameters. It is disclosed in Ng how to synthesize images with different focus settings from a light field dataset.

In an embodiment, imaging parameters provided (see FIG. 3, (313)) to the Light Field Processor comprise a Light Field Processing Specification.

In an embodiment, a Light Field Processing Specification (LFPS) is provided (see FIG. 3, (313)) to the Light Field Processor to specify properties of an image it should create out of the Light Field Data. This specification may be indicative of at least one plane of focus and it may be indicative of at least one camera viewpoint. In an embodiment, a Light Field Processing Specification may further be indicative of intrinsic camera parameters, such as focal length, principal point, image resolution, and radial distortion parameters. In an embodiment, the LFPS is a single scalar value indicative of the distance (e.g. in millimeters) from the camera at which the image should be in focus.

In an embodiment, a Light Field Processing Specification could also comprise several distances with associated point spread functions. An image computed according to this Light Field Processing Specification would then image all parts of a scene according to their distance to the camera with the respective point spread function. Parts of a scene that have a distance for which there is no point spread function specified would use an interpolation or extrapolation of provided distances with associated point spread functions. In an embodiment, a Light Field Processing Specification may contain different parameters for different parts of an image to be extracted.

Figure 4:
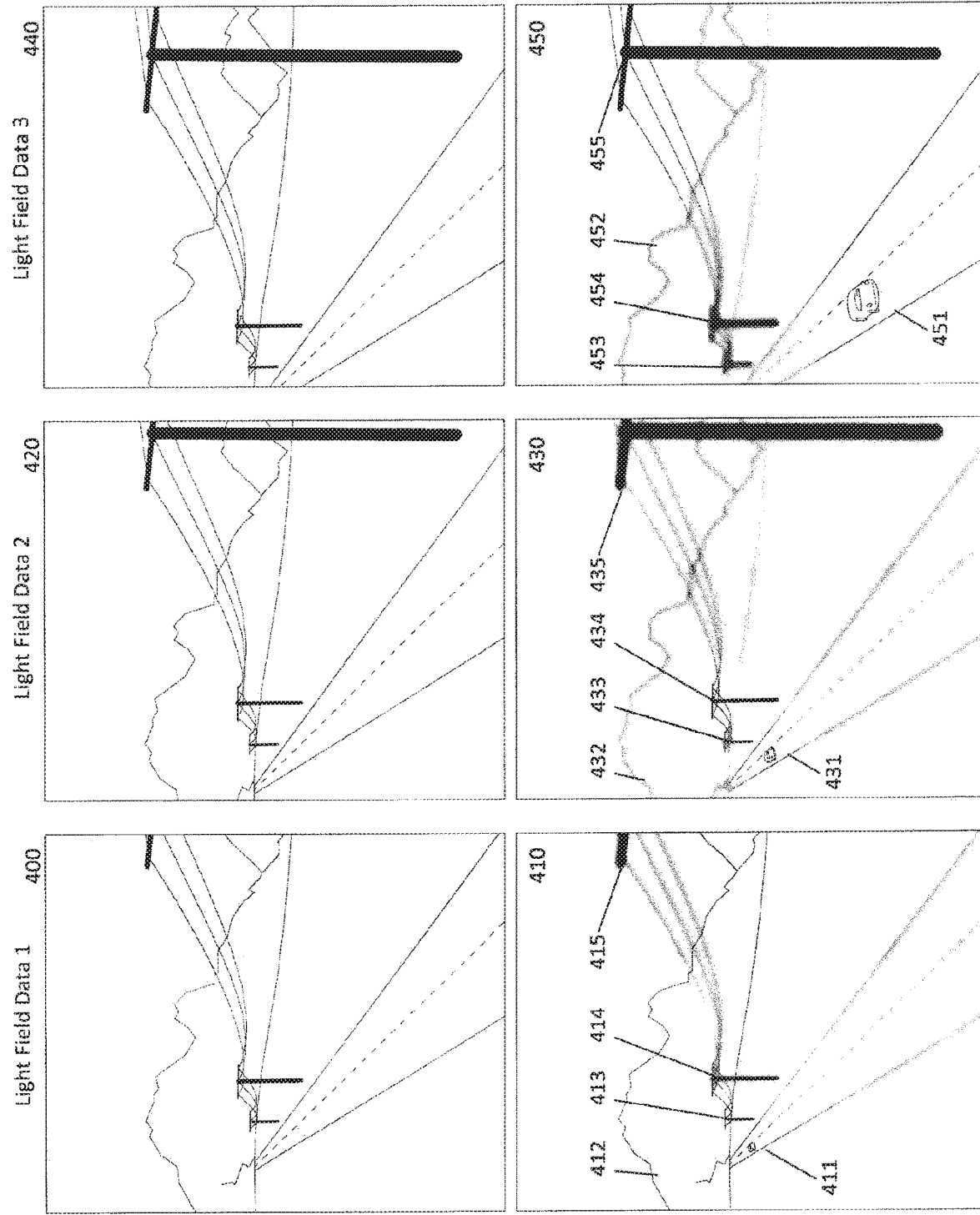
FIG. 4 illustrates an embodiment of the present invention where a sequence of measured data, here light field datasets captured by a light field camera, is used in an Augmented Reality application.

FIG. 4 illustrates an embodiment of the present invention where a sequence of measured data (e.g. light field datasets captured by a light field camera) is used in an Augmented Reality application which uses images (400, 420, 440) processed from the measured data for camera pose determination and other images (410, 430, 450) processed from the same measured data with different imaging parameters for rendering them with a superimposed virtual car (411, 431, 451). While this embodiment is explained based on Real World Acquisition Apparatus comprising a light field camera, light field data as measurements stored in the data storage MDS, and a light field processor as process apparatus, the description also applies to any other embodiment using any other Real World Acquisition Apparatus measuring any other data, which allows for generating images according to imaging properties. For instance, the images 400, 420, 440, 410, 430, and 450 may be generated by at least one standard camera (i.e. non light field cameras) according to different imaging parameters related to the at least one standard camera. The different imaging parameters could be determined according to any embodiments disclosed in this invention. The at least one standard camera could comprise one camera or different cameras.

At a first point in time, a first measured dataset (Light Field Data 1) is measured of light leaving a real environment comprising a street, power poles and mountains in the background. In this example, the pose determination system requires an all-in-focus image for best camera pose determination results. The pose determination system specifies imaging parameters (including at least one focus parameter and optionally depth of focus) to generate an image 400. Note that in this image 400 all real objects are in focus, i.e. sharply imaged, independent from their distance to the camera. The rendering system superimposes a virtual object 411 (a car in this example) driving along the (real) street. At the point of time when the first measured data has been measured, the position of the car is far away from the camera. In this example, the render system is configured to always keep the virtual car in focus and to display the virtual car superimposed on an image of the real environment processed from the measured data, which is in focus at the distance where the virtual car is located. The information about the rendering requirement of always keeping the virtual car in focus may be stored as a property of the virtual object.

Such an image 410 is provided by the processing apparatus according to provided imaging parameters (including at least one focus parameter, e.g. the position of focus in the camera coordinate system, and optionally depth of focus) and then rendered with the superimposed virtual car 411. Spatially registered superimposition of the virtual car requires information on the camera pose, which is determined in the pose determination system based on the pose determination image 400. The focus parameter may be determined according to the position of the virtual car in the camera coordinate system at the first point in time. The depth of focus could be determined based on the size of the virtual car.

Note that in image 410, which is processed from the same Light Field Data 1 as image 400, the mountains 412 in the background and third pole 413, which has a similar distance to the camera than the virtual car, are focused. Real objects closer to the camera, i.e. the other two poles 414 and 415 are unfocussed, i.e. blurry, because their distance to the camera differs significantly from that of the virtual car 411.

At a second point in time, a second dataset (Light Field Data 2) is measured of the same real environment but a point of view of the camera slightly moved to the right and the pose determination system obtains an all-in-focus image 420 processed from this light field data according to provided imaging parameters to determine the camera pose relative to the scene. The position of the virtual car is now closer to the camera than at the first moment in time. For example the distance between the virtual car 431 and the camera is 50 meters in this example. The rendering system again requires to generate an image of the real environment according to imaging parameters that specify the distance of focus to be equal to the distance of the virtual car to the camera. As a result, the rendering system obtains from the light field processor an image 430 which is in focus at a distance of 50 meters and displays this image with the superimposed virtual car 431. The camera pose determined by the pose determination system based on the image 420 is used to achieve the spatial registration between the virtual car and the real environment, i.e. to superimpose the car in the right place with the correct orientation and scale. Note that in the image 430, which is processed from the same Light Field Data 2 as image 420, real objects, which are significantly further away from the camera than the virtual car, e.g. the mountains 432 and the third pole 433, are not in focus in this example. Analogously, real objects that are much closer to the camera than the virtual car, i.e. the first pole 435, are also not focused. Real objects at a distance from the camera similar to that of the virtual car, particularly the second pole 434 are focused in the image. That way the focus is consistent between the image of the real world (processed from light field data) and the superimposed virtual object which is rendered in focus in this case.

At a third point in time, a third light field dataset (Light Field Data 3) is measured of the same real environment again with a point of view of the camera slightly moved even further to the right and the pose determination system again obtains an all-in-focus image 440 processed from this light field data to determine the camera pose relative to the real environment. This camera pose is used to superimpose a virtual car 451 to another image 450 processed from the same light field data as image 440. The virtual car followed the real street and has come closer to the camera. As a result the image 450 has the first pole 455 in focus because its distance to the camera is similar to that of the virtual car 451. The two poles further away 454 and 453 and the mountains 542 in the background are out-of-focus in the image 450 which has been processed from Light Field Data 3 according to imaging parameters specified by the rendering system according to virtual object properties and the camera pose.

In the example shown in FIG. 4 the imaging parameters specified by the pose determination system remain the same over the period of the three points in time, while the imaging parameters specified by the rendering system change according to the virtual object to be superimposed and according to the camera pose obtained from the pose determination system. To be specific, the imaging parameters specified by the rendering system are different for generating the images 410, 430 and 450. These imaging parameters are defined according to the position of the virtual car relative to the camera at the point in time when respective light field data is measured by the camera. The camera pose relative to the real world is determined from images (400, 420, 440) processed from the measured light field data. The position of the virtual car relative to the camera could be determined according to the camera pose relative to the real environment and properties of the virtual car. The properties of the virtual car may include speed, an initial position, and/or the requirement of the car should be aligned with a street in the image. The particular imaging parameters specified by the rendering system for the processing step of the measured light field data into an image may depend on the pose determined by the pose determination system on the current measured light field data or on the pose determined on a previously measured light field data. Additionally the particular imaging parameters specified by the rendering system may depend on the virtual object properties, for example the request of a virtual object to be images in focus. Note that also the imaging parameters requested by the pose determination system may change over time, e.g. depending on the determined camera pose in a previous image.

There are different ways to change the focus in an image of a real environment, which all may be used in embodiments of the present invention. The focus may be changed by physically moving at least one lens, or by physically moving at least one image sensor, or by physically changing the size of an aperture. These options influence the way light is measured and thereby may change the focus in an image of a real environment. The focus may further be changed after measuring light, which is often referred to as post focus. Light field cameras allow for capturing light field dataset that allow for generating images with desired imaging parameters, such as focus distance and depth of field, by processing and sampling the dataset, see Levoy. The focus of an image may further be changed after acquisition by filtering the image, e.g. by convolution or decovolution with a Gaussian kernel. If the depth of at least part of an image is known, then such filtering can be applied to different parts of the image individually depending on their depth. Any combination of the above ways to change the focus in an image of a real environment can be used by embodiments of the present invention to implement imaging parameters.

FIG. 5 shows three different light field datasets (501, 502, 503) and the corresponding images (510, 540, 570) which are processed from the light field data for pose determination as well as the images (520, 550, 580) which are processed for visualization. The Figure also shows how the augmented image looks like in this embodiment (530, 560, 590). Thereby the imaging parameters for generating the images (510, 540, 570) for pose determination, particularly the plane of focus, are adjusted to follow a moving real object (511, 541, 571) which is being tracked. For example, the imaging parameters of generating the pose determination images include at least one of focus, focal length, depth of focus, focal distance, depth of field. The focus or focal length may be determined from a distance of the real object to the camera, which could be obtained from a depth sensor or from an image previously captured by the camera. The depth of field may be determined from the size of the real object.

The images (520, 550, 580) for visualization are processed from the measured light field data sets with different imaging parameters compared to the imaging parameters used for processing the images for the pose determination. For the processing of the different light field data sets into the images (520, 550, 580) used for visualization, the same imaging parameters are used. The imaging parameters comprising at least one of focus, focal length, focal plane and depth of focus, and depth of field are in this case configured such that the center of the real ground plane is in focus, where the pose of the camera relative to the real ground plane is provided by the pose determination system. This can for example be specified by a virtual object located at the center of the ground plane which controls the focus but otherwise is invisible. In this embodiment, the virtual object (533, 563, 593) is rendered such that the focus is coherent with that of the visualization image, i.e. the virtual object can be rendered out-of-focus, i.e. blurred.

A first light field data set 501 comprises a set of samples of the plenoptic function in a scene comprising a cubical-shaped object on a checkered planar surface. This data 501 is processed into an image for pose determination. The plane of focus for creating this image is chosen such that it is close to the cubical-shaped real object 511. As a result, this object is focused while other parts of the scene are not. The position of the object relative to the camera can for example be approximately known from a different light field dataset which was measured earlier than 510 under the assumption that the object's motion since this point of time is relatively small. In practice, if a camera provides (light field) data at a frame rate of e.g. 30 Hz, then the position and orientation of imaged objects changes only moderately from frame to frame. The first image for pose determination 510 is generated such that the object 511, which should be tracked, is in focus while the checkered planar surface is out-of-focus. The visualization image 520 is processed from light field data 501 such that the plane of focus is at the center of the checkered planar surface 522. As a result, the checkered planar surface appears blurred in the front, focused in the middle part and blurred in the rear part. The real object 521 is located on the front part of the surface and therefore also appears blurred. The augmented image 530 combines the visualization image 520 (comprising the real object 531 and the real surface 532) with a virtual object 533. This is placed on top of the real object 531, whose position and orientation has been determined based on the image for pose determination 510. This is possible thanks to the real object 511 being in focus in this image. Note that the visualization image 520 would generally not enable to determine the position and orientation of the real object 521 with the same accuracy. In this embodiment, the virtual object is rendered with a virtual camera that has the same parameters that were used to process image 520 from the light field—particularly in terms of focus. As a result, the virtual object 533 appears blurry in this example.

A second light field data set 502 comprises a set of samples of the plenoptic function in a real environment comprising a cubical-shaped object on a checkered planar surface. We assume that the approximate position of the cubical-shaped real object is known from a previous light field data set. The light field data 502 is processed into the image 540 for the pose determination with an imaging parameter for the plane of focus set to the distance of this approximate position. Accordingly, the real object 541 is in focus. The checkered planar surface 542 is also in focus at similar distances and out-of-focus for significantly different distances from the camera, as for example the case for the front and the rear part of the surface. The imaging parameters to process the visualization image 550 from the light field 502 are the same as used to process the visualization image 520 from the light field 501. This can be seen from the checkered planar surface showing the same focus as 522 in 520. The position and orientation (i.e. pose) of the camera relative to the checkered planar surface has been determined by the pose determination system and is required to specify the imaging parameters. Since the real object 551 has a different location than the real object 521 in 520, the two real objects differ in terms of their focus. While 521 is out-of-focus, i.e. blurred, 551 is focused, i.e. imaged sharply. The augmented image 560 shows the visualization image 560 with a virtual object 563 placed on top of the real object 561 and being focused consistently with the visualization image.

A third light field dataset 503 comprises a set of samples of the plenoptic function in a real environment comprising a cubical-shaped object on a checkered planar surface. We again assume that the approximate position of the real cubical-shaped object relative to the camera is known, e.g. from a previous frame. We also assume that the approximate position of the real checkered planar surface relative to the camera is known, e.g. from a previous frame. Compared to the situations captured in light fields 502 and 501 the real object moved further away from the camera. Accordingly, the pose determination image 570 is processed from the light field data such that the approximate location of the real object (and therefore the real object 571) is in focus. The visualization image 580 is processed from the light field 503 with the same imaging parameters as used for 550 and 520. The plane of focus in this case lies in front of the real object, which results in the real object 581 being out-of-focus and therefore appearing blurred. The augmented image 590 combines 580 with a virtual object 593 on top of the real object 591 rendered consistently in terms of focus. The accurate position and orientation of the real object 591 (and 581 and 571) is determined from 570 where the real object is imaged in focus.

When looking at 501, 502, and 503 as keyframes of a sequence, the real object moved from the front to the back with the virtual object sitting on top of it. In the pose determination image, the focus follows the real object. In the visualization image the focus remains constant relative to the second real object, which is the checkered planar surface and the first real object, i.e. the cube, moves from out-of-focus to in-focus back to out-of-focus. The focus in the image used for visualization is in this example controlled by the position of a virtual object located at the center of the checkered planar surface, which pulls focus but otherwise is invisible.

In one embodiment virtual objects can be rendered out-of-focus or according to the method disclosed in reference Klein.

In an embodiment virtual objects can be rendered with simulated imaging parameters (e.g. distortions, chromatic aberrations, blur, Bayer masking, noise, sharpening, and color-space compression) consistently with the camera image of the real environment according to the method disclosed in reference Klein.

FIG. 6 illustrates another embodiment of the present invention in which a compromise between ideal imaging parameters for camera pose determination and ideal imaging parameters for visualization may be found and used to generate an image for both camera pose determination and visualization. The augmented reality scene 600 in this case comprises of a real marker 601 which is used for camera pose determination, a real cube 602, and a virtual sphere 603 which sits on the real cube 602 and should be visualized superimposed in an augmented image. The ideal imaging parameters for pose determination in this case would result in an image as illustrated in 610 in which the real marker 611 is in focus while the real cube 612 and the remaining parts of the real environment which are not used for camera pose determination may be out-of-focus (in this example, they are out-of-focus). For visualization, however, the ideal imaging parameters would result in an image as illustrated in 620, where the real cube 622, on which the virtual sphere should be superimposed, is in focus, while the irrelevant real marker 621 is preferred to be out of focus to not draw too much of the user's attention. When using a system and method disclosed herein that provides the opportunity to generate images of the scene with different imaging parameters simultaneously, as disclosed above, then an embodiment of this invention would use image 610 for camera pose determination and image 620 for visualization. In another embodiment, when using a camera that is only capable of providing an image based on one set of imaging parameters at a time, a tradeoff (or compromise) between the imaging parameters resulting in 610 and those resulting in 620 is found. One such possible tradeoff is visualized in 630 in which the real cube 632 is in focus as ideal for visualization and the real marker 631 is only slightly out of focus. Thereby it can still be used for camera pose determination but simultaneously also satisfies the request to make it less prominent than the in-focus real cube for visualization.

In an embodiment a tradeoff is found by interpolating between the ideal imaging parameters for pose determination and the ideal imaging parameters for visualization. In the scenario shown in FIG. 6, the imaging parameter is focus (distance). However, the interpolation between the ideal imaging parameters for pose determination and the ideal imaging parameters for visualization could also be applied to other imaging parameters, e.g. sharpening, blurring, brightness, contrast, exposure time, shutter time, aperture, point of view, viewing direction, camera projection properties, focal length, field of view, zoom settings, image cropping, tone mapping, white balance, saturation, gamma correction, black level adjustment, noise reduction, edge enhancement, or contrast enhancement.

In an embodiment the interpolation is a linear interpolation $$P\_tradeoff = alpha * P\_vis + (1-alpha) * P\_pose$$

where P_tradeoff refers to the tradeoff parameters, P_vis refers to the ideal imaging parameters for visualization, P_pose refers to the ideal imaging parameters for camera pose determination, and alpha is a scalar weighting value in the range [0,1].

In an embodiment the tradeoff is computed using the maximal alpha which still enables pose determination. In an embodiment the method to determine the tradeoff parameter converges towards the desired parameter iteratively over a sequence of multiple images.

FIG. 7 illustrates another embodiment of the present invention in which a compromise (or tradeoff) between ideal imaging parameters for camera pose determination and ideal imaging parameters for visualization may be found and used for both camera pose determination and visualization. The augmented reality scene 700 in this case comprises a real marker 701 which is used for camera pose determination, a real cube 702 and a virtual sphere 703 which sits on the real cube 702 and should be visualized superimposed in an augmented image. The real environment further comprises of a real spotlight which illuminates the real marker 701. As a result, the marker is much brighter than the rest of the real environment including the real cube 702. This is clearly visible in 710, which illustrates a captured image of the real scene in which the imaging parameters are chosen such that the resulting image 710 is ideal for pose determination. In this case the exposure time is set such that the marker 711 is imaged contrasty to allow for proper recognition of the marker in the camera image for camera pose determination. The real cube 712, however, is imaged very dark and with very little contrast with this exposure time, which is not desirable for visualization.

Instead, an image of the scene captured with ideal imaging parameters for visualization is illustrated in 720 where the real cube 722 on which the virtual object should sit is well visible and contrasty. With these imaging parameters, however, the marker 721 is hardly visible and has a very low contrast because it is very bright and leads to oversaturation of the imaging sensor. As a result, image 720 is not well suited for camera pose determination. In one embodiment of the present invention, the image 710 is used for pose determination and image 720 is used for visualization. If the Real World Acquisition Apparatus however is not capable to provide images with different imaging parameters simultaneously, then another embodiment of the present invention can be employed. This embodiment finds a compromise between ideal imaging parameters for camera pose determination and ideal imaging parameters for visualization, for example based on the interpolation method mentioned above, and the resulting image 730 is used for both camera pose determination and visualization. In the present example, the marker 731 is not as contrasty as it would have been under ideal parameters for pose determination (711), but it has more contrast than 721 and therefore is suited for camera pose determination. The real cube 732 has less contrast than under ideal parameters for visualization (722), but it is much better visible than in image 710. Thereby, image 730 provides a tradeoff between images 710 and 720 which each are only well suited for either pose determination or visualization, while image 730 can be used for both.

In this example the value of the imaging parameters, e.g. the exposure time, can be determined based on the brightness of a part of the real environment in a camera image that was generated with known imaging parameters, particularly exposure time. As an example, if the part of the real object has an average intensity of 100 (in a range from 0 to 255) in an image generated with an exposure time of 7 milliseconds and the desired average intensity is 127, then the exposure time to be used to achieve the desired appearance could be computed as 7*127/100 milliseconds=8.89 milliseconds assuming a linear camera response. If the nonlinearities in the imaging system are known, e.g. gamma correction, then they can be considered accordingly by converting all intensity values to a linear space before applying the rule of proportion. The above process of determining a value of the imaging parameter exposure time can be performed repeatedly in an iterative fashion to converge to the desired appearance.

The brightness of a real environment in a (digital) image can be controlled by different means, which all may be used in embodiments of the present invention. Physically changing the aperture size or changing the shutter time or the exposure time affect the way light is measured in terms of brightness. After measurement, different means to process the measured data exist to change the brightness and contrast of images, e.g. adjusting levels, curves, brightness, contrast. A naïve implementation to increase the brightness in an image is to add a constant value to all intensities of the image or to multiply all intensities with a factor. Any combination of the above ways to change the brightness in an image of a real environment can be used by embodiments of the present invention to implement imaging parameters.

Figure 8:
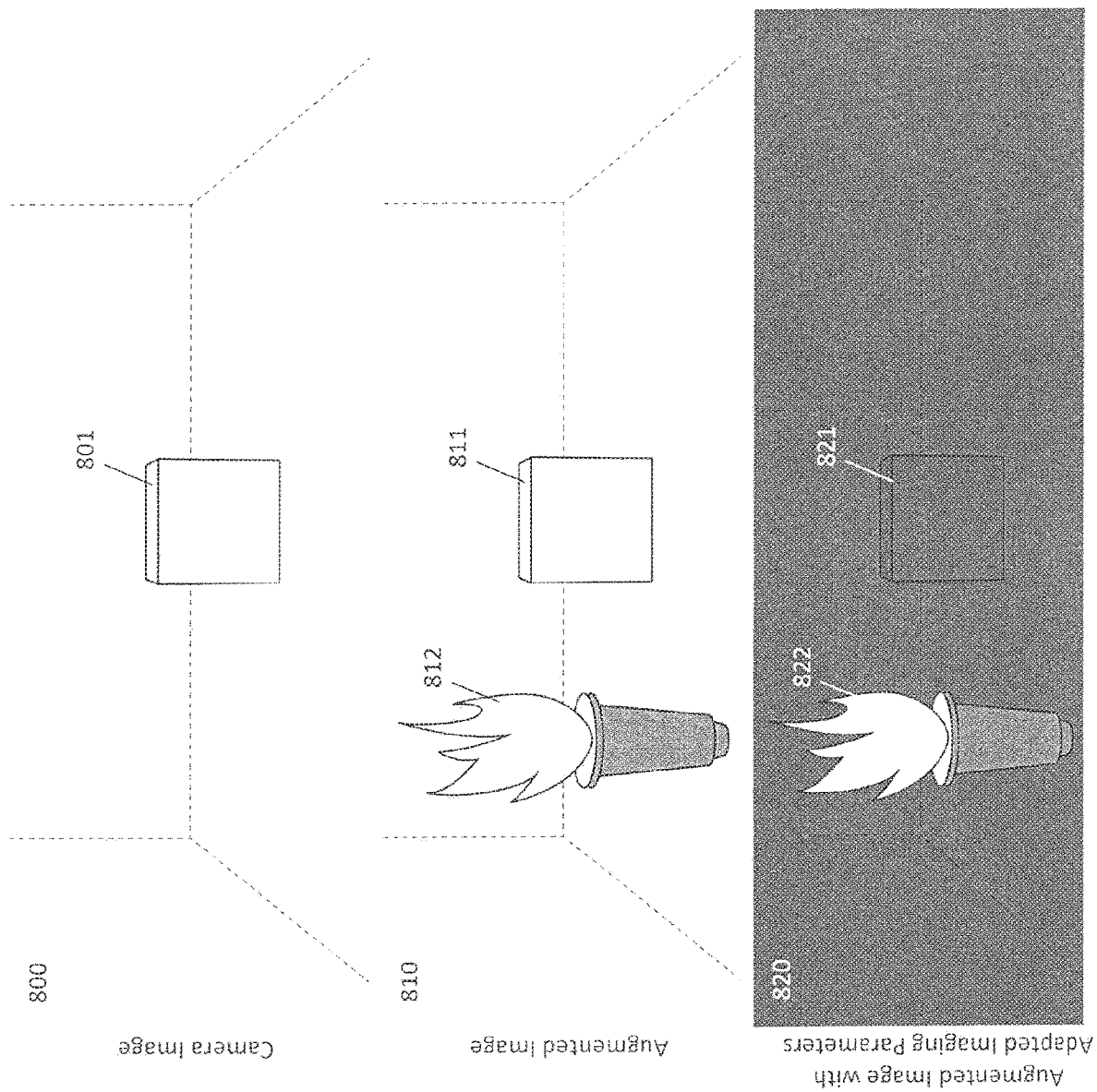
FIG. 8 illustrates another embodiment of the present invention.

FIG. 8 illustrates another embodiment of the present invention, in which the brightness of a virtual object influences the exposure time of the Real World Acquisition Apparatus as an exemplary imaging parameter. Image 800 captures a real environment comprising a real cube 801. A standard approach for capturing such an image is the usage of the auto exposure feature of the camera. The camera meters how much light is coming from the environment, and sets an appropriate value for the exposure time and aperture. The camera in the example would detect that the room is "quite" dark, and therefore would set a longer exposure time in order to capture an image that has good contrast, and where details like the cube in the room are well visible. Image 810 shows the same image of the same environment comprising the real cube 811 superimposed with a virtual object 812, which is a virtual torch in this example. Image 810 does not look realistically because the virtual torch does not influence the visual appearance of the real environment comprising the real cube 811. If a real torch was added, it would not only illuminate the real scene, but the additional light from the bright torch towards the camera would also result in a decreased camera exposure time in case auto exposure is enabled, resulting in the real environment appearing darker. An embodiment of the present invention considers the virtual torch 822 by letting its brightness influence the exposure time of the real camera. Instead of determining the exposure time based only on the captured image as done in standard auto exposure approaches, an embodiment of this invention determines the exposure time, which is one imaging parameter, based on the captured image of the real environment and the virtual object, i.e. the virtual torch in this case. For example, an exposure meter (also called light meter) could be employed to detect the environment brightness or intensity of environment light. The data obtained from the exposure meter could be used together with the brightness of the virtual object (which could be provided as a property of the virtual object) in order to determine the exposure time for the camera capturing the real environment. In another example the brightness of the real environment is determined from a camera image of the real environment.

As can be seen in image 820 the exposure time of the real camera has been decreased to account for the virtual torch 822. This results in an increased realism of the augmented image. Note that in this example the virtual torch is not used to virtually illuminate the real scene. This could be done in an optional additional post processing step. The virtual object influences image parameters, such as the exposure time in this example.

Figure 9:
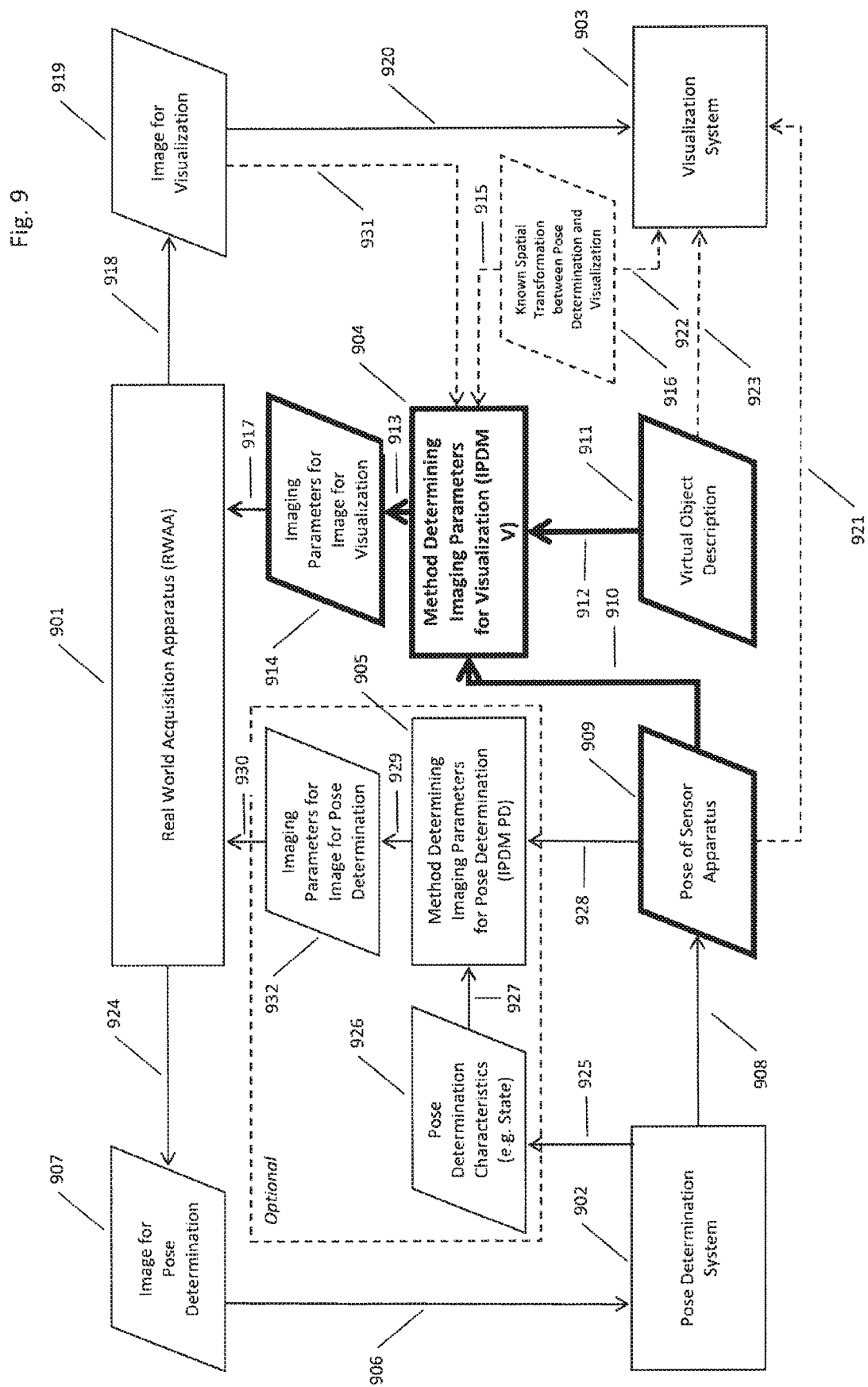
FIG. 9 shows an embodiment of system components which may be used in connection with the present invention.

FIG. 9 shows a further embodiment of the present invention. It comprises a Real World Acquisition Apparatus RWAA (901), a Pose Determination System (902), a Visualization System (903) and a Method IPDM V (904) determining imaging parameters for the image of the real environment used for the visualization. Additionally the system potentially comprises a Method IPDM PD (905) determining imaging parameters for the image of the real environment used for the pose determination.

The Pose Determination System receives (906) an image (907) of the real environment generated (924) by the RWAA (901) and determines (908) the pose (909) of the sensor apparatus based on this image (907). In this example, at least one of the pose (909) and the Virtual Object Description (911) is used (910) by the IPDM V (904) to determine (913) the Imaging Parameters (914), which are taken into account (917) by the Real World Acquisition Apparatus (901) for generating (918) an Image (919) of the Real Environment used for the Visualization. For determining (913) the Imaging Parameters (914) for the Image of the Real Environment used for the Visualization, the IPDM V (904) optionally considers (915) a Known Spatial Transformation (916) between the Pose (909) of the Sensor Apparatus where it captures the Image (907) of the Real Environment used for the Pose Determination and the Pose of the Sensor Apparatus where it captures the Image (919) of the Real Environment used for the Visualization. The IPDM V (904) optionally considers (931) the previously generated (918) Image (919) of the Real Environment used for the Visualization.

The generated Image (919) of the Real Environment then is used (920) by the Visualization System as the part of the augmented image showing the real environment which is overlaid by a rendering according (921) to the Pose (909) of the Sensor Apparatus of the Image (907) of the Real Environment used for the Pose Determination—potentially transformed (922) by the Known Spatial Transformation (916)— and according (923) to the Virtual Object Description (911).

The image (907) of the Real Environment used for the Pose Determination is generated (924) by the RWAA (901). Optionally there is a Method IPDM PD (905) which determines the Imaging Parameters for that image (932). In this case, the pose determination system (902) delivers (925) Pose Determination Characteristics (926), e.g. the current State of the Pose Determination, a history of the most current poses, and/or reconstructed 3D data of the scene. The Method IPDM PD (905) uses at least one of the characteristics (926), the pose (909), and the virtual object description (911) to determine (929) the Imaging Parameters (9032), which then are used (930) by the RWAA (901) to generate (924) the next image (907) of the Real Environment used for the Pose Determination.

FIG. 10 illustrates different setups (in the present example, three setups) related to embodiments of the present invention and describe how requested imaging parameters may be used for generating images. In the three setups Imaging Parameters are defined for an image for pose determination (1014, 1057, 1077) as well as Imaging Parameters are defined for an image for visualization (1008, 1058, 1078). The Imaging Parameters may influence the measurement step of the light leaving from the real environment, i.e. settings regarding the optics and sensors, as well as they may influence the further processing step of the measured data into the final images of the real environment, i.e. settings regarding the image processing.

The RWAA (1001) in FIG. 10a contains two separate Light Measure Apparatuses (1002, 1003). The Light Measure Apparatuses (1002, 1003) of RWAA (1001) may be implemented using two separate camera devices or as one camera device. The latter can be achieved by time scheduling (or time-division multiplexing) of light measurements for pose determination and light measurements for visualization. Each light measure apparatus (1002, 1003) may comprise at least one optics and sensor.

The RWAA (1001) in FIG. 10a contains two separate Process Apparatuses (1004, 1006). The Process Apparatuses (1004, 1006) may be implemented as separate apparatuses or as one apparatus. The latter can be achieved by for example time scheduling (or time-division multiplexing or interleaving) of processing of light measurements for pose determination and for visualization. The same is true for the Process Apparatuses (1053, 1055) in FIG. 10b.

The first light measure apparatus (1002) of the RWAA (1001) measures data about the light leaving from the real environment which then is processed by a process apparatus (1004) into an image (1005) used for pose determination. The second light measure apparatus (1003) of the RWAA (1001) separately measures data about the light leaving from the real environment which then is processed by a process apparatus (1006) into an image (1007) used for visualization. As two separate measurements about the light are taken, the measurements are independent of each other, and can be handled separately. Therefore the imaging parameters (1008) desired for the image for visualization are processed by a dedicated Imaging Parameters Manager IPMV (1009) as well as the imaging parameters (1014) desired for the image for pose determination are processed by a dedicated Imaging Parameters Manager IPMP (1015).

From the desired imaging parameters (1008) and according to the capabilities of the Light Measure Apparatus (1003) as well as Process Apparatus (1006) the IPMV (1009) determines which particular imaging parameters are used during measuring data about the light leaving from the real environment and which particular imaging parameters are used during the processing of the measured data into an image. The parameters determined to be used during measuring data are provided (1010) to and used by the Light Measure Apparatus (1003) for Visualization when measuring data about the light. These parameters could for example comprise a particular value for the focal length and exposure time. The data measured about the light leaving from the real environment according to the provided (1010) parameters then is transferred (1011) to the Process Apparatus (1006) responsible for the Image (1007) for Visualization.

The parameters determined by the IPMV (1009) to be used during processing the measured data into an image are provided (1012) to and used by the Process Apparatus (1006) responsible for the Image for Visualization when processing (1013) the measured data into a final image (1007) of the real environment used for visualization. These imaging parameters could for example comprise of particular values defining the amount of blurring of the image depending on depth and tone mapping for pixel intensities. If no imaging parameters (1008) are defined for a particular domain like for example focus or exposure, the light measure apparatus (1003) and process apparatus (1006) generating the image (1007) for visualization may exhibit default behavior, e.g. auto focus, auto exposure and auto white balancing.

Optionally also imaging parameters (1014) desired for the image (1005) used for pose determination are defined. Then from the desired imaging parameters (1014) and according to the capabilities of the Light Measure Apparatus (1002) as well as Process Apparatus (1004) the imaging parameters manager IPMP (1015) responsible for the image for pose determination determines which particular imaging parameters are used during measuring data about the light leaving from the real environment and which particular imaging parameters are used during the processing of the measured data into an image. The parameters determined to be used during measuring data are provided (1016) to and used by the Light Measure Apparatus (1002) for Pose Determination when measuring data about the light. These parameters could for example comprise of a particular value for the focal length and exposure time. The data measured about the light leaving from the real environment according to the provided (1016) parameters then is transferred (1017) to the Process Apparatus (1004) responsible for the Image (1005) for Pose Determination.

The imaging parameters determined by the IPMP (1015) to be used during processing the measured data into an image are provided (1018) to and used by the Process Apparatus (1004) responsible for the Image for Pose Determination when processing (1019) the measured data into a final image (1005) of the real environment used for pose determination. These imaging parameters could for example comprise of particular values defining the amount of blurring of the image depending on depth with a Gaussian kernel and tone mapping for pixel intensities.

If no imaging parameters (1014) are defined for a particular domain like for example focus or exposure, the light measure apparatus (1002) and process apparatus (1004) generating the image (1005) for the pose determination may exhibit default behavior, e.g. auto focus, auto exposure and auto white balancing.

The RWAA (1051) in FIG. 10b contains only a single Light Measure Apparatus (1052). It measures data about the light leaving from the real environment which then is processed (1064, 1066) separately by a process apparatus (1053) for pose determination into an image (1054) used for pose determination as well as by process apparatus (1055) for visualization into an image (1056) used for visualization. Thereby a measurement step of the light leaving from the real environment is shared between the image for Visualization and Pose Determination. The particular imaging parameters used (1060) for the measuring should be balanced between the imaging parameters (1057) requested for the image for pose determination and the imaging parameters (1058) requested for the image for visualization. Therefore both requested imaging parameters (1057, 1058) are processed by a combined Imaging Parameters Manager IPMC (1059).

From the desired imaging parameters (1057, 1058) and the capabilities of the Light Measure Apparatus (1053) as well as Process Apparatuses (1055, 1056) the IPMC (1059) determines which particular imaging parameters are used during measuring data about the light leaving from the real environment and which particular imaging parameters are used during the two separate processing steps of the measured data into the two images. The parameters determined to be used during measuring data should consider a good tradeoff between the two desired imaging parameters (1057, 1058) bearing in mind a separate processing step afterwards by 1053 and 1055. These imaging parameters could for example comprise of those particular values for the focal length and exposure time that result in measured data that allows to best fulfill the overall desired imaging parameters (1057, 1058) in the succeeding two separate processing steps. An example could be a first requested imaging parameter (1057) for overexposing sensor irradiance values above a threshold T1 and not overexposing sensor irradiance values below T1 as well as a second requested imaging parameter (1058) for overexposing sensor irradiance values above a threshold T2 and not overexposing sensor irradiance values below T2. The imaging parameters for the light measurement then are determined to achieve a measurement where at least sensor irradiance values up to the value of TMAX, where TMAX is the maximum of T1 and T2, are not overexposed. The imaging parameters for the light measurement are chosen in that way so that imaging parameters for the tone mapping in the particular processing steps of the measured data into the particular images then can be set accordingly to achieve an overexposure for sensor irradiance values above T1 in the first image (1054) as well as above T2 in the second image (1056) without overexposing sensor irradiance values below T1 and T2 in the images respectively.

The parameters determined by the IPMC (1059) to be used during measuring data about the light are provided (1060) to and used by the Light Measure Apparatus (1052) when measuring data about the light. The data measured about the light leaving from the real environment according to the provided (1060) imaging parameters then is transferred (1061, 1062) both to the Process Apparatus (1053) responsible for the Image for Pose Determination and to the Process Apparatus (1055) responsible for the Image for Visualization.

The imaging parameters determined by the IPMC (1059) to be used during further processing the measured data into the final image (1054) of the real environment for pose determination depend on the original desired imaging parameters (1057) for the image, the imaging parameters (1060) used for measuring the light as well as the capabilities of the process apparatus. These imaging parameters could for example comprise of particular values defining the amount of blurring of the image depending on depth with a Gaussian kernel and tone mapping for pixel intensities. In the above example, the imaging parameters for the tone mapping when processing the measured data into the image (1054) for pose determination would be set so that sensor irradiance values above T1 would be overexposed in the image (1054) while sensor irradiance values below T1 would not be overexposed. These imaging parameters are provided (1063) to and used by the Process Apparatus (1053) responsible for the Image for Pose Determination when processing (1064) the measured data into a final image (1054) of the real environment used for pose determination.

The imaging parameters determined by the IPMC (1059) to be used during further processing the measured data into the final image (1056) of the real environment for visualization depend on the original desired imaging parameters (1058) for the image, the imaging parameters (1060) used for measuring the light as well as the capabilities of the process apparatus. These imaging parameters could for example comprise particular values defining the amount of blurring of the image depending on depth with a Gaussian kernel and tone mapping for pixel intensities. In the above example, the imaging parameters for the tone mapping when processing the measured data into the image (1056) for visualization would be set so that sensor irradiance values above T2 would be overexposed in the image (1056) while sensor irradiance values below T2 would not be overexposed. These imaging parameters are provided (1065) to and used by the Process Apparatus (1055) responsible for the Image for Visualization when processing (1066) the measured data into a final image (1056) of the real environment used for visualization.

The RWAA (1071) in FIG. 10c contains only one Light Measure Apparatus (1072). It measures data about the light leaving from the real environment which then is processed by a single process apparatus (1075) for pose determination and visualization into an image (1076) used both for pose determination as well as for visualization. The image (1076) thus is shared for Pose Determination and Visualization. The particular imaging parameters used for the measuring and processing should be balanced between the two sets of imaging parameters (1077, 1078) separately requested—the imaging parameters (1077) requested for the image for pose determination and the imaging parameters (1078) requested for the image for visualization. Therefore both requested imaging parameters (1077, 1078) are processed by a combined Imaging Parameters Manager IPMC (1079).

From the desired imaging parameters (1077, 1078) and according to the capabilities of the Light Measure Apparatus (1072) as well as of the Process Apparatus (1075) the IPMC (1079) determines which particular imaging parameters are used during measuring data about the light leaving from the real environment and which particular imaging parameters are used during the processing of the measured data into the image. The parameters determined to be used during measuring data as well as the parameters determined to be used during the processing step should consider a good tradeoff of their composite effect for the final image (1076) when compared with the two desired imaging parameters (1077, 1078). These imaging parameters could for example comprise of those particular values for the focal length and exposure time that result in measured data that allows to best fulfill the overall desired imaging parameters (1077, 1078) considering potential adjustments in the succeeding processing step. An example could be a first requested imaging parameter (1077) that specifies that a particular distance D1 should be in focus as well as a second requested imaging parameter (1078) that specifies that a particular distance D2 should be in focus. The imaging parameters for the light measurement then are determined to achieve a measurement where both points in the real environment in a distance of D1 from the camera are mapped sufficiently sharp as well as points in the real environment in a distance of D1 from the camera are mapped sufficiently sharp. This can for example be achieved by influencing the depth of field to be sufficiently large to cover both distances by setting a small enough aperture value.

The parameters determined by the IPMC (1079) to be used during measuring data about the light are provided (1080) to and used by the Light Measure Apparatus (1072) when measuring data about the light. The data measured about the light leaving from the real environment according to the provided (1080) imaging parameters then is transferred (1082) to the Process Apparatus (1075) responsible for the Image (1076) used for Pose Determination and Visualization.

The imaging parameters determined by the IPMC (1079) to be used during further processing the measured data into the final image (1076) of the real environment depend on the two original desired imaging parameters (1077, 1078) for the image, the imaging parameters (1080) used for measuring the light as well as the capabilities of the process apparatus (1075). These imaging parameters could for example comprise of particular values defining the amount of blurring of the image depending on depth with a Gaussian kernel and tone mapping for pixel intensities. In the above example, there could for example be another request in one of the requested imaging parameters (1077, 1078) that points closer than a distance D3 should be out-of-focus. This out-of-focus effect could maybe not be achieved in the light measurement while at the same time keeping distances D1 and D2 in focus. The imaging parameters for the blurring of the image then could be set in such a way, that parts of the image closer than D3 are blurred with a Gaussian kernel with the amount of blurring depending on the depth a.k.a. distance of that part from the camera. Other examples could be tone mapping with a mapping function that is a tradeoff between the requested imaging parameters (1077, 1078). These imaging parameters are provided (1085) to and used by the Process Apparatus (1075) responsible for the Image for both Pose Determination and Visualization when processing (1082) the measured data into the final image (1076) of the real environment.

Note that often not all requested imaging parameters can be fulfilled because of limitations of capabilities of the light measure and process apparatuses. Also requests regarding imaging parameters may conflict. Thereby either a single set of requested imaging parameters can be inconsistent within itself or multiple requested imaging parameters may conflict. In these cases, those imaging parameters should be chosen that minimize the introduced error in the effect visible in the images. The error can be for example measured by giving different imaging parameters weights and by defining a metric on the parameter space, that allows to measure the deviation between the required imaging parameters and the used once by a scalar.

In another embodiment the metric is defined over the space of image properties, like for example image brightness or radius of the circle of confusion, which result from at least one of imaging parameters like exposure time, aperture, tone mapping, focal length and depth of field. The error regarding one image property then can be for example measured by the difference between the image property which would result from the requested imaging parameters and the image property resulting from the chosen imaging parameters. The overall error can be defined for example as sum over the absolute errors or the square root of the sum over the squared errors of the particular image properties. Giving different image properties weights allows tuning the influence and importance of a particular image property.

The method described herein deals with different types of imaging parameters. On the one hand the imaging parameters manager of the pose determination system and the imaging parameters manager of the visualization system specify particular imaging parameters for an intended image to be generated, like a focus distance at 2 meter and a depth of field of approximately 3 m.

As an example, the imaging parameters manager of the visualization system could for example first determine whether at the center part of the planned augmented image a part of the real world will be visible or if this part of the real world will be overlaid by a rendering of a virtual object. This could be checked based on the geometry (also known as virtual object property) of the virtual object and the camera pose (either provided or determined from a provided image of the environment) by sampling the center pixel by terms of, for example, ray tracing or by sampling from a rasterized image of the virtual object or of its bounding volume. If a virtual object is found for that pixel, the sampled distance of the virtual object potentially can be compared against the real world depth for that pixel, for example based on a depth camera image, a depths reconstruction or a provided model of the real world.

If the visualization system determines that the real world will be visible in the center of the planned augmented image, the visualization system could for example request a focus distance corresponding to the distance between the camera and the part of real world visible at the center of the image. The information about the distance could be determined from a (partial) 3D model of the scene provided by for example a depth camera or a reconstructed or provided 3D model of the scene together with the current camera pose.

If the visualization system determines that a virtual object will be visible in the center of the planned augmented image, the visualization system could for example request a focus distance corresponding to the distance between the virtual camera and the part of the virtual object visible at the center of the image. The information about the distance could be determined from the 3D model (also known as virtual object property) of the virtual object and the current camera pose (either provided or determined from a provided image of the environment).

It is of course also possible to not only examine one but multiple locations of the planned augmented image, and then further process the different distances for example by calculating a weighted average over the different distances. Also it would be possible to not examine a particular location by means of raytracing or rasterization, but to simply calculate the distance of a virtual object or some point of the virtual object to the camera, and use this information to set the imaging parameters for the focus distance.

The imaging parameters manager of the pose determination system could for example determine at what distance to the camera there are those features in the real world that will lead to feature points in the camera image that are well suited for pose determination. This could for example be identified based on the actual camera pose and or the reconstructed point cloud or CAD model of the real world object which is used for the pose determination. The pose determination system then could for example request a focus distance and depths of field corresponding to those distances between the camera and the part of real world, so that the wanted features are mapped in focus and sharply.

Beside focus, there are also other imaging parameters, which are beneficial to influence. Talking about exposure, the visualization system could for example request that the luminance values of a particular part of the virtual object which is visible in the planned augmented image should be well exposed (not over- or underexposed). The particular part of the virtual object visible in the planned augmented image would be determined by the current camera pose. For this particular part (or the whole object) the luminance values could be determined, either by direct specifications of luminance in the virtual object properties or by shading calculations, that is a combination of the virtual object surface properties and the virtual object illumination property. The pose determination system could for example request that the luminance value of a particular part of the real world used for pose determination should be well exposed (not over- or underexposed). The particular part of the real world and the corresponding luminance of that part could be determined based on a CAD model of the real world object used for the pose determination and the current camera pose. The corresponding luminance information could also stem from a previous reconstruction of the real world object, which includes reconstruction of luminance.

In the same way, it could also be beneficial to determine imaging parameters, so that the full (or another specified part of the) dynamic range of the planned image is used by a certain range of luminance values specified by a virtual object. This then can be either achieved by adequate imaging parameters during the light measuring step or during the succeeding processing.

In the same way, it could also be beneficial to determine imaging parameters, so that the resulting image of the real world used for visualization contains a certain amount of motion blur. This could for example be specified by a virtual object depending on the speed of the virtual object and the expected speed of camera motion in order to keep the virtual object in target. A desired amount of motion blur (for example 15 pixels) then could be achieved by appropriately adapting the exposure time.

On the other hand there may be a particular implementation of a real world acquisition apparatus, which will be used to generate the intended image. Each particular implementation of such an apparatus has its own physical limitations and technical capabilities in terms of for example the used system of lenses, lens distortions, mirrors, field of view, optical zoom range, focus distances, depth of field, aperture stops and shape, focal length, focal planes, vignetting, sensor type, sensor size, bit-depth, dynamic range, resolution, sensor gain, color channels, color filters, shutter speed and lag, read out times, processing power, sensor bias and its correction, defect pixels and its correction, dark frame substraction, white balance, demosaicing, denoising, sharpening, color space conversion, linearity, gamma correction, image filters, noise characteristics and reductions, or employed algorithms and compression. Each particular implementation also may vary in the degree of configurability of the involved pipeline as well as the possibility to query particular settings and calibrate its behaviour. Additionally also the possibility of an apparatus to determine for example the optimal exposure, white balance or focus setting may differ depending on for example the availability of an additional auto-focus sensor or a metering sensor for auto-exposure, auto-white-balance or motion prediction.

According to an embodiment, the generation of an image may comprise at least two steps. A first step is the measurement of light intensities by a sensor, which also includes optical components that influence what particular part of the light field is guided to a particular sensor position. A second step is the succeeding processing of the measured data into the final image of the real world.

There is not always a one to one mapping between a requested imaging parameter for an intended image and the imaging parameter to be finally set at the real world acquisition apparatus.

Exposure for example is the amount of light per unit area reaching the image sensor and depends on shutter speed, exposure time, lens aperture, as well as scene luminance. To achieve a particular exposure value, different parts of the light measurement step (shutter speed or lens aperture) could be adjusted. For a static real world scene and camera however the exposure corresponding to a twice as long exposure time could also be simulated by just doubling the exposure values.

A focus distance can be achieved by either changing the distance between sensor and lens, or by changing the behavior of the lens (respectively system of lenses) itself. A depth of field can be achieved by a particular focal length and aperture. The aperture however again also influences the exposure.

By this it should be clear that parts of the desired effects of the requested imaging parameters can be achieved by taking influence on one or multiple imaging parameters in a step one, the measurement of light, others by taking influence on one or multiple imaging parameters in a step two, the processing of the data, and some effects can even be achieved by taken influence in either one of the step one or two or in both simultaneously. Information which is not measured in the first step, can however not be produced by processing the measurements in step two.

A Light field camera like the so-called Lytro for example has a particular so-called "refocus range" which is the distance range between objects in the foreground and background that can be later on re-focused by processing the measured data into images. This refocus range is determined by the settings used during the measurement of light. Although the particular focus distance—for example F1=2 meter—then is selected during processing, the settings used for the measurement should be set accordingly to allow the particular focus distance—in this example F1.

A similar thing would be a particular tone mapping of an intended image, which should for example overexpose sensor irradiance values above a threshold T1, and not overexpose sensor irradiance values below T1. This could be achieved by only setting particular imaging parameters for the light measurement. It can however also be achieved by measuring a higher dynamic range well exposed (i.e. without any overexposure, saturation, or intensity clipping), and afterwards apply tone mapping to synthetically overexpose values above the threshold T1. If the range below T1 however is already overexposed during measuring, tone mapping during processing cannot undo the overexposure, i.e. intensity clipping.

If a particular real world acquisition apparatus cannot achieve a particular imaging parameter, or a particular combination of imaging parameters (for example combination of shutter speed and exposure, or the combination of focus distance and depth of field), the imaging parameters best meeting the intended effect should be found. As an example, if the closest focus distance for a real world acquisition apparatus is F2=0.3 meter and the intended imaging parameters would request a focus distance of F3=0.2 meter, the focus distance of the real world acquisition apparatus should be set to F2, the closest approximation or nearest neighbor of the intended parameter.

If not only one, but at least two images shall be generated based on a single light measurement step, the finally used imaging parameters for the light measurement step should be set to best satisfy the needs for all the images. Thereby it could also be beneficial to weight the importance of the different imaging parameters, to for example ensure that at least the pose determination on the one image works out. Similarly one could give a weight to a particular imaging parameter, for example specifying that focus distance is more important than the depth of field.

One example for a shared light measurement step could be a real world acquisition apparatus comprising of a light field camera and a first requested imaging parameter for the focus distance of F1=2 meter as well as a second requested imaging parameter for the focus distance of F2=5 meter. The imaging parameters for the light measurement then are determined to best allow a refocus range including at least F1 as well as F2. The imaging parameters for the particular processing of the measured data into the particular images then are set accordingly to achieve a final focus distance of F1 and F2 respectively.

This is for example shown in FIG. 10*b*, where the imaging parameters 1057 comprise a focus distance of F1 and the imaging parameters 1058 comprise a focus distance of F2. The imaging parameters provided (1060) to the light measure apparatus (1052) would in this case comprise the specification that the range of focus distances for which images can be processed from the acquired data includes F1 and F2. After acquisition, process apparatus 1053 would process the data into an image with a focus distance of F1 and process apparatus 1055 would process the data into an image with a focus distance of F2. This can be achieved with so-called "post focusing", which assembles images with a particular focus from light rays stored in a light field dataset.

In another embodiment according to FIG. 10*b*, the Real World Acquisition Apparatus is a monocular camera allowing for control over the focus. Provided with first imaging parameters 1057 comprising a focus distance of F1 and second imaging parameters 1058 comprising a focus distance of F2 the Imaging Parameters Manager may determine a compromise focus distance F3 e.g. as the average of F1 and F2, i.e. $F3=0.5*F1+0.5*F2$ or any other weighted combination of the two distances, i.e. $F3=(1-a)*F1+a*F2$ with a in the range [0,1]. The imaging parameters provided (1060) to the light measure apparatus (1052) would in this case comprise a focus distance of F3. The imaging parameter is then considered by the light measure apparatus e.g. by mechanically changing the position of lenses or other optical elements or by mechanically changing the shape of optical elements. After acquisition, process apparatus 1053 would process the data (with a focus distance of F3) into an image with a focus distance of F1 and process apparatus 1055 would process the data (with a focus distance of F3) into an image with a focus distance of F2 by means of convolution and deconvolution.

Since the amount of defocus of a part of the real environment present in an image depends on focus distance and the distance of the imaged part of the real environment, changing focus-related imaging parameters with the process apparatus may require knowledge on the distance of parts of the real environment to the camera to treat them according to their distance and to change their amount of defocus (or blurriness) accordingly.

To increase the amount of defocus in a particular part of the image using a process apparatus, one approach is to convolve the part of the image with a Gaussian kernel, which is a two-dimensional normal distribution and mimics the point spread function of an imaged point in the real environment on the image. Analogously to decrease the amount of defocus in a particular part of the image using a process apparatus, one approach is to deconvolve the part of the image with a Gaussian kernel.

In this embodiment, the imaging parameters referring to focus distance were partially implemented by imaging parameters affecting the measurement of light (e.g. changing the lens position), and partially implemented by imaging parameters affecting the processing of the measurements into final images (e.g. blurring with a Gaussian kernel). In the processing of the measurements into images, one or more intermediate images may be generated and the one or more intermediate images may be convolved or deconvolved with a Gaussian kernel in order to produce the final images.

Many other imaging parameters besides the focus distance can also be implemented in the measuring of light, or in the processing of measurements into images, or as a combination of both. The processing of the measurements into images may include generating one or more intermediate images, and the generating one or more intermediate images may be further processed to become final images according to at least one of the imaging parameters.

Another example could be a real world acquisition apparatus with a first requested imaging parameter for overexposing sensor irradiance values above a threshold T1 and not overexposing sensor irradiance values below T1 as well as a second requested imaging parameter for overexposing sensor irradiance values above a threshold T2 and not overexposing sensor irradiance values below T2. The imaging parameters for the light measurement then are determined to achieve a measurement where at least sensor irradiance values up to the value of TMAX, where TMAX is the maximum of T1 and T2, are not overexposed. The imaging parameters for the particular processing of the measured data into the particular images then are set accordingly to achieve an overexposure for sensor irradiance values above T1 and T2 respectively without overexposing sensor irradiance values below T1 and T2 respectively.

Requested imaging parameters for a desired image may not only comprise a single value, but also a range of possible values, potentially equipped with a rating of suitability for the values, which then can be used within the process of finding the optimal compromise imaging parameters. Additionally it is also possible to have multiple requested imaging parameters by different systems but only generate one image which then is used in multiple ways, for example for pose determination as well as visualization based on the multiple requested imaging parameters from different imaging parameter managers. Here again optimal compromise imaging parameters should be determined for the light measurement step as well as the processing step, that best satisfy the needs from the multiple requested imaging parameters.

Figure 11:
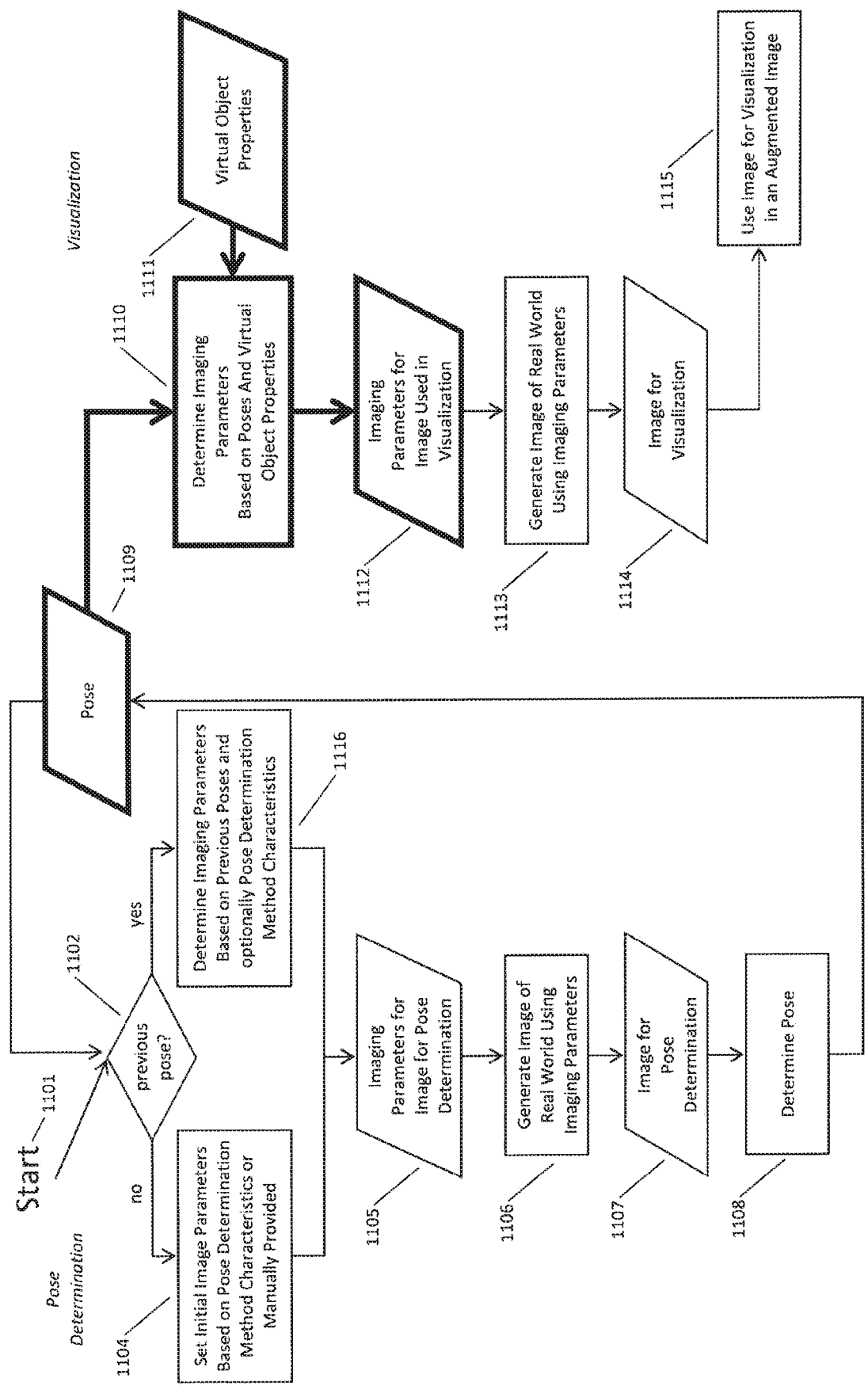
FIG. 11 shows a flow diagram of a data flow for a system comprising two separate light measure apparatuses according to an embodiment of the invention.

FIG. 11 shows a data flow for a system comprising two separate Light Measure Apparatuses. The left half of the Figure relates to generating images of the real environment and determining the pose of the camera according to these images, the right half of the Figure relates to generating images of the real environment used for visualization of the real environment in an augmented image. In both parts imaging parameters for the particular images are determined.

At the beginning (1101) there is not yet a determined previous pose (1102), so the imaging parameters (1105) for the image used for determining the pose are set (1104) to initial image parameters based on characteristics of the pose determination method or manually provided. If later on, when there (1102) is already a previous pose, the imaging parameters (1105) for the image used for determining the pose are determined (1116) based on previous poses and optionally based on characteristics of the pose determination method. Characteristics of the pose determination method could for example include a preferred focal distance e.g. that only parts of the real environment should be imaged sharply that are close to the camera or that only parts of the real environment should be imaged sharply that are far away from the camera or that all parts of the environment should be imaged sharply. Other characteristics of the pose determination method could include requirements on the sharpness of the image of the part of the real environment relative to which the camera pose shall be determined, e.g. that the respective part should be imaged sharply with a point spread function smaller than a pixel. Other characteristics of the pose determination method include requirements on the contrast of the image of the part of the real environment relative to which the camera pose shall be determined, e.g. that the difference between the intensity of the brightest pixel and the intensity of the darkest pixel is greater than a given threshold.

Based on the imaging parameters (1105) an image (1107) is generated (1106) of the real world and a pose (1109) is determined (1108) from that image (1107). This pose (1109) then is used again for determining (1116) imaging parameters (1105) for the next image used for determining the pose.

At least one of the pose (1109) (and potentially additional previous poses) and virtual object properties (1111) are used to determine (1110) imaging parameters (1112) for the image used for visualization. Based on the imaging parameters (1112) an image (1114) is generated (1113) of the real world and the image (1114) then is used (1115) for visualization in an augmented image.

Different implementations of the pose determination method or even a single implementation in different states may have particular preferences about the properties of the images used for pose determination, referred to as pose determination method characteristics.

In an embodiment pose determination method characteristics include a preferred focal distance e.g. that only parts of the real environment should be imaged sharply that are close to the camera or that only parts of the real environment should be imaged sharply that are far away from the camera or that all parts of the environment should be imaged sharply.

In another embodiment pose determination method characteristics include requirements on the sharpness of the image of the part of the real environment relative to which the camera pose shall be determined, e.g. that the respective part should be imaged sharply with a point spread function smaller than a pixel.

In another embodiment pose determination method characteristics include requirements on the contrast of the image of the part of the real environment relative to which the camera pose shall be determined, e.g. that the difference between the intensity of the brightest pixel and the intensity of the darkest pixel is greater than a given threshold.

FIG. 12 shows a similar data flow as FIG. 11, however, for an embodiment that only comprises one Light Measure Apparatus. At the beginning (1201) there is not yet a determined previous pose (1202), so the desired imaging parameters (1205) for the image used for determining the pose are set (1204) to initial image parameters based on characteristics of the pose determination method or manually provided. If later on, when there (1202) is already a previous pose, the desired imaging parameters (1205) for the image used for determining the pose are determined (1216) based on previous poses and optionally based on characteristics of the pose determination method.

Characteristics of the pose determination method could for example include a preferred focal distance e.g. that only parts of the real environment should be imaged sharply that are close to the camera or that only parts of the real environment should be imaged sharply that are far away from the camera or that all parts of the environment should be imaged sharply. Other characteristics of the pose determination method could include requirements on the sharpness of the image of the part of the real environment relative to which the camera pose shall be determined, e.g. that the respective part should be imaged sharply with a point spread function smaller than a pixel. Other characteristics of the pose determination method include requirements on the contrast of the image of the part of the real environment relative to which the camera pose shall be determined, e.g. that the difference between the intensity of the brightest pixel and the intensity of the darkest pixel is greater than a given threshold.

If there is once at least one pose (1209) available, at least one of the pose (1209) (and potentially additional previous poses) and virtual object properties (1211) are used to determine (1210) desired imaging parameters (1212) for the image used for visualization. Now as there is only one Light Measure Apparatus in this embodiment, the two desired imaging parameters (1205, 1212) are combined (1226) into compromise imaging parameters (1227), bearing in mind a shared light measuring and a separate processing afterwards. Based on the imaging parameters (1227) two images are generated (1228) of the real world, one image (1207) for pose determination, which then successively is used to determine (1208) the pose (1209), another image (1214) for visualization, which then is used (1215) as real world part for a later on augmented image. Thereby images 1207 and 1214 may be the same image or they may be based on the same light measurement but differ in terms of processing applied to the measured light to generate the respective images 1207 and 1214.

Initially, when there is not yet a pose available, the compromise imaging parameters (1227) are either determined (1226) based on imaging parameters (1205) for the image for pose determination only, or some default for the imaging parameters (1212) for the image used in visualization are set.

FIG. 13 shows a similar data flow as FIG. 12, with an embodiment in which the system comprises only one Light Measure Apparatus. In this case however, the parameters for image processing for the image for visualization are updated on the current pose determined by the measured light data, which pose and light data then is also used for that particular image for visualization.

At the beginning (1301) there is not yet a determined previous pose (1302), so the desired imaging parameters (1305) for the image used for determining the pose are set (1304) to initial image parameters based on characteristics of the pose determination method or manually provided. If later on, when there (1302) is already a previous pose, the desired imaging parameters (1305) for the image used for determining the pose are determined (1316) based on previous poses and optionally based on characteristics of the pose determination method.

Characteristics of the pose determination method could for example include a preferred focal distance e.g. that only parts of the real environment should be imaged sharply that are close to the camera or that only parts of the real environment should be imaged sharply that are far away from the camera or that all parts of the environment should be imaged sharply. Other characteristics of the pose determination method could include requirements on the sharpness of the image of the part of the real environment relative to which the camera pose shall be determined, e.g. that the respective part should be imaged sharply with a point spread function smaller than a pixel. Other characteristics of the pose determination method include requirements on the contrast of the image of the part of the real environment relative to which the camera pose shall be determined, e.g. that the difference between the intensity of the brightest pixel and the intensity of the darkest pixel is greater than a given threshold.

If there is once at least one pose (1309) available, at least one of the pose (1309) (and potentially additional previous poses) and virtual object properties (1311) is used to determine (1310) desired imaging parameters (1312) for the image used for visualization of the real environment based on the upcoming light measurement. Now as there is only one Light Measure Apparatus in this embodiment, the two desired imaging parameters (1305, 1312) are combined (1330) into compromise imaging parameters (1331) for the light measurement, bearing in mind a shared light measuring and a separate processing afterwards.

According to the compromise imaging parameters (1331) light of the real environment is measured (1332). This light measurement (1333) data of the real world then is processed (1334) into an image (1307) for pose determination according to the desired imaging parameters (1305) for the image for pose determination, considering the applied compromise imaging parameters (1331) for measuring (1332) the light.

The image (1307) for pose determination then is used to determine (1308) the latest pose (1309). This latest pose (1309) (and potentially additional previous poses) is used together with virtual object properties (1311) to determine (1310) desired imaging parameters (1312) for the image used for visualization of the real environment based on the pose determined from the newest light measurement. The newest light measurement however is already made, so only the processing part can still be influenced. Therefore the newest desired imaging parameters (1312) for the image used for visualization of the real environment based on the newest light measurement are compared to the imaging parameters (1331) used for the measurement of the newest light measurement. This is done by an imaging parameters updater (1339) which outputs updated parameters for the processing of the current light measurement into the image visualization considering both the imaging parameters (1331) used for the newest light measurement and the imaging parameters (1312) based on this newest light measurement as well as the virtual object properties (1311). These updated imaging parameters (1340) determine how the already measured light data (1333) shall be processed into an image for visualization and consider the used imaging parameters for the light measurement (1331). The light measurement (1333) data of the real world then is processed (1341) into an image (1314) for visualization according to the updated imaging parameters (1340) for the image for visualization, considering the applied compromise imaging parameters (1331) for measuring (1332) the light. The resulting image (1314) then is used (1315) for visualization in an augmented image.

Initially, when there is not yet a pose available, the compromise imaging parameters (1331) are either determined (1330) based on imaging parameters (1305) for the image for pose determination only, or some default for the imaging parameters (1312) for the image used in visualization are set.

FIG. 14 explains a terminology of generating images of the real environment using specified imaging parameters according to embodiments of the invention.

Figure 14C:
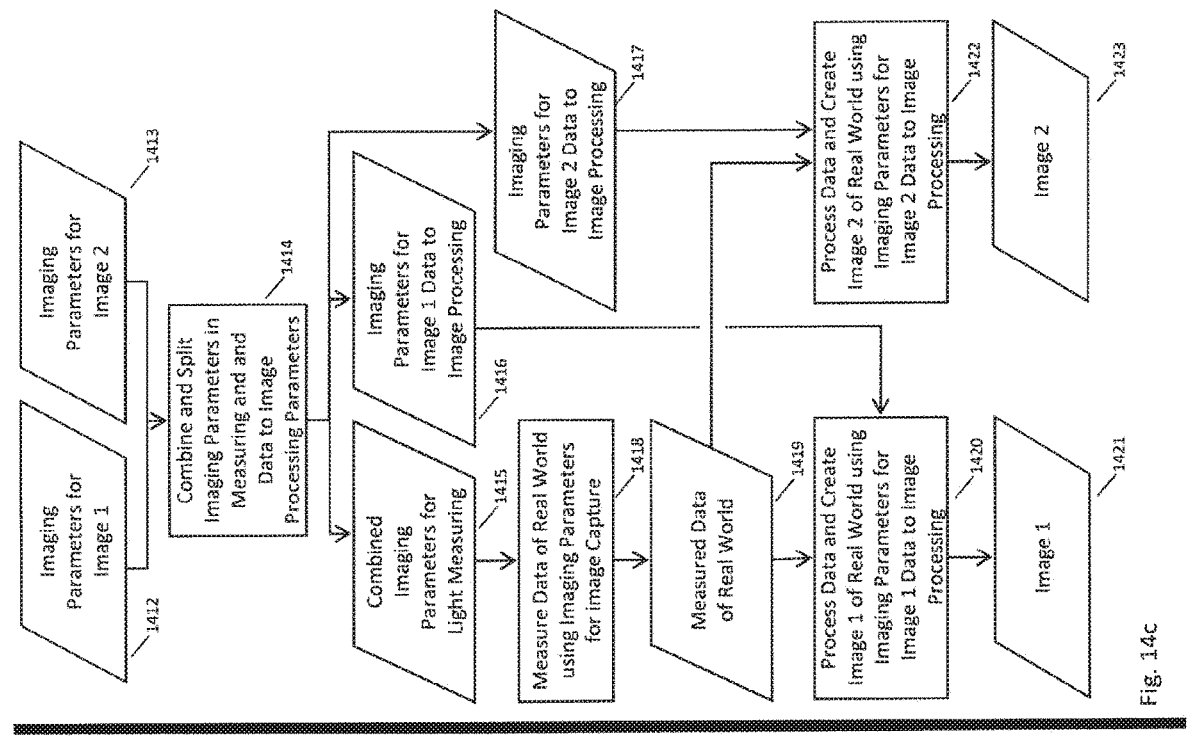
FIG. 14 illustrates terminology of generating images of the real environment using specified imaging parameters according to embodiments of the invention.
Figure 14B:
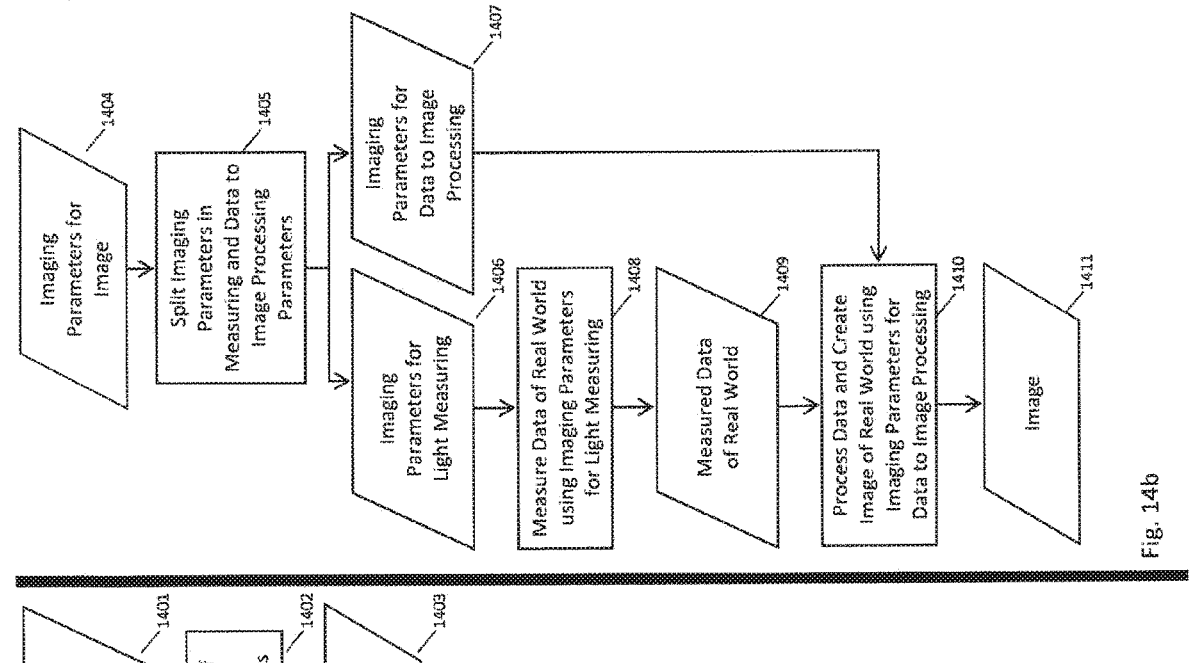
Figure 14A:
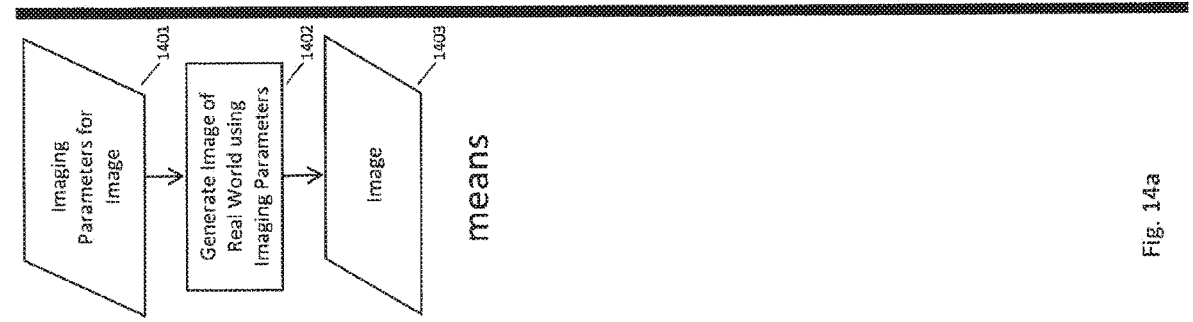

Particularly, FIG. 14a shows a simplified case, according to specified imaging parameters (1401) for an image, an image (1403) is generated (1402) of the real world or environment.

FIG. 14b illustrates generating an image of the real world comprising at least two steps: a light measuring step and a step of processing the measured data into an image. Therefore the specified imaging parameters (1404) for the image are split (1405) into separate imaging parameters (1406) for the light measuring step and imaging parameters (1407) for the processing step of the measured data into the final image. Based on the imaging parameters (1406) for the light measuring step data (1409) of the light of the real world is measured (1408). This measured data of the real world (1409) then is processed (1410) into an image (1411) of the real world according to the imaging parameters (1407) for the data to image processing.

FIG. 14c illustrates how the generation of multiple images may share a light measurement step. Two different imaging parameters may be specified. Firstly the imaging parameters (1412) for an image 1, and secondly the imaging parameters (1413) for an image 2 are provided. The generation of the two images will share a light measurement step, but will potentially have separate processing steps of the measured data into the final images. Therefore the specified imaging parameters (1412, 1413) for the images are transformed (1414) into combined imaging parameters (1415) for the light measuring and two separate imaging parameters (1416, 1417) for the data to image processing for image 1 and the data to image processing for image 2. Based on combined imaging parameters (1415) for the light measuring step, data (1419) of the light of the real world is measured (1418). This measured data of the real world (1419) then is processed twice. Firstly it is processed (1420) into an image 1 (1421) according to the imaging parameters (1416) for the data to image processing for image 1. Secondly it is processed (1422) into an image 2 (1423) according to the imaging parameters (1417) for the data to image processing for image 2.

According to this embodiment, the resulting image 1 (1421) should ideally be close to fulfilling the requirements specified with the imaging parameters 1412 and the resulting image 2 (1423) should ideally be close to fulfilling the requirements specified with the imaging parameters 1413. This ultimately depends on how well 1412 and 1413 are compatible.

Note that there are even more ways to combine and split the parameters not illustrated in this Figure, as for example visualized in FIG. 13, where the parameters for image processing for the image for visualization are updated on the current pose determined by the measured light data, which then is also used for the image processing for the image for visualization.

If a compromise for the imaging parameters for the image used for pose determination and the imaging parameters for the image used for visualization is used, it is also possible to use the same image for pose determination and visualization.

FIG. 15 illustrates different embodiments of the present invention related to a way how light may be measured by the real world acquisition apparatus (or part of it) to determine imaging parameters based on the appearance of the real environment. The imaging parameters that can be determined this way for example include shutter speed or aperture size. The figure explains how this metering can be combined with measurements for the lighting conditions introduced by the virtual object. The metering thereby is not limited to light intensities, but can also be used when measuring depth for determining imaging parameters like focus. For depths, the intensities in the depicted images (1501, 1502, 1503, 1504) can be understood as depths values, with white being far away from the camera and the darker the closer a particular region in the image is to the camera.

Image 1501 shows a view of the real environment comprising a mountain panorama view with a bright very distant sky (1507), a medium bright skyline (1505) of distant mountains as well as a dimmer stony ground (1506) quite close to the camera. Different options exist for measuring the light, for example by assigning a relative weighting to different light regions. A point in the image near the center of the image or near a particular point in the image defined as measurement center could have a higher weighting then a point further away from the measurement center, and thus could contribute more to the final exposure calculation. Different modes like center-weighted, partial metering or spot metering exist in nowadays cameras which differ in the degree of decline of weighting with respect to distance and the corresponding percentage of covered image region. Also the location of autofocus and different properties of particular regions in the image like color or contrast can contribute to the weighting.

Cameras often have particular measurement zones defined in the image, where they measure values like intensity, contrast, sharpness or depth for determining settings for auto focus or auto exposure. In the example shown in Image 1501, the measurement zones (1508) comprise a 3×3 grid of quads in the center of the image with two additional rectangles to the left and right. In these measurement zones, for example the light intensity is metered and the measurements are combined to determine imaging parameters like the shutter speed and aperture. In Image 1501 the top row would meter the bright intensity from the sky (1507), the medium row would (mainly) meter the medium bright light coming from the medium bright skyline (1505) and the bottom row would mainly meter the dim close by ground (1506), with the bottom left zone being little bit brighter, as also partially being covering the medium bright skyline (1505). The camera could then for example determine the real environment to be medium bright in average, and accordingly set imaging parameters like the shutter speed and aperture so that the resulting image is neither underexposed nor overexposed.

For augmented reality however, the imaged scene in the augmented image comprise not only the real environment but also virtual objects. The calculation of imaging parameters like exposure or focus should therefore also incorporate the appearance of the later on augmented virtual objects.

Based on virtual object properties, like the geometry of a virtual object, and the current camera pose, those measurement zones can be determined, which will be affected by the rendering of a virtual object. Image 1502 illustrates those zones (1521) depicted in bold, which cover a virtual object (1520), i.e. a dark sphere close to the camera. Zones (1522) which do not cover the virtual object (1520) are depicted with light lines.

In an embodiment illustrated in image 1503, only those measurement zones (1532) are used to find the best focus or exposure proposal for the real environment image which will not be overlaid by a rendering of a virtual object in the final augmented image, depicted in bold in image 1503.

In an embodiment illustrated in image 1502, measurement zones (1520) which cover a rendering of a virtual object in the final augmented image, depicted in bold in image 1502, are used to find the best focus or exposure proposal for the virtual object. The particular influence of a virtual object on the measurements and the determined proposal values for imaging parameters may depend on the provided virtual object properties.

These proposal values from the zones corresponding to the real environment part then can be combined with the proposal values from the zones corresponding to the virtual objects according to the influence of the particular measurement zones.

In another embodiment the proposal values corresponding to the real environment part use all measurement zones, independent from the virtual object, as depicted in image 1501.

In another embodiment, the proposal values corresponding to the virtual object are determined by other means based on for example the distance of the virtual object to the camera, the viewing direction between the camera and the virtual object or based on the image area covered by the virtual object.

In an embodiment the final imaging parameters may either be determined by combining determined imaging parameters from real and virtual measurements like described above, potentially using real world measurement zones according to occlusion of the real environment by virtual object.

In an embodiment the final imaging parameters for exposure may also be determined by making a combined measurement on an augmented image like shown in image 1504, where the augmented image potentially comprises a combined intensity image to determine exposure parameters. The virtual object is potentially rendered with matched imaging parameters for exposure with regard to the image of the real environment.

In an embodiment the image used to determine expose parameters has a High Dynamic Range.

In an embodiment the final imaging parameters for focus may also be determined by making a combined measurement on an augmented image like shown in image 1504, where the augmented image potentially comprises a combined depth map of the real environment and the virtual objects.

In an embodiment the imaging parameters for exposure are adjusted according to a brightness histogram of at least part of at least one image.

In an embodiment the exposure is adjusted in a way to try to create an augmented image with a histogram whose primary peak is in the midtones. In an embodiment the exposure is adjusted in a way to try to create an augmented image with a histogram whose primary peak is in the highlights. In an embodiment the exposure is adjusted in a way to try to create an augmented image with a histogram whose primary peak is in the shadows. In an embodiment the exposure is adjusted in a way to try to create an augmented image with a histogram whose primary peak is broad.

Further embodiments are disclosed in the following without explicit reference to the drawings.

Imaging parameters and determination thereof:

In an embodiment of the present invention, imaging parameters may include, but are not limited to, at least one or more of: focus, post focus, focus settings, lens position, focal plane, depth of field, focus distance, depth of focus, focus spread, sharpening, blurring, brightness, contrast, exposure time, shutter time, shutter mode, shutter settings, exposure settings, aperture, film speed, sensitivity, gain, ISO, low light settings, point of view, viewing direction, camera projection properties, focal length, field of view, zoom settings, region of interest, image cropping, extraction of picture elements, subject area, tone mapping, white balance, saturation, gamma correction, black level adjustment, quantization, filtering, noise reduction, edge enhancement, contrast enhancement, false chroma suppression, chroma subsampling, chroma resampling, color transformation, image compression, debayering, color space conversion, demosiac, blooming, convolution, deconvolution, filtering, NPR, toon shading, half toning, silhuette rendering, compensation, filter pattern compensation, rolling shutter compensation, sensor offset bias correction, pixel defects correction, lens shading (vignetting) compensation, dark frame subtraction, dynamic range, color format, bit depth, frame rate, resolution, flash settings, torch settings.

In a further embodiment imaging parameters are provided as pairs of parameter types and respective values, wherein the values can be indicative of a scalar value, a real-valued vector, a real-valued matrix, a range, a distribution, or a function.

In a further embodiment, imaging parameters are focus settings, such as lens position, focal plane, depth of field, focus distance, depth of focus, and focus spread.

In a further embodiment, imaging parameters are related to brightness, such as contrast, exposure time, shutter time, shutter mode, shutter settings, exposure settings, aperture, film speed, sensitivity, gain, ISO, low light settings.

In a further embodiment, imaging parameters are focus settings or parameters related to brightness.

In an embodiment a method for determining imaging parameters for visualization considers the distance of a virtual object to a camera and determines an imaging parameter which sets the focus distance to the distance of the virtual object.

In a further embodiment a method for determining imaging parameters for visualization considers the minimal and maximal distance of a virtual object to a camera and determines an imaging parameter which sets the depth of field to the difference between the minimal distance and the maximal distance of the virtual object.

In a further embodiment a method for determining imaging parameters for visualization considers the brightness of a virtual object and determines an imaging parameter which sets a longer exposure time if the brightness of the virtual object is low and a shorter exposure time if the brightness of the virtual object is high.

In a further embodiment a method for determining imaging parameters for visualization considers the brightness of a virtual object and determines an imaging parameter which sets a shorter exposure time if the brightness of the virtual object is low and a longer exposure time if the brightness of the virtual object is high.

In a further embodiment a method for determining imaging parameters for visualization considers the brightness of a virtual object and the distance of the virtual object to a camera and determines an imaging parameter which sets a shorter exposure time if the brightness of the virtual object is high and/or if the distance between the virtual object and the camera is short and/or which sets a longer exposure time if the brightness of the virtual object is low and/or if the distance between the virtual object and the camera is large.

In a further embodiment a method for determining imaging parameters for pose determination considers the distance between a part of the real environment and the camera and determines an imaging parameter which sets the focus distance to the distance of the part of the real environment.

In a further embodiment a method for determining imaging parameters for pose determination considers the brightness of a part of the real environment and determines an imaging parameter which sets a shorter exposure time if the brightness of the virtual object is high and a longer exposure time if the brightness of the virtual object is low.

In an embodiment determining imaging parameters based on poses and virtual object properties considers the brightness of a virtual object (which is a virtual object property) and the distance of the virtual object to a camera (which is derived from poses) and determines an imaging parameter which sets a shorter exposure time if the brightness of the virtual object is high and if the distance between the virtual object and the camera is short and which sets a longer exposure time if the brightness of the virtual object is low and if the distance between the virtual object and the camera is large.

In a further embodiment determining imaging parameters based on poses and virtual object properties may determine imaging properties indicative of an exposure time if the virtual object properties are indicative of the brightness of the virtual object and it further may determine imaging properties indicative of a focal plane if the virtual object properties are indicative of that the virtual object always shall be in focus and it further may determine imaging properties indicative of zoom settings if the virtual object properties are indicative of a range of size that the virtual object should have in the augmented image and it further may determine imaging properties indicative of bit depth if the virtual object properties are indicative of dynamic range.

Referring again to the Figures, the RWAA (101), (901), (1001), (1051) or (1071) may be implemented as a camera system or as a part of a camera system. In another embodiment, a part of the RWAA (101), (901), (1001), (1051) or (1071) may be implemented in a camera system.

All of the components disclosed in FIG. 1, 9, 10a, 10b, or 10c may be completely implemented by a system comprising at least one camera device and at least one processing device. The at least one camera device may comprise at least one of light field cameras and non-light field cameras (also called conventional cameras). The at least one processing device may comprise at least one of a mobile device (e.g. mobile phone, tablet), desktop computer, and server computer. The at least one camera device and the at least one processing device may communicate via cable or wirelessly.

Any step or method disclosed herein may be performed by one or more processing units of at least one camera and/or at least one processing device.

In an embodiment, the components disclosed in FIG. 1, 9, 10a, 10b, or 10c may be implemented in a mobile device equipped with a camera (e.g. a mobile phone or a tablet). In another embodiment, the components disclosed in FIG. 1, 9, 10a, 10b, or 10c may be implemented in a light field camera device. In a further embodiment, the components disclosed in FIG. 1, 9, 10a, 10b, or 10c may be implemented in a light field camera device connected to a computer device, e.g. a desktop computer, a mobile computer, or a server computer.

Generally, in the following, a further explanation of terms is given and the following further aspects and embodiments may be applied in connection with aspects of the invention.

Camera:

A camera is often called an imaging device or capturing device. The proposed invention can generally be applied with any camera capable of providing images. It is not restricted to cameras providing color images in the RGB format. It can also be applied to any other color format and also to monochrome images, for example to cameras providing images in grayscale format or YUV format.

A camera often has intrinsic parameters including focal length and principal point. A camera may capture light that is visible to the human eye. A camera may also capture light that is invisible to the human eye, such as infrared light. For example, the camera may be a thermal imaging camera or infrared camera.

A camera providing an image with depth data is often called a depth camera. A depth camera system could be a time of flight (TOF) camera system or a passive stereo camera or an active stereo camera based on structured light. A depth camera may provide images whose pixels represent only depth data. A depth camera may capture both the light and depth data in a single image, e.g. RGB-D image. For the depth camera, the depth data does not need to be provided in the same resolution as the (color/grayscale) image.

For a standard camera model with a simplified pinhole or fisheye camera model, only light falling through a single point, i.e. the pinhole, is measured.

This invention may further use a light field camera that could capture an image from multiple different viewpoints and optionally with different focuses for the different viewpoints. Light field cameras are not limited to capturing only light falling through a single point, but measure also a plurality of light intensities incident at different locations. A non-light field camera is called conventional camera herein.

Image:

An image is any data depicting or recording visual information or perception. The image could be a 2-dimensional image. The image could also be a 3-dimensional image, e.g. a depth image.

An image could be a real image or a synthetic image. A real image may be captured by a camera. For example, the camera could capture an object of interest or a part of the object of interest in one real image. A synthetic image may be generated automatically by a computer or manually by a human. For example, a computer rendering program (e.g. based on OpenGL) may generate a synthetic image of an object of interest or a part of the object of interest. A synthetic image may be generated from a perspective projection as it is captured by a camera. A synthetic image may be generated according to orthogonal projection.

An image may capture an object that reflects, refracts, and/or emits light that is visible and/or invisible to human eyes. The image may be in the RGB format. It can also be applied to any other color format and also to monochrome images for example in grayscale format or YUV format. For example, an infrared image could capture an object that reflects, refracts, and/or emits light that is invisible to the human eyes.

A depth image may be a 2D (color/grayscale) image with a corresponding depth map. The depth images do not need to be provided in the same resolution as the 2D image. The depth image may also be called 3D image. A depth image may only provide depth data.

Feature:

A feature of an object is used to denote a piece of information related to the object. The piece of information may be visually perceivable to anatomical eyes or optical imaging devices. For example, a real object may emit or reflect visible light that could be captured by human eyes or cameras. The real object may also emit or reflect invisible light that could not be captured by human eyes, but could be captured by a camera (i.e. is optically perceivable). In another example, a feature may be associated with a virtual object (i.e. computer-generated object). A feature of the virtual object may be known or detectable in a computer or computer program, like computer graphic simulation software.

A feature may describe specific colors and/or structures, such as blobs, edges points, a particular region, and/or more complex structures of the real object. A feature may be represented by an image patch (e.g. pixel intensity) or a high level descriptor (e.g. SIFT, SURF).

A feature may have 3D position and/or 3D orientation information in 3D Euclidean space relative to a coordinate system of the real object. This is often called a 3D feature.

A feature may also be expressed in 2D space. For example, a feature (i.e. the piece of information related to the real object) may be extracted from an image of the real object captured by a camera, and thus the feature may have 2D image position and/or orientation in a coordinate system of the image. This is often called 2D feature or image feature. When a camera could provide depth information, a feature extracted from an image of the camera may also have 3D position and/or orientation information.

A feature could be described by an equation that describes a geometric shape, for example a point, a ray, a straight line, a circle, a cone, or a cylinder.

Methods to detect features in an image that could be used in a method of the invention include but are not limited to local extrema of Laplacian of Gaussian (LoG), Difference of Gaussians (DoG) or Determinant of Hessian (DoH), Maximally stable extremal regions (MSER), Harris features, or learning-based corner detectors such as FAST. Also methods that detect edges (edge elements) are suitable to be used in such method. The feature detection method to be used is not limited to approaches working on a 2D intensity grayscale image, but can also be performed on images in any other color space, including RGB, HSV, and Lab, or range images that either exclusively contain depth information or provide both depth and intensity information.

Pose:

A pose of a first object relative to a second object (e.g. a coordinate system associated with the second object) describes a rigid transformation including a translation and/or a rotation between the first object and the second object. A pose of the second object relative to the first object may be considered equivalent to a pose of the first object relative to the second object, as they describe the same spatial relationship.

In 3D space, a pose may include information for six degrees of freedom (DOFs) or a part of the six DOFs. The six DOFs include three DOFs for translations and three DOFs for rotations. In 2D space, a pose may include information for three degrees of freedom (DOFs) or a part of the three DOFs. The three DOFs include two DOFs for translations and one DOF for rotations.

A motion of a real object (e.g. a camera) describes a spatial relationship or a rigid transformation between the real object at one position and the real object at another position in a common coordinate system.

Camera Pose Determination:

A pose of a camera relative to a real world (e.g. a real object or a real environment) may be determined based on an image of at least part of the environment captured by the camera.

In one implementation, a model of the real object can be used for model based matching. The model based matching could for example be based on point features, edge features, or image patches of any size and form. While point features are frequently used for highly textured objects, edge features are preferred if the real object has little texture. Model based matching requires the image used for pose determination to contain at least part of the real object described by the model. Note that the real object could for example also include a fiducial marker in the environment. A model of the real object could be described by points, edges, polygons or their combinations. A model of the real object may also contain texture information, e.g. colors.

Determining a pose of the camera can also be realized by using a visual marker. This requires the visual marker at a known position relative to the real object. In this case, a camera pose with respect to the real object could be determined according to a camera pose with respect to the visual marker, which is estimated based on an image of the camera containing the visual marker. It is not necessary for the image to contain at least part of the real object when the visual marker is used for the camera pose determination.

A camera motion between two camera positions may be determined by camera poses at the two camera positions. A camera motion may also be determined according to two images captured by the camera at the two camera positions respectively. For example, common image features in the two images may be employed to determine the camera motion.

A task of camera pose estimation is to compute a spatial relationship or a transformation between a camera and a reference object (or environment). Camera motion estimation is to compute a spatial relationship or a transformation between a camera at one position and the camera at another position. Camera motion may be also known as camera pose which describes a pose of a camera at one position relative to the same camera at another position. Camera pose or motion estimation is also known as tracking a camera. A spatial relationship or transformation describes a translation, a rotation, or their combination in 3D space.

Object Model:

An object model describes a geometry and/or texture of an object or a generic geometry and/or texture of a group of objects. An object model may be also called a digital model as it is digitally represented or stored.

Geometry refers to one or more attributes of an object including, but not limited to, shape, form, surface, symmetry, geometrical size, dimensions, and/or structure. A dimension of a geometry may be 2D (e.g. a 2D plane), 3D (e.g. a 3D cube), or 4D (3D in space+1D in time). For example, a model may include changes of geometry and/or texture of the object with respect to the time.

An object model of a real object or a virtual object could be represented by a CAD model, a polygon model, a point cloud, a volumetric dataset, and/or an edge model, or use any other representation.

At least part of a geometry may be mathematically represented by at least one coordinate (i.e. discrete representation) or by at least one mathematic formula (i.e. continuous representation) in a 2D or 3D coordinate system. For example, a circle or a sphere may be represented by a set of points or a mesh or a set of edges (discrete representation) or represented by an equation in a 2D or 3D coordinate system. A circle that is a 2D shape may be defined in a 2D or 3D space. A sphere that is a 3D geometry may be defined in a 2D space as a projection of the sphere (i.e. 3D shape) onto the 2D space.

A 3D model can further, for example, be represented as a model comprising 3D vertices and polygonal faces and/or edges spanned by these vertices. Edges and faces of the model may also be represented as splines or NURBS surfaces. A 3D model may be accompanied by a bitmap file describing its texture and material where every vertex in the polygon model has a texture coordinate describing where in the bitmap texture the material for this vertex is stored. A 3D model can also be represented by a set of 3D points as, for example, captured with a laser scanner. The points might carry additional information on their color, intensity and/or any other additional information related to particular point.

A model for an object may further include a material of the object. A material of the object could be represented by textures and/or colors in the model and could, for example, represent the reflection or radiance transfer properties of the model. A model of an object may use different representations for different parts of the object.

A 2D model of an object may describe 2D geometry of at least part of the object. A 3D model of an object may describe 3D geometry of at least part of the object. The object may be a real object or a virtual object. A generic model may describe generic geometry and/or texture of a group of objects. For example, a 3D model may be specific for an object. A generic 3D model may not be specific for an object, but may describe a generic geometry for a group of similar objects. The similar objects may belong to a same object type and share some common properties. For example, faces of different people are belonging to a same object type having eye, mouth, ear, nose, etc. Cars of different designs or from different brands are belonging to a same object type having four tires, at least two doors, and a front window glass, etc.

A generic 3D face model may not be the same as any real existing individual face, but it may be similar to an existing individual face. For example, the silhouette of the face of the 3D model may not exactly match the silhouette of the existing individual face, but they are all the shape of eclipse. A generic 3D face model may be determined according to a plurality of 3D models of faces. The face model can also be already further processed, for example containing the principal component analysis with mean and variances for at least one of face specific characteristics.

An object model may include a kinematic model for an articulated object, like joint parameters for the kinematic chain. An object model may include parameters indicative of deformable properties for a deformable object. An object may also be rigid.

The invention claimed is:

1. A non-transitory computer readable medium comprising computer readable code executable by one or more processors to:
   capture light field data for a scene from a light field camera, wherein the light field data comprises image data and light distribution data for the scene;
   generate, from the light field data and using first imaging parameters, a first image;
   generate, from the light field data and using second imaging parameters, a second image;
   determine a pose of the light field camera based on the first image data; and
   generate a composite image by superimposing a virtual object in the second image according to the determined pose of the light field camera.

2. The non-transitory computer readable medium of claim 1, wherein the first imaging parameters cause the first image to present the scene based on a first depth of focus, and wherein the second imaging parameters cause the second image to present the scene at a second depth of focus.

3. The non-transitory computer readable medium of claim 2, wherein the second depth of focus is associated with a virtual depth at which the virtual object is superimposed.

4. The non-transitory computer readable medium of claim 1, wherein the first image comprises all in focus image data.

5. The non-transitory computer readable medium of claim 1, further comprising computer readable code to:
   capture additional light field data from the light field camera at a second time;
   generate, from the additional light field data, a third image;
   determine an updated pose of the light field camera based on the third image;
   determine a relative position of the virtual object to the light field camera for the second time;
   generate a fourth image from the additional light field data; and
   generate an updated composite image by superimposing the virtual object in the fourth image according to the updated pose of the light field camera.

6. The non-transitory computer readable medium of claim 5, wherein the virtual object is rendered at a first scale in the composite image and a second scale in the updated composite image.

7. The non-transitory computer readable medium of claim 1, further comprising computer readable code to:
   detect a brightness of the scene based on the light field data; and
   determine a brightness associated with the virtual object,
   wherein the computer readable code to generate the composite image further comprises computer readable code to modify the brightness of the second image according to the brightness of the scene and the brightness associated with the virtual object.

8. A system for generating an image for display, comprising:
   a light field camera;
   one or more processors; and
   a memory coupled to the one or more processors and comprising computer readable code executable by the one or more processors to:
   capture light field data for a scene from the light field camera,
   wherein the light field data comprises image data and light distribution data for the scene;
   generate, from the light field data and using first imaging parameters, a first image;
   generate, from the light field data and using second imaging parameters, a second image;
   determine a pose of the light field camera based on the first image data; and
   generate a composite image by superimposing a virtual object in the second image according to the determined pose of the light field camera.

9. The system of claim 8, wherein the first imaging parameters cause the first image to present the scene based on a first depth of focus, and wherein the second imaging parameters cause the second image to present the scene at a second depth of focus.

10. The system of claim 9, wherein the second depth of focus is associated with a virtual depth at which the virtual object is superimposed.

11. The system of claim 8, wherein the first image comprises all in focus image data.

12. The system of claim 8, further comprising computer readable code to:
   capture additional light field data from the light field camera at a second time;
   generate, from the additional light field data, a third image;
   determine an updated pose of the light field camera based on the third image;
   determine a relative position of the virtual object to the light field camera for the second time;
   generate a fourth image from the additional light field data; and
   generate an updated composite image by superimposing the virtual object in the fourth image according to the updated pose of the light field camera.

13. The system of claim 12, wherein the virtual object is rendered at a first scale in the composite image and a second scale in the updated composite image.

14. The system of claim 12, further comprising computer readable code to:
   detect a brightness of the scene based on the light field data; and
   determine a brightness associated with the virtual object,
   wherein the computer readable code to generate the composite image further comprises computer readable code to modify the brightness of the second image according to the brightness of the scene and the brightness associated with the virtual object.

15. A method for generating an image for display, comprising:
   capturing light field data for a scene from a light field camera, wherein the light field data comprises image data and light distribution data for the scene;
   generating, from the light field data and using first imaging parameters, a first image;
   generating, from the light field data and using second imaging parameters, a second image;
   determining a pose of the light field camera based on the first image data;
   and
   generating a composite image by superimposing a virtual object in the second image according to the determined pose of the light field camera.

16. The method of claim 15, wherein the first imaging parameters cause the first image to present the scene based on a first depth of focus, and wherein the second imaging parameters cause the second image to present the scene at a second depth of focus.

17. The method of claim 16, wherein the second depth of focus is associated with a virtual depth at which the virtual object is superimposed.

18. The method of claim 15, wherein the first image comprises all in focus image data.

19. The method of claim 15, further comprising:
   capturing additional light field data from the light field camera at a second time;
   generating, from the additional light field data, a third image;
   determining an updated pose of the light field camera based on the third image;
   determining a relative position of the virtual object to the light field camera for the second time;
   generating a fourth image from the additional light field data; and
   generating an updated composite image by superimposing the virtual object in the fourth image according to the updated pose of the light field camera.

20. The method of claim 19, wherein the virtual object is rendered at a first scale in the composite image and a second scale in the updated composite image.

* * * * *